US008805601B2

(12) United States Patent
Aso et al.

(10) Patent No.: US 8,805,601 B2
(45) Date of Patent: Aug. 12, 2014

(54) OBJECT PATH PREDICTION METHOD, APPARATUS, AND PROGRAM, AND AUTOMATIC OPERATION SYSTEM

(75) Inventors: Kazuaki Aso, Narashino (JP); Toshiki Kindo, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1448 days.

(21) Appl. No.: 12/224,176

(22) PCT Filed: Feb. 28, 2007

(86) PCT No.: PCT/JP2007/053760
§ 371 (c)(1), (2), (4) Date: Aug. 20, 2008

(87) PCT Pub. No.: WO2007/102367
PCT Pub. Date: Sep. 13, 2007

(65) Prior Publication Data
US 2009/0024357 A1 Jan. 22, 2009

(30) Foreign Application Priority Data

Feb. 28, 2006 (JP) ................................ 2006-053878
Feb. 28, 2006 (JP) ................................ 2006-053879
Mar. 2, 2006 (JP) ................................ 2006-056874

(51) Int. Cl.
*G05D 1/02* (2006.01)

(52) U.S. Cl.
USPC .......................................................... 701/21

(58) Field of Classification Search
CPC .... G01C 23/00; E01C 19/004; G05B 13/048; Y10S 367/909; Y10S 715/97
See application file for complete search history.

(56) References Cited

U.S. PATENT DOCUMENTS

| 6,169,495 | B1 | 1/2001 | Koike | |
|---|---|---|---|---|
| 6,611,737 | B1* | 8/2003 | El-Tahan et al. | 701/21 |
| 7,014,146 | B2* | 3/2006 | Villaume et al. | 244/111 |
| 7,389,179 | B2* | 6/2008 | Jin et al. | 701/207 |

(Continued)

FOREIGN PATENT DOCUMENTS

| JP | A 3-118698 | 5/1991 |
|---|---|---|
| JP | A 6-215300 | 8/1994 |

(Continued)

OTHER PUBLICATIONS

Broadhurst et al., "Monte Carlo Road Safety Reasoning," IEEE Intelligent Vehicle Symposium, 2005.

(Continued)

*Primary Examiner* — Ryan Zeender
*Assistant Examiner* — Dana Amsdell
(74) *Attorney, Agent, or Firm* — Oliff PLC

(57) ABSTRACT

An object path prediction method, apparatus, and program and an automatic operation system that can secure safety even in situations that can actually occur are provided. For this purpose, a computer having a storage unit that stores the position of an object and the internal state including the speed of the object reads the position and internal state of the object from the storage unit, generates trajectories in a space-time consisting of time and space from changes of the positions that can be taken by the object with the passage of time based on the read position and internal state of the object, and predicts probabilistically paths of the object by using the generated trajectories.

4 Claims, 28 Drawing Sheets

(56) References Cited

U.S. PATENT DOCUMENTS

| | | | |
|---|---|---|---|
| 7,451,004 B2* | 11/2008 | Thiele et al. ............ 700/28 |
| 7,772,992 B2* | 8/2010 | Fetzmann et al. ............ 340/961 |
| 2002/0008718 A1* | 1/2002 | Obradovich ............ 345/764 |
| 2002/0135467 A1 | 9/2002 | Koike |
| 2003/0006889 A1 | 1/2003 | Koike |
| 2003/0009275 A1 | 1/2003 | Koike |
| 2003/0033082 A1 | 2/2003 | Yanagidaira et al. |
| 2003/0139883 A1 | 7/2003 | Takafuji et al. |
| 2004/0090117 A1 | 5/2004 | Dudeck et al. |
| 2004/0122587 A1 | 6/2004 | Kanemitsu |
| 2006/0074501 A1* | 4/2006 | Hartman et al. ............ 700/29 |
| 2009/0010495 A1 | 1/2009 | Schamp et al. |
| 2009/0150011 A1* | 6/2009 | Villaume et al. ............ 701/3 |

FOREIGN PATENT DOCUMENTS

| | | |
|---|---|---|
| JP | A 7-225612 | 8/1995 |
| JP | A 8-16240 | 1/1996 |
| JP | A 11-126294 | 5/1999 |
| JP | A 2000-76581 | 3/2000 |
| JP | A 2000-207691 | 7/2000 |
| JP | A 2000-242898 | 9/2000 |
| JP | A 2000-276696 | 10/2000 |
| JP | A 2002-140786 | 5/2002 |
| JP | A 2003-58999 | 2/2003 |
| JP | A 2003-123185 | 4/2003 |
| JP | A 2003-205804 | 7/2003 |
| JP | A 2003-215241 | 7/2003 |
| JP | A 2004-504216 | 2/2004 |
| JP | A 2004-145479 | 5/2004 |
| JP | A 2004-199389 | 7/2004 |
| JP | A 2005-524900 | 8/2005 |
| JP | A 2008-507454 | 3/2008 |

OTHER PUBLICATIONS

Go et al., "Autonomous Behaviors for Interactive Vehicle Animations," Eurographics/ACM SIGGRAPH Symposium on Computer Animation, 2004.

\* cited by examiner

OBJECT PATH PREDICTION METHOD, APPARATUS, AND PROGRAM, AND AUTOMATIC OPERATION SYSTEM

TECHNICAL FIELD

The present invention relates to an object path prediction method, apparatus, and program that predict a path of an object based on a position and an internal state of the object, and an automatic operation system.

BACKGROUND ART

In recent years, various attempts have been made to realize an automatic operation of a movable body such as a four-wheel vehicle. For realization of an automatic operation of a movable body, it is important to correctly detect objects such as vehicles, pedestrians, and obstacles present around the movable body and to avoid danger while running based on the detection results. Of these two factors, an object detection technology using various sensors and radars is known as a technology to precisely detect surrounding objects.

An automatic operation technology of a movable body is a technology by which the movable body is automatically moved from an origin to a destination only by entering the destination. When the range of movement is narrow, this technology can be realized in a path finding technology by creating a map of the range of movement in advance and predicting an influence of dynamic obstacles in advance. However, when the range of movement of a movable body is wide such as when the movable body is an automobile, the automatic operation technology cannot be realized in the path finding technology. The wide range here is a range in which a time t needed for avoiding a dynamic obstacle and a time X needed for running an entire distance are vastly different and, for example, is a case in which τ is several hours while t is several seconds.

If the range of movement of a movable body is wide, there are mainly two reasons why the automatic operation technology is not attributable to the path finding technology. First, a first reason is as follows: Consider, for example, a situation when a time of about 10 t elapses after a movable body starts from an origin. In this case, an influence of dynamic obstacles spreads out over an entire road and a path on which no collision occurs cannot be defined. That is, if the range of movement of a movable body is wide, a path from an origin to a destination cannot be calculated in advance.

Next, a second reason is as follows: If the range of movement of a movable body is wide, as described above, the time τ needed for running an entire distance is much longer than t. Thus, it is impossible for a computer mounted on an automobile to complete required calculation within a practical time in which evasion of actual collision can be realized.

In the automatic operation technology of a movable body that moves in a wide range such as an automobile, as described above, in addition to the path finding technology in which an influence of at least other dynamic obstacles is not considered or an influence thereof is not practically needed for calculation, a path calculation technology by which calculation needed for avoiding collision with dynamic obstacles is completed within a practical time to calculate a path to avoid danger while running is needed.

As a technology to avoid danger while running of the path calculation technology described above, a technology is known by which, in a system consisting of a plurality of objects and subject vehicle, paths of each object including subject vehicle are generated by using information concerning the position and velocity of subject vehicle and information concerning the positions and velocities of the plurality of objects excluding subject vehicle to predict possibilities of any two objects constituting the system to collide (See, for example, Nonpatent Literature 1). According to this technology, paths taken by all objects constituting the system are predicted by means of operation sequences of the same framework using the concept of probability and are output. Then, based on obtained prediction results, a path for realizing the safest condition for the entire system including subject vehicle is determined and output.

Nonpatent Literature 1: A. Broadhurst, S. Baker, and T. Kanade, "Monte Carlo Road Safety Reasoning", IEEE Intelligent Vehicle Symposium (IV2005), IEEE, (June, 2005)

DISCLOSURE OF INVENTION

Problem to be Solved by the Invention

However, since the technology disclosed by Nonpatent Literature 1 focuses on predicting a path that makes all objects constituting a system safe, it is not certain whether or not the path obtained from such a prediction sufficiently secures safety for a specific object (such as subject vehicle).

This point will be described more specifically. In actual road situations, a driver of another vehicle or a pedestrian may recognize road situations falsely, leading to unfavorable behavior to surrounding objects including subject vehicle without a person in question being aware of it. In contrast, Nonpatent Literature 1 tacitly assumes that all objects exhibit behavior giving priority to safety and thus, it is not clear whether safety can sufficiently be secured also in situations that can actually occur such as when some object behaves unfavorably to surrounding objects.

The present invention has been made in view of the above circumstances and an object thereof is to provide an object path prediction method, apparatus, and program and an automatic operation system that can secure safety even in situations that can actually occur.

Means for Solving Problem

To solve the problems as described above and to achieve objects, an object path prediction method according to the present invention is an object path prediction method for predicting a path of an object by a computer having a storage unit that stores at least a position of the object and an internal state including a speed of the object, including a trajectory generation step of generating a trajectory in a space-time constituted by time and space from changes of the position that can be taken by the object with a passage of time based on a read position and internal state of the object after reading the position and internal state of the object from the storage unit, and a prediction step of probabilistically predicting the path of the object by using the trajectory generated in the trajectory generation step.

Further, in the object path prediction method according to the present invention, in an aspect of the present invention as described above, the trajectory generation step includes an operation selection step of selecting an operation performed on the object from a plurality of operations, an object operation step of causing the operation selected in the operation selection step to be performed for a predetermined period of time, and a determination step of determining whether or not the position and the internal state of the object after the operation selected is performed in the object operation step satisfy control conditions concerning control of the object and movement conditions concerning movable areas of the object, wherein a set of processing from the operation selection step to the determination step is repeatedly performed until a trajectory generation time in which the trajectory is generated has reached.

Further, in the object path prediction method according to the present invention, in an aspect of the present invention as described above, the operation selection step selects an operation in accordance with an operation selection probability granted to each of the plurality of operations, and if, as a result of determination in the determination step, the position and the internal state of the object satisfy the control conditions and the movement conditions, the time is set forward before returning to the operation selection step.

Further, in the object path prediction method according to the present invention, in an aspect of the present invention as described above, the operation selection probability is defined by using random numbers.

Further, in the object path prediction method according to the present invention, in an aspect of the present invention as described above, a number of trajectories to be generated in the trajectory generation step is previously set.

Further, in the object path prediction method according to the present invention, in an aspect of the present invention as described above, if, as a result of determination in the determination step, the control conditions and the movement conditions are satisfied, all selectable operations are caused to be performed by setting forward the time and making a recursion.

Further, in the object path prediction method according to the present invention, in an aspect of the present invention as described above, the storage unit stores the position and the internal state of a plurality of objects and the trajectory generation step generates trajectories of each of the plurality of objects in the space-time.

Further, the object path prediction method according to the present invention, in an aspect of the present invention as described above, the prediction step specifies one object from the plurality of objects and calculates existing probabilities in the space-time of objects other than the specified object.

Further, the object path prediction method according to the present invention, in an aspect of the present invention as described above, further includes an output step of outputting information containing prediction results in the prediction step.

Further, an object path prediction method according to the present invention is an object path prediction method for predicting paths of a plurality of objects by a computer having a storage unit that stores at least positions of the plurality of objects and an internal state including a speed of each object, and includes a trajectory generation step of generating a trajectory in a space-time constituted by time and space from changes of the position that can be taken by each of the plurality of objects with a passage of time based on, after reading the positions and the internal states of the plurality of objects from the storage unit, the read positions and the internal states of the objects, a prediction step of probabilistically predicting the paths of the plurality of objects by using the trajectories generated in the trajectory generation step, and an interference level calculation step of calculating, based on results of prediction in the prediction step, a level of interference quantitatively showing an extent of interference between the paths that can be taken by the specific object and those that can be taken by other objects.

Further, the object path prediction method according to the present invention, in an aspect of the present invention as described above, the interference level calculation step increases or decreases a value of the level of interference between the specific object and each of the other objects by a specified quantity in accordance with a number of times that the specific object and each of the other objects move closer than an interference distance, which is a spatial distance at which objects interfere with each other.

Further, in the object path prediction method according to the present invention, in an aspect of the present invention as described above, the interference level calculation step increases, when the specific object and one of the other objects move closer than the interference distance, the value of the level of interference between both objects moving closer in proportion to a collision probability of the both objects in the space-time.

Further, in the object path prediction method according to the present invention, in an aspect of the present invention as described above, the interference level calculation step increases, when the specific object and one of the other objects move closer than the interference distance, the value of the level of interference between both objects moving closer in proportion to a magnitude of a relative velocity at a time when the both objects move closer.

Further, in the object path prediction method according to the present invention, in an aspect of the present invention as described above, the storage unit stores a magnitude of a relative velocity during collision between different objects by associating with a damage scale evaluation value for evaluating a scale of damage caused by the collision or an amount of damage losses caused by the collision and the interference level calculation step reads, when the specific object and one of the other objects move closer than the interference distance, the damage scale evaluation value or the amount of damage losses in accordance with the magnitude of the relative velocity at a time when both objects move closer from the storage unit and increases the level of interference between the both objects in proportion to the damage scale evaluation value or the amount of damage losses.

Further, in the object path prediction method according to the present invention, in an aspect of the present invention as described above, the interference level calculation step sets, when the time needed for the specific object and one of the other objects to move closer than the interference distance from an initial position of each object is smaller than the value of the level of interference between the both objects, the time needed from the initial position as the value of the level of interference.

Further, in the object path prediction method according to the present invention, in an aspect of the present invention as described above, the interference level calculation step adds up the value of each level of interference between the specific object and the other objects by assigning weights.

Further, in the object path prediction method according to the present invention, in an aspect of the present invention as described above, the trajectory generation step includes an operation selection step of selecting an operation performed on the object from a plurality of operations, an object operation step of causing the operation selected in the operation selection step to be performed for a predetermined period of time, and a determination step of determining whether or not the position and the internal state of the object after the operation selected is performed in the object operation step satisfy control conditions concerning control of the object and movement conditions concerning movable areas of the object, wherein a set of processing from the operation selection step to the determination step is repeatedly performed until a trajectory generation time in which the trajectory is generated has reached.

Further, in the object path prediction method according to the present invention, in an aspect of the present invention as described above, the operation selection step selects an operation in accordance with an operation selection probability granted to each of the plurality of operations, and if, as a result of determination in the determination step, the position and the internal state of the object satisfy the control conditions and the movement conditions, the time is set forward before returning to the operation selection step.

Further, in the object path prediction method according to the present invention, in an aspect of the present invention as described above, the operation selection probability is defined by using random numbers.

Further, in the object path prediction method according to the present invention, in an aspect of the present invention as described above, a number of trajectories to be generated in the trajectory generation step is previously set.

Further, the object path prediction method according to the present invention, in an aspect of the present invention as described above, further includes an output step of outputting information in accordance with the level of interference calculated in the interference level calculation step.

Further, the object path prediction method according to the present invention, in an aspect of the present invention as described above, further includes a path selection step of selecting a path to be taken by the specific object contained in the plurality of objects in accordance with the level of interference calculated in the interference level calculation step.

Further, in the object path prediction method according to the present invention, in an aspect of the present invention as described above, the level of interference has a smaller value as an extent of interference between paths that can be taken by the specific object and those that can be taken by the other objects decreases and the path selection step selects a path whose level of interference is minimum.

Further, in the object path prediction method according to the present invention, in an aspect of the present invention as described above, the path selection step selects, when there is a plurality of paths whose level of interference is minimum, a path that best matches a predetermined additional selection criterion from the plurality of paths.

Further, in the object path prediction method according to the present invention, in an aspect of the present invention as described above, the level of interference has a larger value as an extent of interference between paths that can be taken by the specific object and those that can be taken by the other objects decreases and the path selection step selects a path whose level of interference is maximal.

Further, in the object path prediction method according to the present invention, in an aspect of the present invention as described above, the path selection step selects, when there is a plurality of paths whose level of interference is maximal, a path that best matches a predetermined additional selection criterion from the plurality of paths.

Further, the object path prediction method according to the present invention, in an aspect of the present invention as described above, further includes an actuating signal transmission step of transmitting, after generating an actuating signal in accordance with a history of positions of a path selected in the path selection step and an operation sequence for realizing the path, the generated actuating signal to an outside.

Further, in the object path prediction method according to the present invention, in an aspect of the present invention as described above, the interference level calculation step increases or decreases the value of the level of interference between the specific object and each of the other objects by a specified quantity in accordance with a number of times that the specific object and each of the other objects move closer than an interference distance, which is a spatial distance at which objects interfere with each other.

Further, in the object path prediction method according to the present invention, in an aspect of the present invention as described above, the interference level calculation step adds up the value of each level of interference between the specific object and the other objects by assigning weights.

Further, in the object path prediction method according to the present invention, in an aspect of the present invention as described above, the trajectory generation step includes an operation selection step of selecting an operation performed on the object from a plurality of operations, an object operation step of causing the operation selected in the operation selection step to be performed for a predetermined period of time, and a determination step of determining whether or not the position and the internal state of the object after the operation selected is performed in the object operation step satisfy control conditions concerning control of the object and movement conditions concerning movable areas of the object, wherein a set of processing from the operation selection step to the determination step is repeatedly performed until a trajectory generation time in which the trajectory is generated has reached.

Further, the object path prediction method according to the present invention, in an aspect of the present invention, further includes an output step of outputting information concerning the path selected in the path selection step.

An object path prediction apparatus according to the present invention includes a storage unit that stores at least a position of an object and an internal state including a speed of the object, a trajectory generation unit that generates a trajectory in a space-time constituted by time and space from changes of the position that can be taken by the object with a passage of time based on a read position and internal state of the object after reading the position and the internal state of the object from the storage unit, and a prediction unit that probabilistically predicts the path of the object by using the trajectory generated by the trajectory generation unit.

Further, in the object path prediction apparatus according to the present invention, in an aspect of the present invention as described above, the trajectory generation unit includes an operation selection unit that selects an operation performed on the object from a plurality of operations, an object operation unit that causes the operation selected by the operation selection unit to be performed for a predetermined period of time, and a determination unit that determines whether or not the position and the internal state of the object after the operation selected is performed by the object operation unit satisfy control conditions concerning control of the object and movement conditions concerning movable areas of the object, wherein a set of processing from operation selection processing by the operation selection unit to determination processing by the determination unit is repeatedly performed until a trajectory generation time in which the trajectory is generated has reached.

Further, the object path prediction apparatus according to the present invention, in an aspect of the present invention as described above, the operation selection unit selects an operation in accordance with an operation selection probability granted to each of the plurality of operations, and if, as a result of determination by the determination unit, the position and the internal state of the object satisfy the control conditions and the movement conditions, the time is set forward before returning to the operation selection processing by the operation selection unit.

Further, the object path prediction apparatus according to the present invention, in an aspect of the present invention as described above, the operation selection probability is defined by using random numbers.

Further, the object path prediction apparatus according to the present invention, in an aspect of the present invention, a number of trajectories to be generated by the trajectory generation unit is previously set.

Further, the object path prediction apparatus according to the present invention, in an aspect of the present invention as described above, if, as a result of determination by the determination unit, the control conditions and the movement conditions are satisfied, all selectable operations are caused to be performed by setting forward the time and making a recursion.

Further, in the object path prediction apparatus according to the present invention, in an aspect of the present invention as described above, the storage unit stores the position and the internal state of a plurality of objects and the trajectory generation unit generates trajectories of each of the plurality of objects in the space-time.

Further, in the object path prediction apparatus according to the present invention, in an aspect of the present invention as described above, the prediction unit specifies one object from the plurality of objects and calculates existing probabilities in the space-time of objects other than the specified object.

Further, the object path prediction apparatus according to the present invention, in an aspect of the present invention as described above, further includes an output unit that outputs information containing prediction results by the prediction unit.

An object path prediction apparatus according to the present invention includes a storage unit that stores at least positions of a plurality of objects and an internal state including a speed of each object, a trajectory generation unit that generates a trajectory in a space-time constituted by time and space from changes of the position that can be taken by each of the plurality of objects with a passage of time based on, after reading the positions and the internal states of the plurality of objects from the storage unit, the read positions and the internal states of the objects, a prediction unit that probabilistically predicts the paths of the plurality of objects by using the trajectories generated by the trajectory generation unit, and an interference level calculation unit that calculates, based on results of prediction by the prediction unit, a level of interference quantitatively showing an extent of interference between the paths that can be taken by the specific object and those that can be taken by other objects.

Further, in the object path prediction apparatus according to the present invention, in an aspect of the present invention as described above, the interference level calculation unit increases or decreases a value of the level of interference between the specific object and each of the other objects by a specified quantity in accordance with a number of times that the specific object and each of the other objects move closer than an interference distance, which is a spatial distance at which objects interfere with each other.

Further, in the object path prediction apparatus according to the present invention, in an aspect of the present invention as described above, the interference level calculation unit increases, when the specific object and one of the other objects move closer than the interference distance, the value of the level of interference between both objects moving closer in proportion to a collision probability of the both objects in the space-time.

Further, in the object path prediction apparatus according to the present invention, in an aspect of the present invention as described above, the interference level calculation unit increases, when the specific object and one of the other objects move closer than the interference distance, the value of the level of interference between both objects moving closer in proportion to a magnitude of a relative velocity at a time when the both objects move closer.

Further, in the object path prediction apparatus according to the present invention, in an aspect of the present invention as described above, the storage unit stores a magnitude of a relative velocity during collision between different objects by associating with a damage scale evaluation value for evaluating a scale of damage caused by the collision or an amount of damage losses caused by the collision and the interference level calculation unit reads, when the specific object and one of the other objects move closer than the interference distance, the damage scale evaluation value or the amount of damage losses in accordance with the magnitude of the relative velocity at a time when both objects move closer from the storage unit and increases the level of interference between the both objects in proportion to the damage scale evaluation value or the amount of damage losses.

Further, in the object path prediction apparatus according to the present invention, in an aspect of the present invention as described above, the interference level calculation unit sets, when the time needed for the specific object and one of the other objects to move closer than the interference distance from an initial position of each object is smaller than the value of the level of interference between the both objects, the time needed from the initial position as the value of the level of interference.

Further, in the object path prediction apparatus according to the present invention, in an aspect of the present invention as described above, the interference level calculation unit adds up the value of each level of interference between the specific object and the other objects by assigning weights.

Further, in the object path prediction apparatus according to the present invention, in an aspect of the present invention as described above, the trajectory generation unit includes an operation selection unit that selects an operation performed on the object from a plurality of operations, an object operation unit that causes the operation selected by the operation selection unit to be performed for a predetermined period of time, and a determination unit that determines whether or not the position and the internal state of the object after the operation selected is performed by the object operation unit satisfy control conditions concerning control of the object and movement conditions concerning movable areas of the object, wherein a set of processing from operation selection processing by the operation selection unit to determination processing by the determination unit is repeatedly performed until a trajectory generation time in which the trajectory is generated has reached.

Further, in the object path prediction apparatus according to the present invention, in an aspect of the present invention as described above, the operation selection unit selects an operation in accordance with an operation selection probability granted to each of the plurality of operations, and if, as a result of determination by the determination unit, the position and the internal state of the object satisfy the control conditions and the movement conditions, the time is set forward before returning to the operation selection processing by the operation selection unit.

Further, in the object path prediction apparatus according to the present invention, in an aspect of the present invention as described above, the operation selection probability is defined by using random numbers.

Further, in the object path prediction apparatus according to the present invention, in an aspect of the present invention as described above, a number of trajectories to be generated by the trajectory generation unit is previously set.

Further, the object path prediction apparatus according to the present invention, in an aspect of the present invention as described above, further includes an output unit that outputs information in accordance with the level of interference calculated by the interference level calculation unit.

Further, the object path prediction apparatus according to the present invention, in an aspect of the present invention as described above further includes a path selection unit that selects a path to be taken by the specific object in accordance with the level of interference calculated by the interference level calculation unit.

Further, in the object path prediction apparatus according to the present invention, in an aspect of the present invention as described above, the level of interference has a smaller value as an extent of interference between paths that can be taken by the specific object and those that can be taken by the other objects decreases and the path selection unit selects a path whose level of interference is minimum.

Further, in the object path prediction apparatus according to the present invention, in an aspect of the present invention as described above, the path selection unit selects a path that best matches a predetermined additional selection criterion from the plurality of paths when there is a plurality of paths whose level of interference is minimum.

Further, in the object path prediction apparatus according to the present invention, in an aspect of the present invention as described above, the level of interference has a larger value as an extent of interference between paths that can be taken by the specific object and those that can be taken by the other objects decreases and the path selection unit selects a path whose level of interference is maximal.

Further, in the object path prediction apparatus according to the present invention, in an aspect of the present invention as described above, the path selection unit selects, when there is a plurality of paths whose level of interference is maximal, a path that best matches a predetermined additional selection criterion from the plurality of paths.

Further, the object path prediction apparatus according to the present invention, in an aspect of the present invention as described above, further includes an actuating signal transmission unit that transmits, after generating an actuating signal in accordance with a history of positions of a path selected by the path selection unit and an operation sequence for realizing the path, the generated actuating signal to an outside.

Further, in the object path prediction apparatus according to the present invention, in an aspect of the present invention as described above, the interference level calculation unit increases or decreases the value of the level of interference between the specific object and each of the other objects by a specified quantity in accordance with a number of times that the specific object and each of the other objects move closer than an interference distance, which is a spatial distance at which objects interfere with each other.

Further, in the object path prediction apparatus according to the present invention, in an aspect of the present invention as described above, the interference level calculation unit adds up the value of each level of interference between the specific object and the other objects by assigning weights.

Further, in the object path prediction apparatus according to the present invention, in an aspect of the present invention as described above, the trajectory generation unit includes an operation selection unit that selects an operation performed on the object from a plurality of operations, an object operation unit that causes the operation selected by the operation selection unit to be performed for a predetermined period of time, and a determination unit that determines whether or not the position and the internal state of the object after the operation selected is performed by the object operation unit satisfy control conditions concerning control of the object and movement conditions concerning movable areas of the object, wherein a set of processing from operation selection processing by the operation selection unit to determination processing by the determination unit is repeatedly performed until a trajectory generation time in which the trajectory is generated has reached.

Further, the object path prediction apparatus according to the present invention, in an aspect of the present invention as described above, further includes an output unit that outputs information concerning the path selected by the path selection unit.

An object path prediction program according to the present invention causes the computer to perform the object path prediction method according to any one of the aspects of the present invention described above.

An automatic operation system according to the present invention is an automatic operation system for automatically operating a vehicle by being mounted on the vehicle, and includes the object path prediction apparatus according to any one of the aspects of the present invention described above, and an actuator apparatus that realizes a path selected by the path selection unit provided in the object path prediction apparatus and operating the vehicle in accordance with an actuating signal.

EFFECT OF THE INVENTION

According to an object path prediction method, apparatus, and program, and an automatic operation system in the present invention, safety can be secured even in situations that can actually occur.

Figure 1:
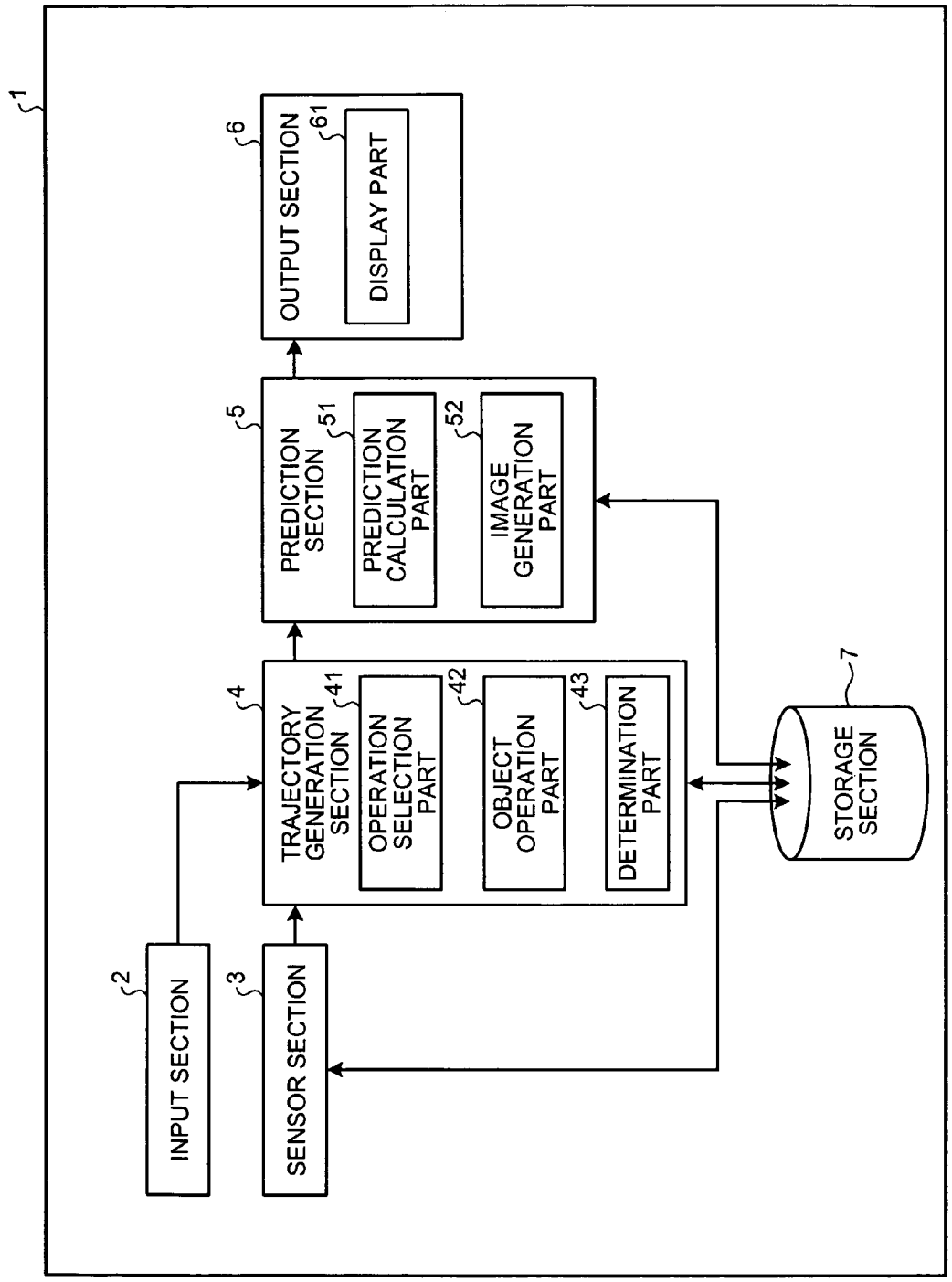
FIG. 1 is a block diagram showing a functional configuration of an object path prediction apparatus according to a first embodiment of the present invention.

EXPLANATIONS OF LETTERS OF NUMERALS 1, 101, 201 Object path prediction apparatus
2 Input section
3 Sensor section
4 Trajectory generation section (trajectory generation unit)
5, 105 Prediction section (prediction unit)
6, 107, 209 Output section (output unit)
7, 108, 210 Storage section (storage unit)
41 Operation selection part (operation selection unit)
42 Object operation part (object operation unit)
43 Determination part (determination unit)
51 Prediction calculation part
52 Image generation part
61, 171, 291 Display part
106 Interference level calculation part (interference level calculation unit)
172, 292 Warning beep generation part
207 Path selection part (path selection unit)
208 Actuating signal transmission part (actuating signal transmission unit)
211 Actuator apparatus
1000 Automatic operation system
$B_1, B_2, B_3$ Path
CN Display screen
$D_a, D_b$ Area
$Env(P_1, P_2)$, $Env'(P_1, P_2)$, $Env(P_1, P_2, P_3)$ Space-time environment
F Front glass
H Arrow
$O_1, O_2, O_3$ Object
R, Rd Road
ST Steering

BEST MODES FOR CARRYING OUT THE INVENTION

Best modes for carrying out the present invention (hereinafter, referred to as "embodiments") will be described below with reference to attached drawings.

(First Embodiment)

FIG. 1 is a block diagram showing a functional configuration of an object path prediction apparatus according to a first embodiment of the present invention. An object path prediction apparatus 1 shown in the figure is an apparatus mounted on a movable body such as a four-wheel vehicle to detect objects present within a predetermined range around subject vehicle and to predict paths of detected objects and subject vehicle.

The object path prediction apparatus 1 includes an input section 2 into which various kinds of information are input from outside, a sensor section 3 for detecting positions and internal states of objects present within a predetermined range, a trajectory generation section 4 for generating a trajectory in space-time constituted by time and space from changes of the positions that can be taken by an object with the passage of time based on results detected by the sensor section 3, a prediction section 5 for making a probabilistic prediction about the path of the object using the trajectory generated by the trajectory generation section 4, an output section 6 for outputting various kinds of information including at least results of predictions made by the prediction section 5, and a storage section 7 for storing information including trajectories in space-time generated by the trajectory generation section 4 and results of predictions made by the prediction section 5.

The input section 2 has a function of entering various kinds of setting information and the like for predicting paths of objects and is realized by using a remote controller, a keyboard (including a touch panel type on which input operations can be performed on the screen), a pointing device (such as a mouse and a trackpad) and the like. A microphone through which entries of information by voice can be made may be provided as the input section 2. If various kinds of setting information are preset, the storage section 7 having a ROM (Read Only Memory) or the like in which such information is stored may substitute for the function of the input section 2.

The sensor section 3 is realized by using a millimeter wave radar, a laser radar, an image sensor or the like. The sensor section 3 has various kinds of sensors such as a speed sensor, an acceleration sensor, a rudder angle sensor, and an angular velocity sensor, and can also detect a moving situation of subject vehicle. An internal state of an object detected by the sensor section 3 is a useful state that can be used for predictions of the object and is preferably a physical quantity such as a velocity (having a speed and a direction) and an angular velocity (having a magnitude and a direction). Naturally, a case in which such physical quantities take the value of 0 (a state in which the object is at rest) is also included.

The trajectory generation section 4 predicts and generates trajectories that an object can follow before a predetermined time elapses and has an operation selection part 41 for selecting an operation for causing an object to virtually move in a simulation from a plurality of operations, an object operation part 42 for performing the operation selected by the operation selection part 41 for a predetermined period of time, and a determination part 43 for determining whether or not the position and internal state of the object after the operation by the object operation part 42 satisfy predetermined conditions.

The prediction section 5 has a prediction calculation part 51 for performing probabilistic prediction calculations by using a trajectory of each object output from the trajectory generation section 4 and an image generation part 52 for generating images to be displayed and output by the output section 6 in accordance with results of prediction calculations by the prediction calculation part 51.

The output section 6 has a display part 61 for displaying and outputting an image generated by the image generation part 52 in the prediction section 5. The display part 61 is realized by using a display of liquid crystal, plasma, electroluminescence and the like. In the first embodiment, a projector is set up in an upper part behind a driver's seat as the display part 61. The projector has a function that allows a display by superimposition on the front glass of a four-wheel vehicle. A speaker outputting voice information to the outside may be provided as the output section 6.

The storage section 7 stores, in addition to detection results by the sensor section 3, trajectories generated by the trajectory generation section 4, prediction results by the prediction section 5, operations selected by the operation selection part 41 in the trajectory generation section 4 and the like. The storage section 7 is realized by using a ROM in which a program for starting a predetermined OS (Operation System), an object path prediction program according to the first embodiment and the like are stored in advance and a RAM (Random Access Memory) in which operation parameters, data and the like are stored. The storage section 7 can also be realized by providing for the object path prediction apparatus 1 an interface into which a computer-readable recording medium can be equipped and equipping a recording medium corresponding to the interface.

The object path prediction apparatus 1 having the above functional configuration is an electronic apparatus (computer) provided with a CPU (Central Processing Unit) having operational and control functions. The CPU provided with the object path prediction apparatus 1 performs processing for the object path prediction method according to the first embodiment by reading information stored in the storage section 7 and various programs including the object path prediction program from the storage section 7. The object path prediction program according to the first embodiment can widely be distributed by recording the object path prediction program in a computer readable recording medium such as a hard disk, flexible disk, CD-ROM, DVD-ROM, flash memory, MO disk and the like.

Figure 2:
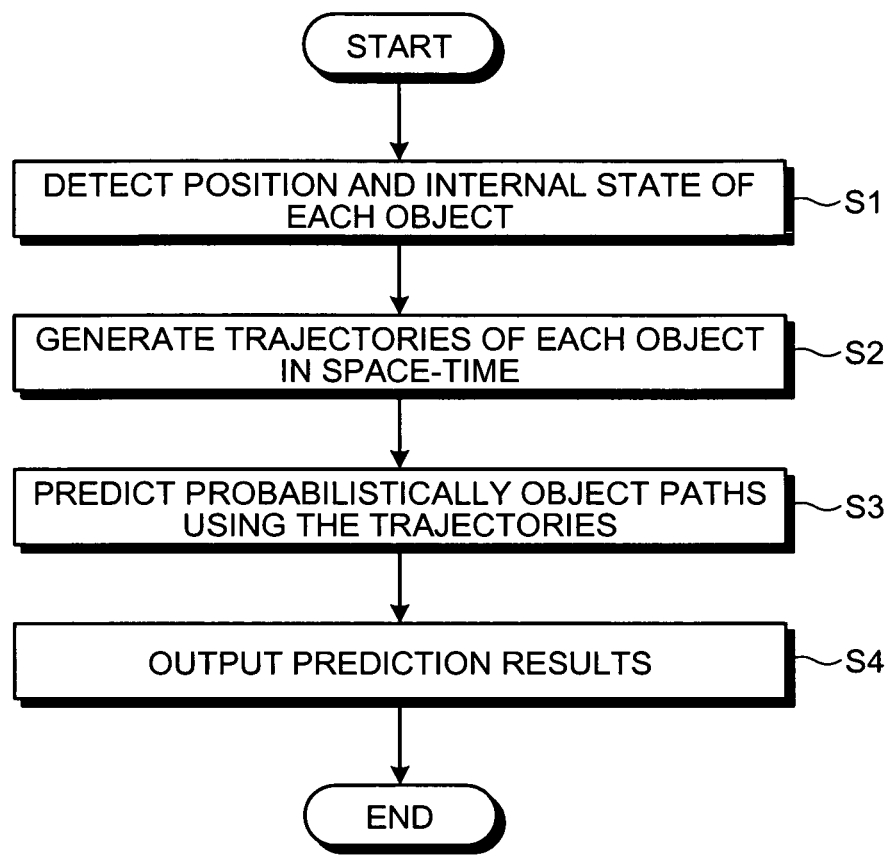
FIG. 2 is a flowchart showing an overview of an object path prediction method according to the first embodiment of the present invention.

Next, the object path prediction method according to the first embodiment of the present invention will be described. FIG. 2 is a flowchart showing a process overview of the object path prediction method according to the first embodiment. In a description that follows, all objects to be predicted are assumed to move on a two-dimensional plane.

First, the sensor section 3 detects positions and internal states of objects within a predetermined range with respect to subject vehicle and stores detected information in the storage section 7 (step S1). Hereinafter, it is assumed that the position of an object is denoted by values of the center of the object and the internal state of an object is specified by a velocity (speed v, direction θ). At step S1, the internal state of subject vehicle is also naturally detected and stored in the storage section 7.

Figure 3:
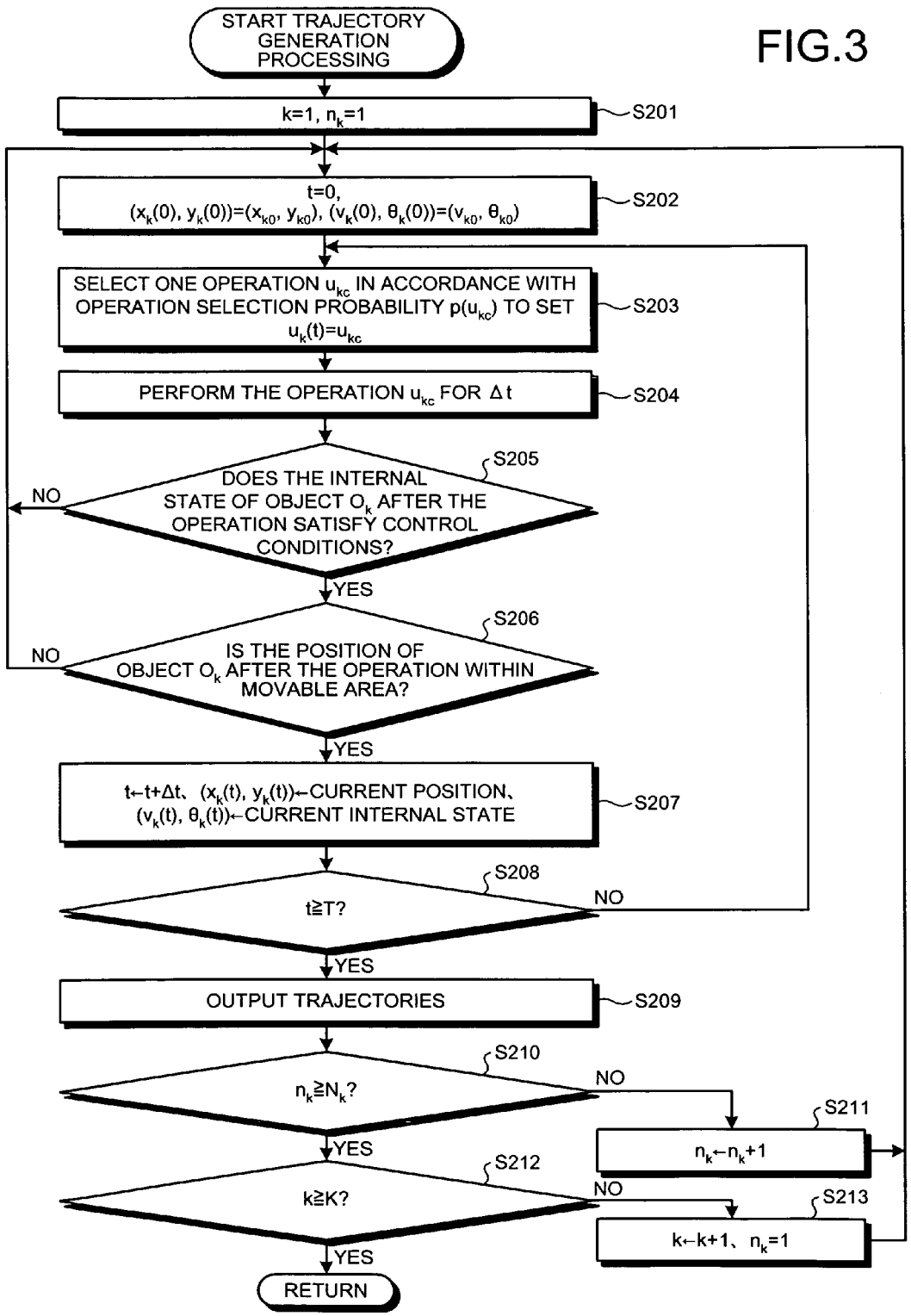
FIG. 3 is a flowchart showing the overview of trajectory generation processing by the object path prediction method according to the first embodiment of the present invention.

Next, the trajectory generation section 4 generates trajectories for each object by using detection results input by the sensor section 3 (step S2). FIG. 3 is a flowchart showing details of trajectory generation processing by the trajectory generation section 4. In the figure, it is assumed that the total number of objects (including subject vehicle) detected by the sensor section 3 is K and an operation to generate a trajectory for one object $O_k$ ($1 \leq k \leq K$, k is a natural number) is performed $N_k$ times (in this sense, both K and $N_k$ are natural numbers). The time during which a trajectory is generated (trajectory generation time) is assumed to be T (>0).

In the first embodiment, changes of the outside world such as paths of other vehicles can be predicted within a practical calculation time by setting the trajectory generation time T (and an operation time Δt described later) appropriately. This applies also to other embodiments of the present invention.

First, the value of a counter k to identify objects is initialized to 1 and also a counter $n_k$ indicating the number of times of trajectory generation for the same object $O_k$ is initialized to 1 (step S201). Hereinafter, processing will be described by referring to the ordinary object $O_k$.

Next, the trajectory generation section 4 reads results detected by the sensor section 3 from the storage section 7 and sets the read detection results as an initial state (step S202). More specifically, the time t is set to 0 and the initial position $(x_k(0), y_k(0))$ and the initial internal state $(v_k(0), \theta_k(0))$ are set to input information $(x_{k0}, y_{k0})$ and $(v_{k0}, \theta_{k0})$ from the sensor section 3 respectively.

Subsequently, the operation selection part 41 selects an operation $u_k(t)$ to be performed in the following time Δt from the plurality of selectable operations in accordance with an operation selection probability attached in advance to each operation (step S203). The operation selection probability $p(u_{kc})$ to select the operation $u_{kc}$ is defined, for example, by associating elements of a set $\{u_{kc}\}$ of selectable operations as $u_k(t)$ and predetermined random numbers. In this sense, a different operation selection probability $p(u_{kc})$ may be granted to each operation $u_{kc}$ or an equal probability may be granted to all elements in the operation set $\{u_{kc}\}$. In the latter case, $p(u_{kc})=1/$(the number of all selectable operations) holds. It is also possible to define the operation selection probability $p(u_{kc})$ as a function dependent on the position and internal state of subject vehicle and also a surrounding road environment.

The operation $u_{kc}$ is generally constituted by a plurality of elements and content of selectable operations depends on the type of object $O_k$. If, for example, the object $O_k$ is a four-wheel vehicle, the acceleration or angular velocity of the four-wheel vehicle is determined by how the steering wheel is turned or the accelerator is stepped on. In consideration of this, the operation $u_{kc}$ performed on the object $O_k$, which is a four-wheel vehicle, is determined by elements including acceleration and angular velocity. In contrast, if the object $O_k$ is a person, the operation $u_{kc}$ can be specified by a speed.

A more concrete setting example of the operation $u_{kc}$ will be given. If the object $O_k$ is an automobile, the acceleration is set in the range of −10 to +30 (km/h/sec) and the steering angle in the range of −7 to +7 (deg/sec) (in both cases, the direction is specified by the sign). If the object $O_k$ is a person, the speed is set in the range of 0 to +36 (km/h) and the direction in the range of 0 to 360 (deg). Quantities described here are all continuous quantities. In such a case, the number of elements of each operation may be made finite by performing appropriate discretization to constitute a set $\{u_{kc}\}$ of each operation.

Then, the object operation part 42 causes the operation $u_{kc}$ selected at step S203 to perform for the time $\Delta t$ (step S204). The time $\Delta t$ is preferably small in terms of precision, but may practically be a value of about 0.1 to 0.5 (sec). In a description that follows, the trajectory generation time T is assumed to be an integral multiple of $\Delta t$, however, the value of T may be variable in accordance with the speed of the object $O_k$ and may not be an integral multiple of $\Delta t$.

Subsequently, the determination part 43 determines whether or not the internal state of the object $O_k$ after causing the operation $u_{kc}$ to be performed at step S204 satisfies predetermined control conditions (step S205) and also determines whether or not the position of the object $O_k$ after causing the operation $u_{kc}$ to be performed is within a movable area (step S206). The control conditions used for determination at step S205 are determined in accordance with the type of object $O_k$ and, if, for example, the object $O_k$ is a four-wheel vehicle, are determined by the range of speed after the operation at step S204, a vehicle G of maximal acceleration after the operation at step S204 and the like. The movable area determined at step S206, on the other hand, refers to an area of roads (including roadways and footways) and the like. When an object is positioned in a movable area, an expression of "moving conditions are satisfied" will be used below.

If, as a result of the determination by the determination part 43, any of the conditions is not satisfied (No at step S205 or No at step S206), the process returns to step S202. In contrast, if, as a result of the determination by the determination part 43, the position and internal state of the object $O_k$ after the operation $u_{kc}$ at step S204 satisfy all conditions (Yes at step S205 and Yes at step S206), the time is put forward by $\Delta t$ ($t \leftarrow t+\Delta t$) and the position after the operation at step S204 is set as $(x_k(t), y_k(t))$ and the internal state as $(v_k(t), \theta_k(t))$ (step S207).

Processing at steps S202 to S207 described above is repeatedly performed until the trajectory generation time T passes. That is, if the time t newly generated at step S207 has not reached T (No at step S208), processing is repeated by returning to step S203. If, on the other hand, the time t newly generated at step S207 reaches T (Yes at step S208), a trajectory for the object $O_k$ is output and stored in the storage section 7 (step S209).

Figure 4:
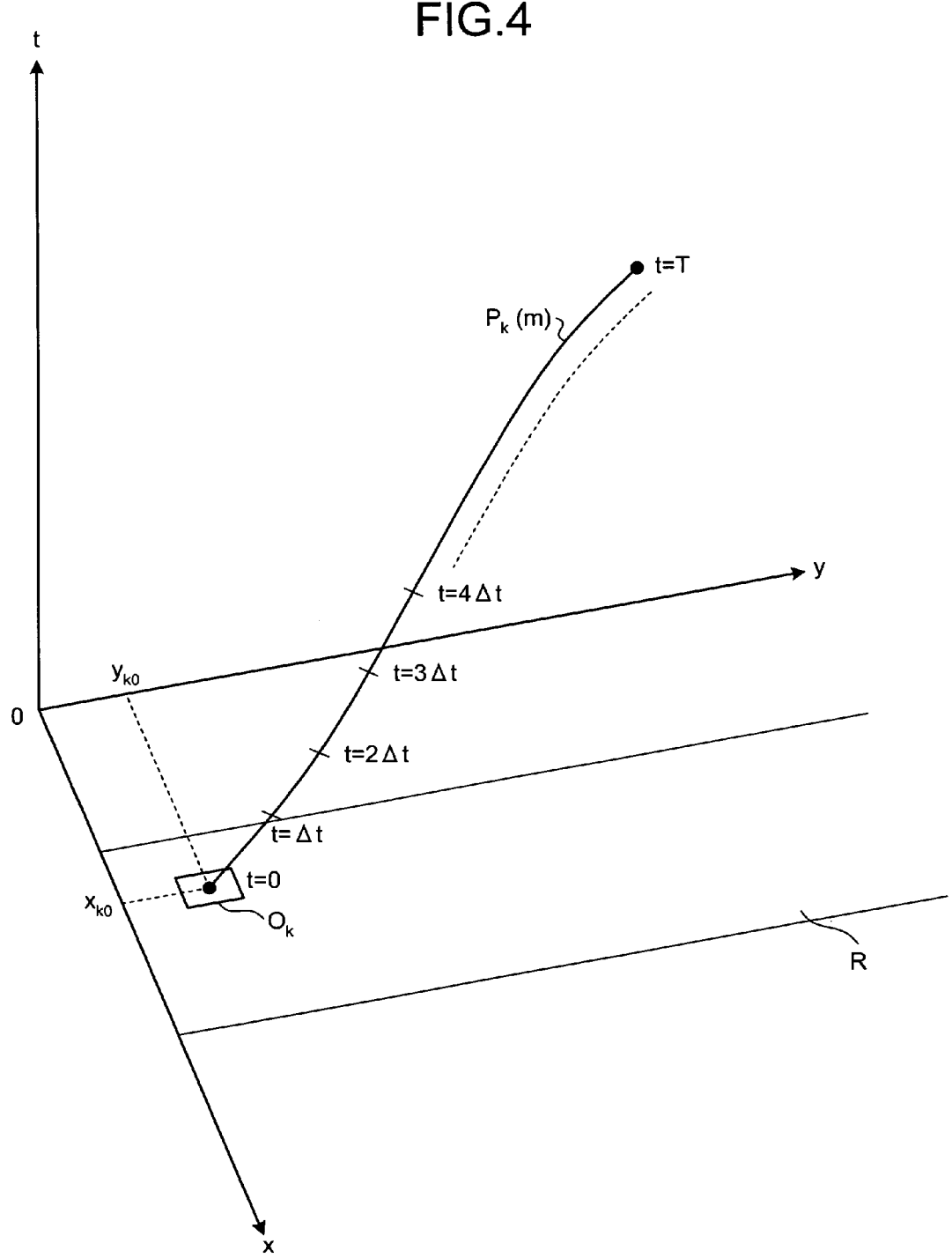
FIG. 4 is a diagram schematically showing a trajectory generated in a three-dimensional space-time.

FIG. 4 is a diagram schematically showing a trajectory of the object $O_k$ generated by repeating a set of processing ranging from step S203 to step S207 at times t=0, $\Delta t$, $2\Delta t$, ..., T.

A trajectory $P_k(m)$ ($1 \leq m \leq N_k$, m is a natural number) shown in the figure passes through a three-dimensional space-time (x, y, t) of two dimensions (x, y) of space and one dimension (t) of time. By projecting the $P_k(m)$ onto an x-y plane, a predicted path of the object $O_k$ in the two-dimensional space (x, y) can be obtained.

If, after step S209, the value of the counter $n_k$ has not reached $N_k$ (No at step S210), the value of the counter $n_k$ is incremented by 1 (step S211) and processing at steps S202 to S207 is performed repeatedly by returning to step S202 until the trajectory generation time T has reached.

Figure 5:
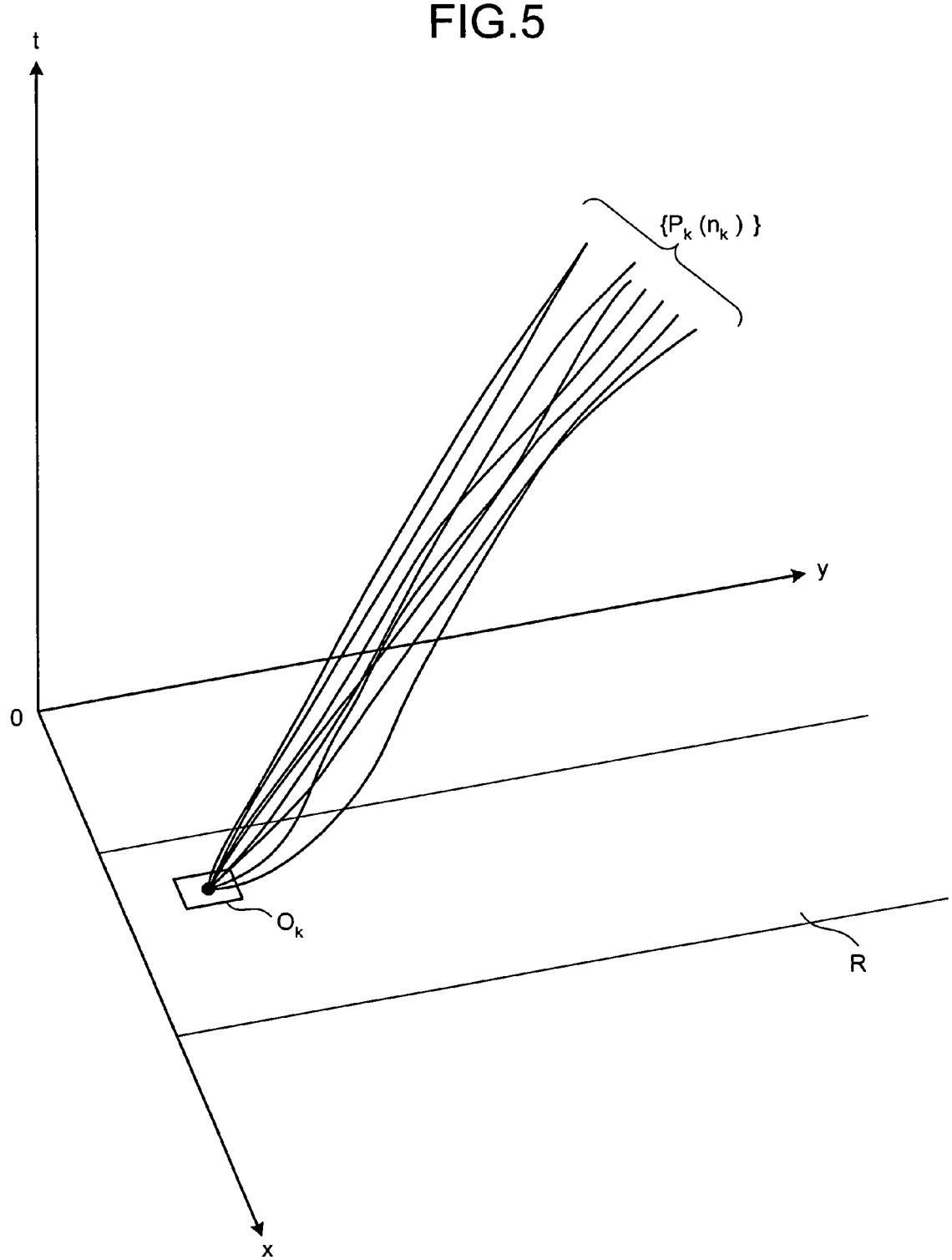
FIG. 5 is a diagram schematically showing a set of trajectories generated in the three-dimensional space-time.

If the counter $n_k$ reaches $N_k$ at step S210 (Yes at step S210), generation of the entire trajectories for the object $O_k$ is completed. FIG. 5 is an explanatory view schematically showing a set of trajectories $\{P_k(n_k)\}$ consisting of $N_k$ trajectories $P_k(1), P_k(2), \ldots, P_k(N_k)$ generated for one object $O_k$ in the three-dimensional space-time. The starting point of each trajectory constituting an element of the set of trajectories $\{P_k(n_k)\}$, that is, the initial position $(x_{k0}, y_{k0}, t)$ is the same (Refer to step S202). Incidentally, FIG. 5 is strictly a schematic diagram and the value of $N_k$ can take such values as several hundred to several tens of thousand.

If the counter $n_k$ reaches $N_k$ at step S210 and the counter k for object identification has not reached the total number K of the objects (No at step S212), the value of the counter k is incremented by 1 and the value of the counter $n_k$ of the number of times of trajectory generation is initialized to 1 (step S213) before returning to step S202 to repeat the processing. In contrast, if the counter k of the objects reaches K (Yes at step S212), trajectory generation for all objects has been completed and the trajectory generation processing at step S2 is terminated before proceeding to step S3 that follows.

Figure 6:
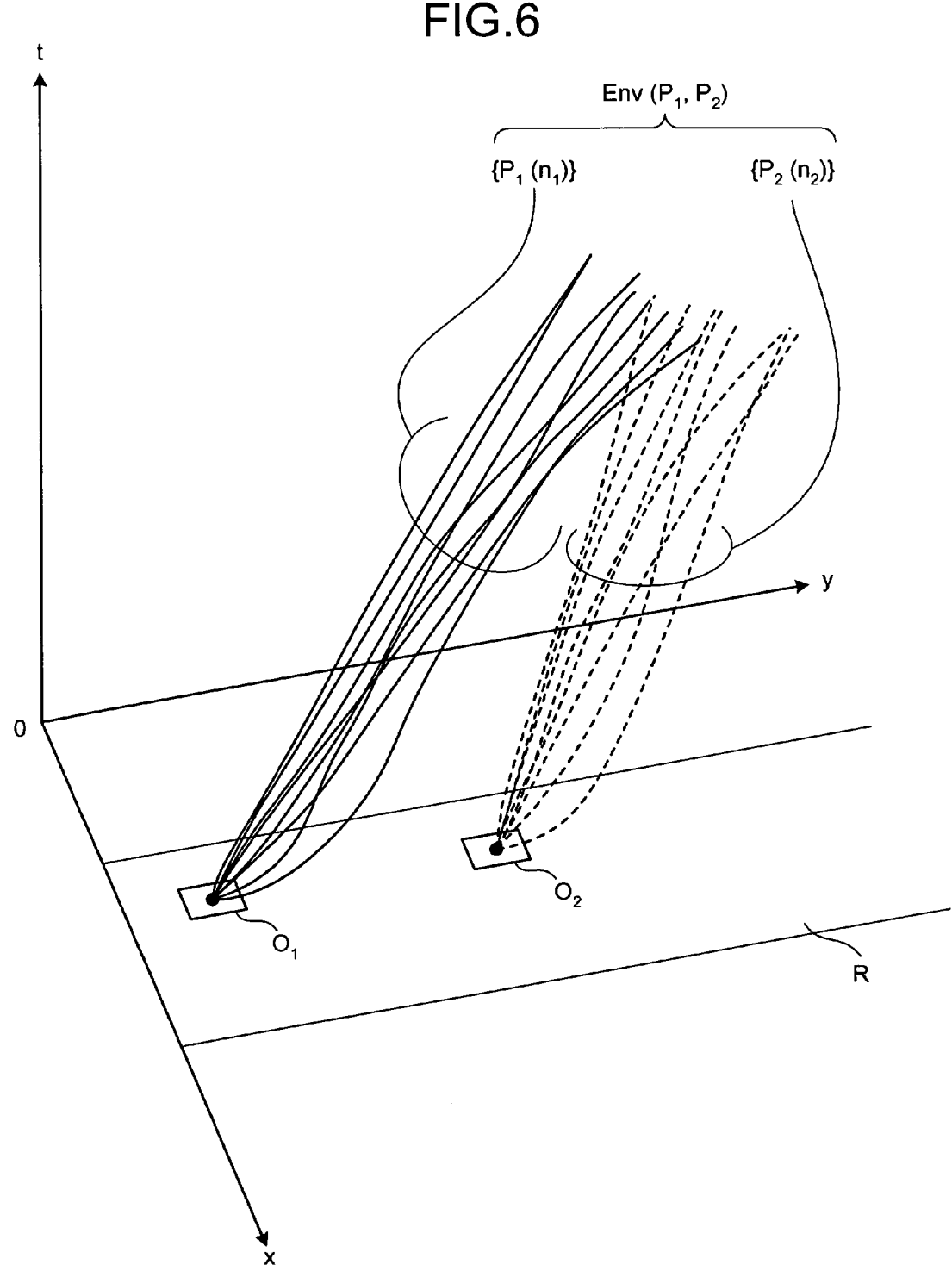
FIG. 6 is an explanatory diagram schematically showing a configuration of a space-time environment formed by the object path prediction method according to the first embodiment of the present invention.

By performing trajectory generation processing for a predetermined number of times for all objects detected by the sensor section 3, as described above, a space-time environment consisting of a set of trajectories that could be followed by a plurality of objects present within a predetermined range of the three-dimensional space-time is formed. FIG. 6 is an explanatory diagram schematically showing a configuration example of a space-time environment. A space-time environment Env($P_1$, $P_2$) shown in the figure consists of a set of trajectories $\{P_1(n_1)\}$ of an object $O_1$ (indicated by solid lines in FIG. 6) and a set of trajectories $\{P_2(n_2)\}$ of an object $O_2$ (indicated by solid lines in FIG. 6). More specifically, the space-time environment Env($P_1$, $P_2$) represents a space-time environment when the two objects $O_1$ and $O_2$ move on a flat and linear road R such as an expressway in the +y axis direction. Since, in the first embodiment, trajectories are generated independently for each object without consideration of correlations between objects, trajectories of different objects may cross in the space-time.

The density per unit volume of the set of trajectories $\{P_k(n_k)\}$ (k=1, 2) in each area of space-time in FIG. 6 gives a density of the probability of presence of the object $O_k$ in each area of the space-time (hereinafter, referred to as a "space-time probability density"). Therefore, by using the space-time environment Env($P_1$, $P_2$) constructed by the trajectory generation processing at step S2, a probability of the object $O_k$ passing through a predetermined area in the three-dimensional space-time can be determined. Since the above space-time probability density is strictly a concept of probability in a space-time, summation of values thereof in the space-time with respect to one object may not be 1.

If the trajectory generation time T should be set as a fixed value in advance, a concrete value thereof is preferably a value such that if trajectories are generated exceeding the time T, the distribution of probability density in the space-time will be uniform so that it is meaningless to calculate. If, for example, the object is a four-wheel vehicle and the four-wheel vehicle travels normally, T may be set at most to 5 (sec) or so. In this case, if the operation time Δt step S204 is about 0.1 to 0.5 (sec), a set of processing from step S203 to step S207 to generate one trajectory $P_k(m)$ will be repeated 10 to 50 times.

Incidentally, it is preferable to switch the time T, after setting the trajectory generation time T for different roads such as an expressway, an ordinary road, and a two-lane road, based on a method by which the type of road currently running is read from map data using position data or a method by which the type of road is read by a road recognition apparatus applying image recognition or the like.

It is also preferable to perform adaptive control in which, after statistically evaluating the distribution of probability density in the space-time using trajectories calculated up to the trajectory generation time T, if the distribution is uniform, the trajectory generation time T is reduced and, if the distribution is not uniform, the generation time is increased.

Further, it is also possible to make a prediction by preparing a plurality of paths that can be taken by subject vehicle in advance and using a time when the probability that the path of subject vehicle crosses that of another object becomes constant as the trajectory generation time T. In this case, a time when an increment of risk for each path that can be taken by subject vehicle after increasing the prediction time only by Δt becomes constant may also be adopted as a termination condition. In such a configuration, endpoints on the future side of the paths that can be taken by subject vehicle are naturally set to be spatially widely distributed to obtain a basis for determination of paths to be currently taken to secure safety.

After the trajectory generation processing for each object described above, the prediction section 5 makes probabilistic predictions of paths that can be taken by each object (step S3). A probability of a specific trajectory $P_k(m)$ being selected from among a set of trajectories $\{P_k(n_k)\}$ generated for the object $O_k$ is described below as concrete prediction calculation processing by the prediction calculation part 51 in the prediction section 5, but naturally this prediction calculation is only an example.

When $N_k$ trajectories of the object $O_k$ are generated, the probability that one trajectory $P_k(m)$ of $N_k$ trajectories becomes an actual trajectory is calculated as shown below. First, if the operation sequence $\{u_{km}(t)\}$ to realize the trajectory $P_k(m)$ of the object $O_k$ is $\{u_{km}(0), u_{km}(\Delta t), u_{km}(2\Delta t), \ldots u_{km}(T)\}$, the probability of the operation $u_{km}(t)$ being selected at time t is $p(u_{km}(t))$ and thus, the probability of the operation sequence $\{u_{km}(t)\}$ being performed at time t=0 to T is given by:

[Formula 1]

$$p(u_{km}(0)) \cdot p(u_{km}(\Delta t)) \cdot p(u_{km}(2\Delta t)) \ldots p(u_{km}(T)) = \prod_{t=0}^{T} p(u_{km}(t)) \quad (1)$$

Therefore, when a set of $N_k$ trajectories $\{P_k(n_k)\}$ is given to the object $O_k$, the probability $p(P_k(m))$ of one trajectory $P_k(m)$ that can be followed by the object $O_k$ being selected is given by:

[Formula 2]

$$p(P_k(m)) = \frac{\prod_{t=0}^{T} p(u_{km}(t))}{\sum_{n=1}^{N_k} \left( \prod_{t=0}^{T} p(u_{kn}(t)) \right)} \quad (2)$$

If all operations $u_{km}(t)$ are selected with an equal probability $p_0$ (where $0 < p_0 < 1$), Formula (1) is simplified to:

[Formula 3]

$$\prod_{t=0}^{T} p(u_{km}(t)) = p_o^s \quad (3)$$

Here, s is the total number of operation times Δt from t=0 to T, that is, the number of times of operation. Therefore, summation of probabilities of the trajectory $P_k(m)$ included in $N_k$ trajectories that can be followed by the object $O_k$ becomes $N_k p_0^s$ and the probability $p(P_k(m))$ of one trajectory $P_k(m)$ among them being selected is obtained by substituting Formula (3) into Formula (2)

[Formula 4]

$$p(P_k(m)) = \frac{1}{N_k} \quad (4)$$

That is, the probability $p(P_k(m))$ does not depend on the trajectory $P_k(m)$.

If, in Formula (4), the number of trajectories to be generated is the same (N) for all objects, it follows from $N_1 = N_2 = \ldots = N_k = N$ (constant) that $p(P_k(m)) = 1/N$, which shows that the probability is constant independent of the object $O_k$. By normalizing the value of the probability $p(P_k(m))$ to 1 in this case, prediction calculations by the prediction calculation part 51 can be simplified, leading to faster execution of predetermined prediction calculations. Incidentally, the probability $p(u_{km}(t))$ that the operation $u_{km}(t)$ is selected may be made to be appropriately settable or changeable by input from the input section 2.

Based on the probability $p(P_k(m))$ calculated for each object $O_k$ (k=1, 2, …, K), the prediction calculation part 51 determines a probability of presence of the object $O_k$ per unit volume in each area of the three-dimensional space-time. The probability of presence corresponds to the space-time probability density in the three-dimensional space-time of a set of trajectories $\{P_k(n_k)\}$ and an area where the density of passing trajectories is high generally has a higher probability of presence.

After operations by the prediction calculation part 51 described so far, the image generation part 52 generates image information concerning an image to be displayed by the display part 61 of the output section 6 in accordance with obtained operation results before sending out the image information to the output section 6.

Figure 7:
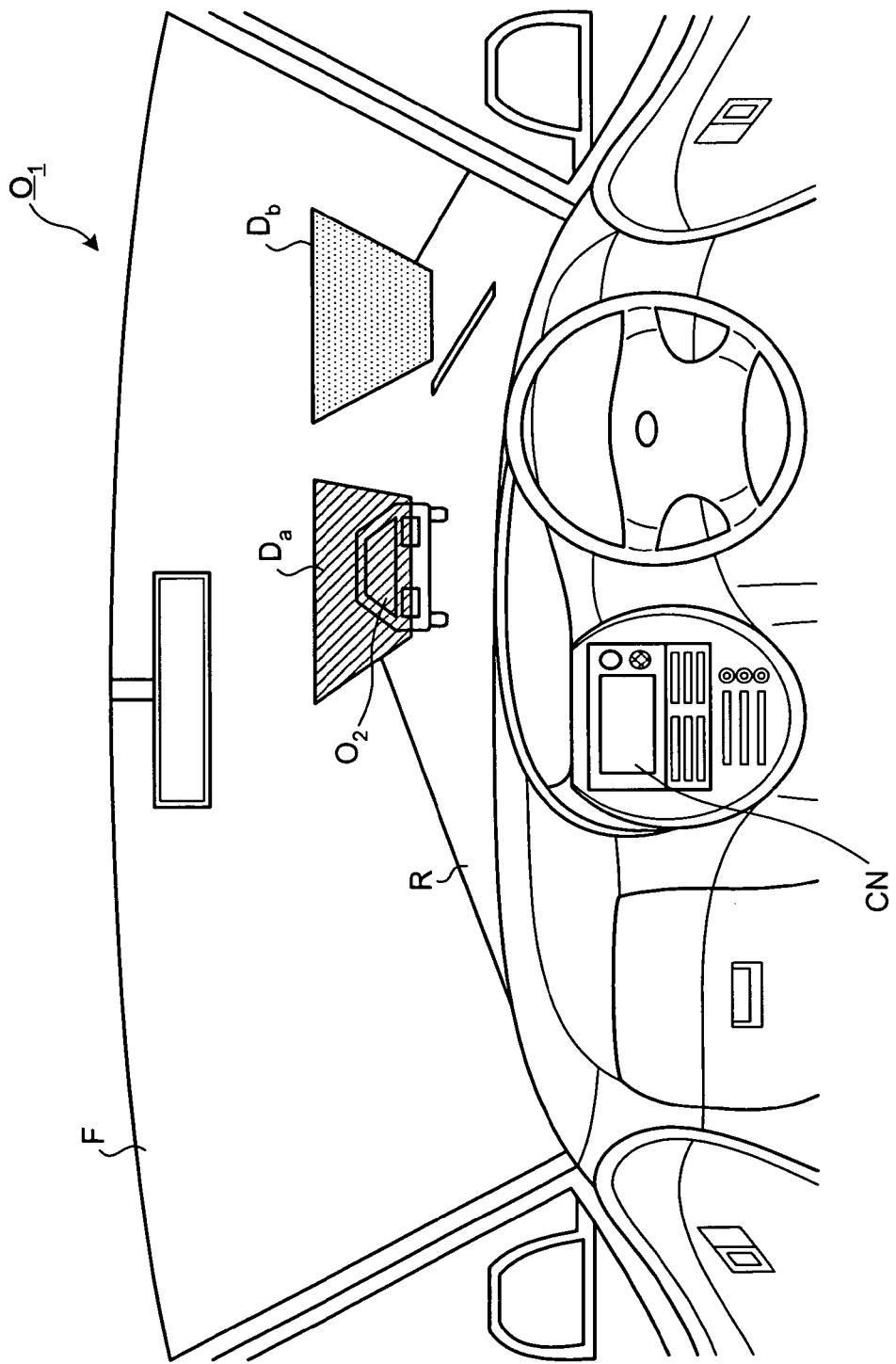
FIG. 7 is a diagram showing a display output example of prediction results by the object path prediction apparatus according to the first embodiment of the present invention.

Subsequent to step S3 described above, information in accordance with operation results by the prediction calculation part 51, that is, prediction results are displayed/output (step S4). FIG. 7 is a diagram showing a display/output example of prediction results by the display part 61 and is a diagram schematically showing a display/output example of prediction results when predictions are made by using the space-time environment Env($P_1$, $P_2$) (See FIG. 6) constituted by two objects $O_1$ (subject vehicle) and $O_2$. More specifically, FIG. 7 shows a case when an area in which the probability of presence of the other object $O_2$ after a predetermined time exceeds a predetermined threshold is displayed by translucent superimposition on a front glass F of the object $O_1$ (subject vehicle). An area $D_a$ and an area $D_b$ displayed translucently have different illumination (The area $D_a$ is brighter). Such a difference in illumination reflects prediction results by the prediction calculation part 51 and a translucent area having different illumination is displayed by superimposition on the front glass F in accordance with the value of the determined probability of presence.

The above display by superimposition is realized by projecting an image generated by the image generation part 52 from a projector (which is part of the output section 6 and is not shown) set up in an upper part behind a driver's seat of the object $O_1$ onto the front glass F. Accordingly, the driver of the object $O_1$ can immediately recognize an area where possible danger lurks in the near future while driving viewing in the forward direction of subject vehicle. Therefore, danger can precisely be avoided by causing the recognition results to be reflected in driving.

Figure 8:
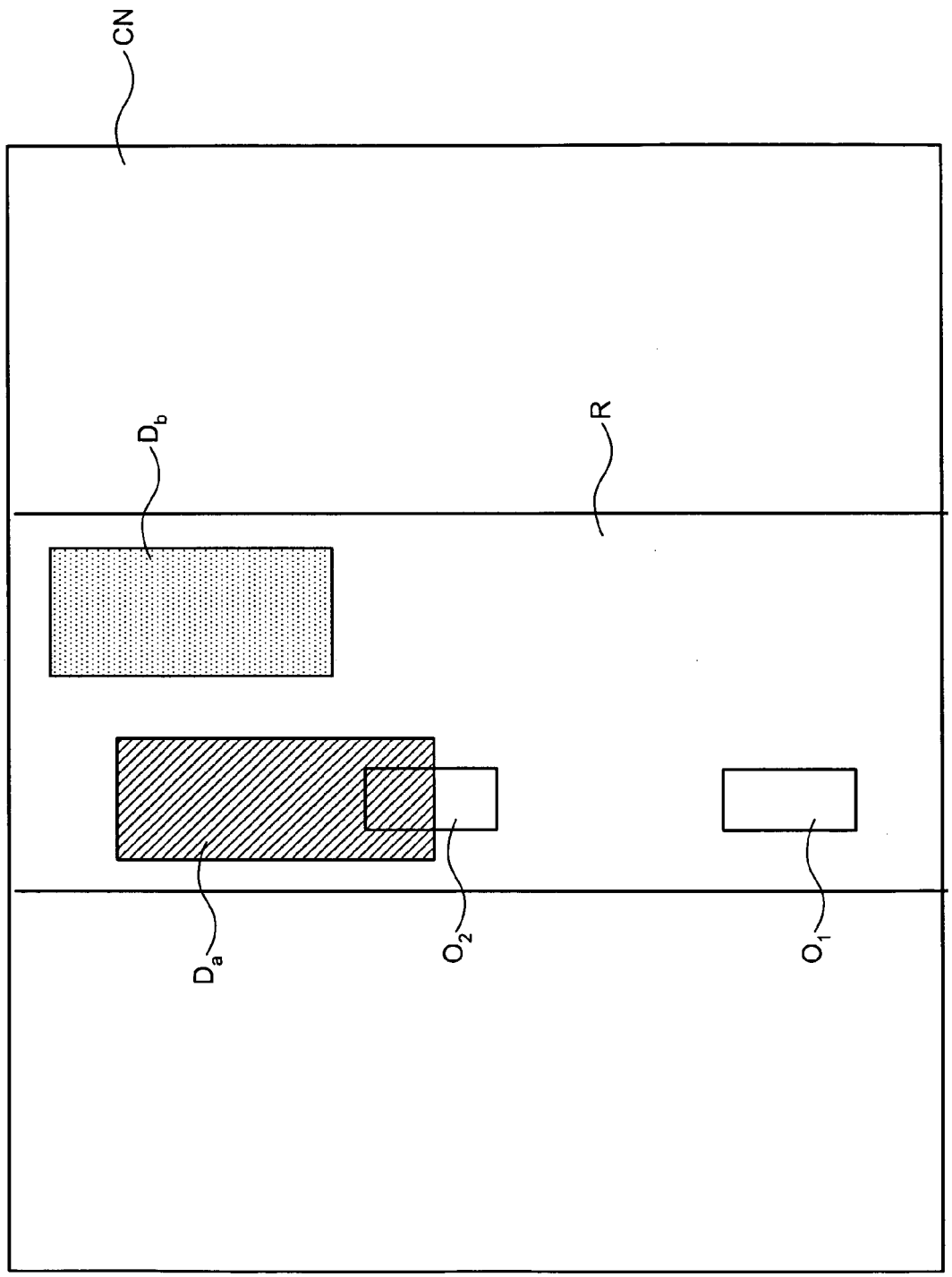
FIG. 8 is a diagram showing a display output example (second example) of prediction results by the object path prediction apparatus according to the first embodiment of the present invention.

However, the display/output example by the output section 6 is not limited to this and, for example, prediction results by the prediction section 5 may be displayed by causing a display screen CN (See FIG. 7) of a car navigation system to have the function of the display part 61. In this case, as same in the areas $D_a$ and $D_b$ shown in FIG. 8, each area on a two-dimensional plane displayed on the display screen CN can be displayed with gradations in color. Or, information, warning beeps, or voice in accordance with surrounding road situations may be output by causing a voice to be generated via a microphone from the output section 6.

According to the first embodiment of the present invention described above, a computer having a storage unit that stores the position of an object and an internal state including the speed of the object reads the position and internal state of the object from the storage unit, generates trajectories in a space-time consisting of time and space from changes of the positions that can be taken by the object with the passage of time based on the read position and internal state of the object, and probabilistically predicts the path of the object by using the generated trajectory so that safety can be secured even in situations that can actually occur.

Also, according to the first embodiment, by making path predictions of objects using a space-time environment formed in a space-time consisting of time and space, path predictions of not only static objects, but also dynamic objects can be made with precision.

Further, according to the first embodiment, since trajectories of detected objects are generated independently, a specific object (for example, subject vehicle) can be distinguished from other objects. As a result, danger that may lurk between the specific object and the other objects can be predicted easily and precisely within a practical period of time.

In addition, according to the first embodiment, since information including danger can be presented by outputting results predicted by using a space-time environment, a driver of subject vehicle can drive while swiftly and precisely avoiding danger that could lurk in the near future during driving.

Incidentally, the first embodiment is also applicable, as described above, in the four-dimensional space-time (three dimensions for space and one dimension for time). The first embodiment is naturally applicable to an automobile running on a road with a difference of elevation and, in addition, when a movable body moving in the air like an airplane or helicopter makes path predictions of other movable bodies moving similarly in the air.

Here, a difference between Nonpatent Literature 1 cited in the above background art and the first embodiment will be described. While these two technologies both make path predictions of objects using the concept of probability, the technology in Nonpatent Literature 1 does not predict paths of objects within a predetermined range independently and makes only probability calculations based on mutual correlations. Thus, when any two objects of a plurality of objects collide, path predictions of the two objects end when the two objects collide. When considered in the three-dimensional space-time, this means that collision determination processing after trajectories of two different objects cross will not be performed.

In contrast, in the first embodiment, an object trajectory is generated independently for each object and therefore, collision determination processing continues until a predetermined time elapses even if trajectories of different objects cross in the three-dimensional space-time. Thus, a space-time environment generated according to Nonpatent Literature 1 and that generated according to the first embodiment are quite different qualitatively. In addition, since path finding is performed for each object independently without considering object correlations in the first embodiment, the calculated amount is smaller than in Nonpatent Literature 1.

In addition, according to Nonpatent Literature 1, even if an event of collision can be predicted, when such a collision occur cannot be predicted. This is because the technology in Nonpatent Literature 1 focuses on searching for presence/absence of collision for each state at each time, instead of determining probabilities that objects collide in the flow of time. In other words, a space-time environment is not used explicitly in Nonpatent Literature 1 and also, the concept of space-time probability density is not employed.

Though the first embodiment and Nonpatent Literature 1 may at first glance give an impression of being similar technologies because both make path predictions using the concept of probability, technological principles thereof are essentially quite different and it is extremely difficult even for a person skilled in the art to reach the first embodiment from Nonpatent Literature 1.

(Modification of the First Embodiment)

The operation selection part 41 of the trajectory generation section 4 may maintain an operation at the present time only for subject vehicle. In this case, the internal state at prediction times of subject vehicle is maintained and a sole operation will continue to be performed and therefore, the operation selection probability of selecting the operation is 1 and only one trajectory is generated in a space-time as a set of trajectories of subject vehicle.

Figure 9:
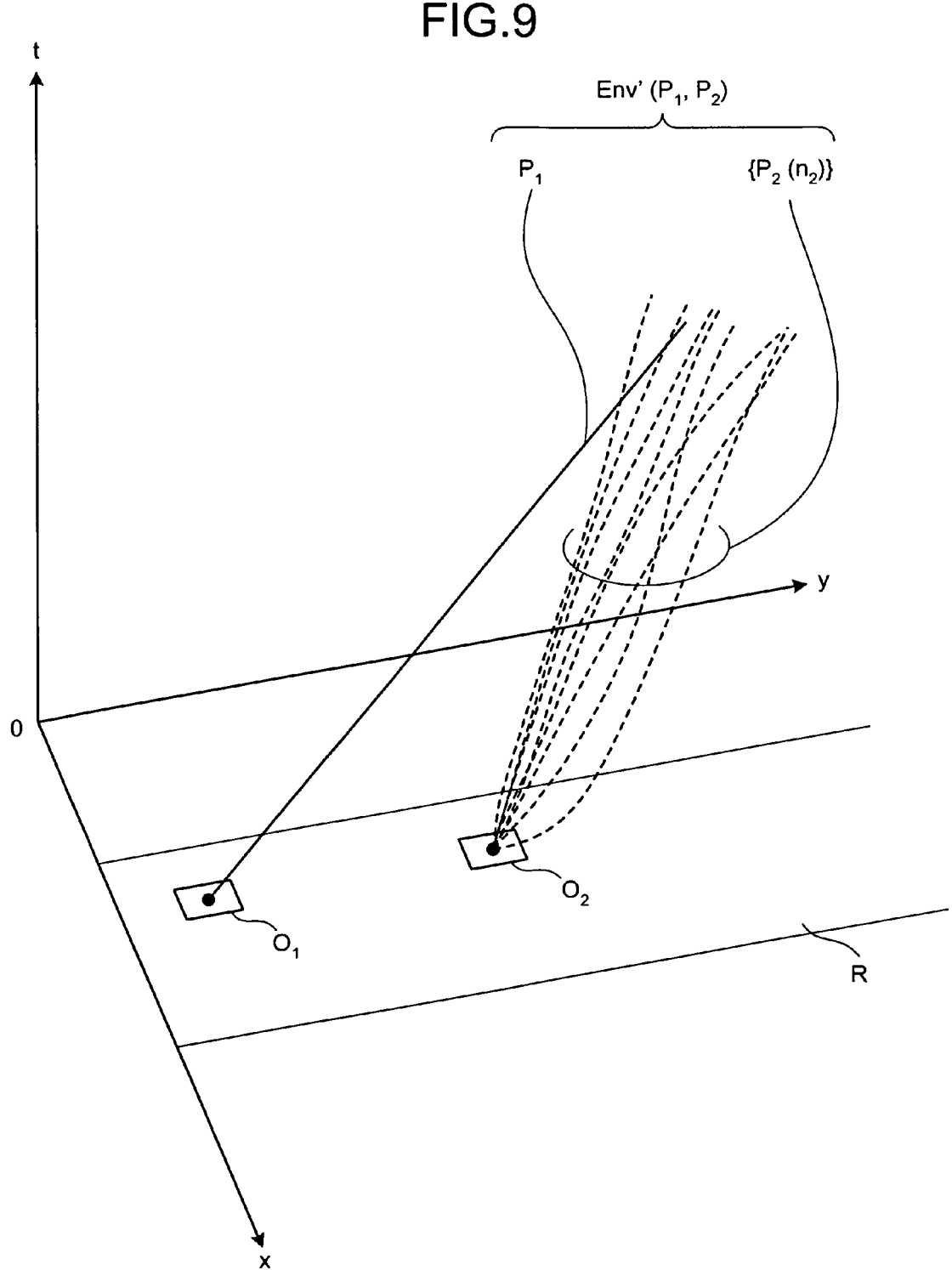
FIG. 9 is a diagram schematically showing the configuration of a space-time environment formed when a model that maintains an operation of subject vehicle is adopted.

FIG. 9 shows a space-time environment generated when an operation of subject vehicle is maintained as described above, and is a diagram corresponding to FIG. 6. In a space-time environment Env' ($P_1$, $P_2$) shown in FIG. 9, the set of trajectories of the object $O_1$ (subject vehicle) in the three-dimensional space-time consists of only one linear trajectory (similar to FIG. 6 for the object $O_2$). By applying a model in which an operation of subject vehicle $O_1$ is maintained, as described above, situations can be simplified for prediction when, for example, there are many surrounding objects, leading to reduced calculated amount in the trajectory generation section and the prediction section.

(Second Embodiment)

A second embodiment of the present invention is characterized in that when trajectories are generated for each object, all selectable operations are performed for trajectory generation. The functional configuration of an object path prediction apparatus according to the second embodiment is the same as that of the object path prediction apparatus 1 according to the first embodiment (See FIG. 1). An object path prediction method according to the second embodiment is the same as that according to the first embodiment except trajectory generation processing for each object.

Figure 10:
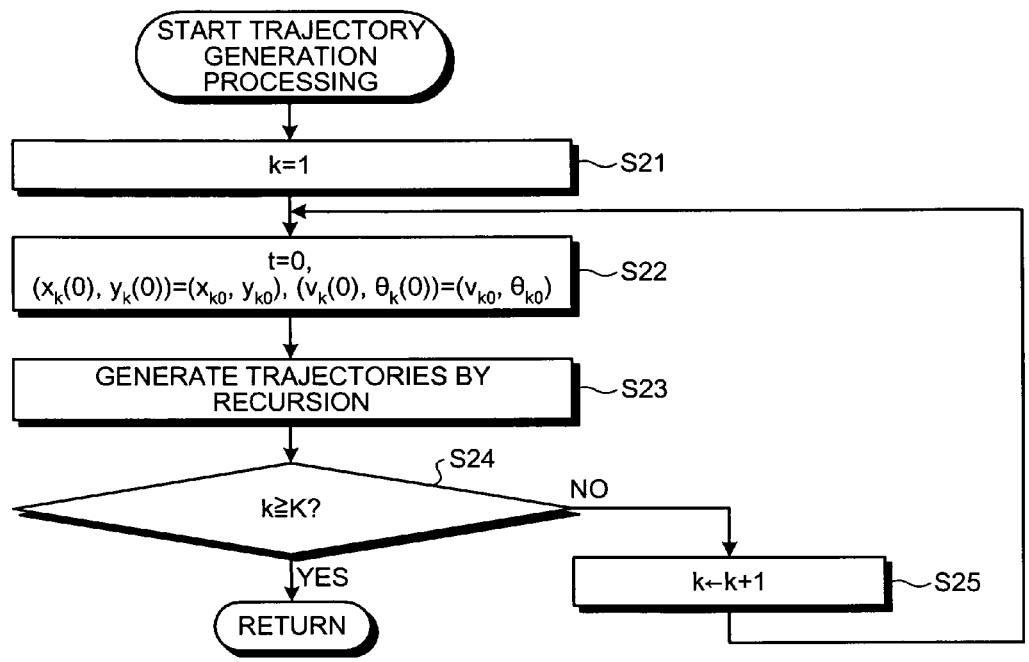
FIG. 10 is a flowchart showing the overview of trajectory generation processing by an object path prediction method according to a second embodiment of the present invention.

FIG. 10 is a flowchart showing the overview of trajectory generation processing (corresponding to step S2 in FIG. 2) by the object path prediction method according to the second embodiment. In the trajectory generation processing shown in the figure, firstly, initialization to set the value of the counter k for identifying each object to 1 is performed (step S21). Also in the second embodiment, the total number of the objects for which trajectories should be generated is assumed to be K.

Next, the trajectory generation section 4 reads results detected by the sensor section 3 from the storage section 7 and sets the read detection results as an initial state (step S22). More specifically, the time t is set to 0 and the initial position $(x_k(0), y_k(0))$ and the initial internal state $(v_k(0), \theta_k(0))$ are set to input information $(x_{k0}, y_{k0})$ and $(v_{k0}, \theta_{k0})$ from the sensor section 3 respectively.

Figure 11:
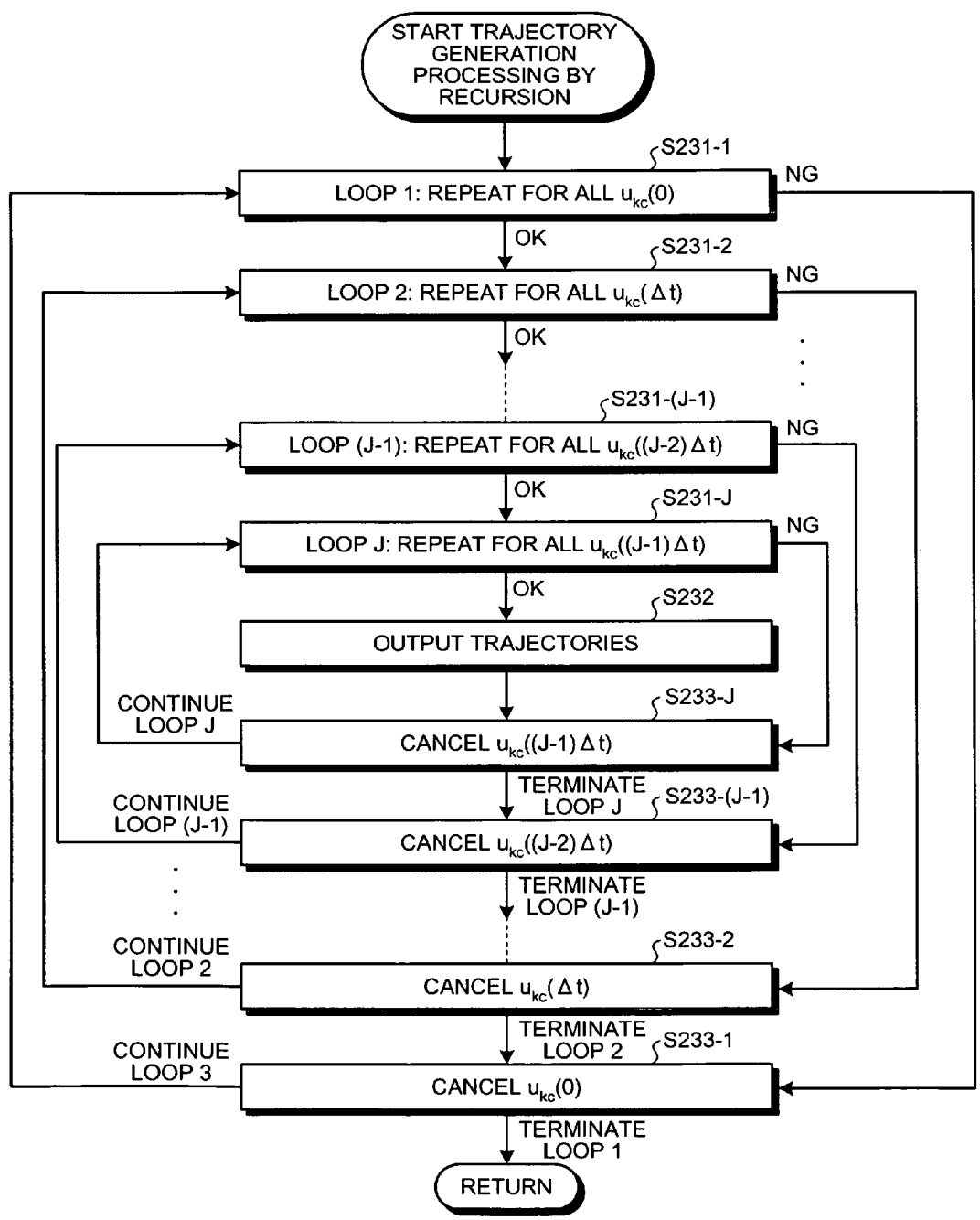
FIG. 11 is a flowchart showing details of trajectory generation processing by the object path prediction method according to the second embodiment of the present invention.

Subsequently, trajectories of the object $O_k$ in the three-dimensional space-time (x, y, t) are generated (step S23). FIG. 11 is a flowchart showing details of trajectory generation processing at step S23. In a description that follows, the trajectory generation time T is assumed to be represented by $T=J\Delta t$ (J is a natural number) using the operation time $\Delta t$ which each operation is performed.

First, loop processing (Loop1) at time t=0 is started (step S231-1). In this Loop1, an operation $u_k(0)$ at t=0 is formed for $\Delta t$. Concrete content of the operation $u_k(0)$ is determined, as same in the first embodiment, in accordance with the type of object $O_k$ (If the object is a vehicle, the operation can be specified by the acceleration or angular velocity, and if the object is a person, the operation can be specified by the speed). A set of operations $\{u_{kc}\}$ consists of finite elements and if a selectable operation is a continuous quantity, elements of the set $\{u_{kc}\}$ are constituted by discretization of appropriate intervals.

More specific processing at step S231-1 will be described. Firstly, the operation selection part 41 selects one operation $u_{kc}(0)$ and the object operation part 42 causes the selected operation $u_{kc}(0)$ to be performed for $\Delta t$. After the operation, the determination part 43 determines whether or not the position and internal state of the object $O_k$ satisfy control conditions and movement conditions similar to those in the first embodiment. If all conditions are satisfied (OK), the determination part 43 proceeds to loop processing (Loop2) at the next time t=$\Delta t$. In contrast, if any of the control conditions or movement conditions is not satisfied (NG), the operation $u_{kc}(0)$ performed immediately before is canceled after proceeding to step S233-1. Since the operation selection part 41 selects all operations in the second embodiment, the order of selecting each operation is arbitrary. This applies also to subsequent loop processing (Loop2, Loop3, . . . , LoopJ).

Processing up to generation of one trajectory will first be described below. In Loop2, as same in the above Loop1, the operation selection part 41 selects an operation and the operation $u_{kc}(\Delta t)$ is performed only for $\Delta t$. Then, if the position of the object $O_k$ after the operation satisfies control conditions and movement condition similar to those above (OK), the processing proceeds to loop processing (Loop3) at time $2\Delta t$. If, on the other hand, any of the control conditions or movement conditions is not satisfied (NG), the operation $u_{kc}(\Delta t)$ performed immediately before is canceled after proceeding to step S233-2.

Hereafter, by repeating processing similar to that in the above Loop1 or Loop2, loop processing is continuously performed J times. That is, as long as the object $O_k$ after an operation being performed at times $3\Delta t$, $4\Delta t$, . . . satisfies control conditions and movement conditions, the processing proceeds to Loop4, Loop5, . . . , sequentially. Then, if the object $O_k$ satisfies control conditions and movement conditions up to the last LoopJ, the processing proceeds to the subsequent step S232. At step S232, one trajectory from t=0 to t=T (=$J\Delta t$) is output and stored in the storage section 7. The trajectory passes through the three-dimensional space-time as in the trajectory $P_k(m)$ shown in FIG. 4.

At step S233-J after step S232, the operation $u_{kc}(T-\Delta t)=u_{kc}((J-1)\Delta t)$ performed at the latest time is canceled and, if LoopJ is to be continued (LoopJ continuation), the processing returns to step S231-J. If, on the other hand, LoopJ is to be terminated (LoopJ termination), the processing proceeds to the subsequent step S233-(J-1).

At step S233-(J-1), the operation $u_{kc}(T-2\Delta t)$ performed in Loop(J-1) is canceled and, if Loop(J-1) is to be continued (Loop(J-1) continuation), that is, if any element to be performed as the operation $u_{kc}(T-2\Delta t)$ remains, the processing returns to step S231-(J-1) to repeat processing. If, on the other hand, Loop(J-1) is to be terminated (Loop(J-1) termination), that is, no element to be performed as the operation $u_{kc}(T-2\Delta t)$ remains, the processing proceeds to the subsequent step S233-(J-2).

Hereafter, processing similar to that in the above LoopJ or Loop(J-1) is repeated in the order of Loop(J-2), . . . , Loop2, Loop1. As a result, when proceeding to processing at step S24 after completing Loop1 at step S233-1 lastly, all possible trajectories that can be followed by the object $O_k$ haven been generated, that is, set of trajectories $\{Pk(nk)\}$ is generated as shown in FIG. 5.

Next, a case when any one of control conditions or movement conditions is not satisfied (NG) at step S231-1 will be described. In this case, the operation $u_{kc}(0)$ performed immediately before is canceled after proceeding to step S233-1. Then, if Loop1 is to be continued, the processing returns to step S231-1 and, if Loop1 is to be terminated, the processing proceeds to the subsequent step S24.

If, after causing an operation selected at step S231-2, S231-3, . . . , or 231-J to perform, the object $O_k$ does not satisfy any of control conditions or movement conditions, processing similar to that of the above step S231-1 is performed. That is, generally if the object $O_k$ does not satisfy any of control conditions or movement conditions at step S231-j (j=2, 3, . . . , J), the operation performed immediately before can be canceled after proceeding to step S233-j. Accordingly, if any condition is not satisfied at some time $t_k$, trajectory generation processing after $t_k$ can be omitted, realizing reduction in calculated amount.

The algorithm of trajectory generation processing described above is equal to that used for searching for all possible operations by using a recursion based on the depth-first search. Therefore, in this case, the number of elements of a set of trajectories $\{P_k(n_k)\}$ generated in the end for one object $O_k$, that is, the number of trajectories is not known until trajectory generation processing for the object $O_k$ is completed.

Instead of performing the above trajectory generation processing, the breadth-first search may be used to search for all possible operations. To generate trajectories that can be followed by each object by searching for all practicable operations, a search method having an optimal calculated amount in accordance with the number of elements of the operation $u_{kc}(t)$ (the level of discretization when the operation $u_{kc}(t)$ is a continuous quantity) in the operation time $\Delta t$ may be selected.

If, after the trajectory generation processing at step S23 described above, the counter k for object identification has not reached K (No at step S24), the value of the counter is incremented by 1 (step S25), initialization based on detection results by the sensor section 3 is performed after returning to step S22, and the above trajectory generation processing (Step S23) is performed for another object $O_{k+1}$. If, on the other hand, the counter k for object identification reaches K (Yes at step S24), trajectory generation processing for all objects present within a predetermined range has been completed and thus, the trajectory generation processing (corresponding to step S2 in FIG. 2) is terminated. As a result, a space-time environment $Env(P_1, P_2)$ similar to that shown in FIG. 6 is generated and stored in the storage section 7.

Processing hereafter, that is, probabilistic predictions of object paths by the prediction section 5 (corresponding to step S3 in FIG. 2) and output of prediction results by the output section 6 (corresponding to step S4 in FIG. 2) are similar to those in the first embodiment.

According to the second embodiment of the present invention described above, a computer having a storage unit that stores the position of an object and an internal state including the speed of the object reads the position and internal state of the object from the storage unit, generates trajectories in a space-time consisting of time and space from changes of the positions that can be taken by the object with the passage of time based on the read position and internal state of the object, and probabilistically predicts the path of the object by using the generated trajectory so that safety can be secured even in situations that can actually occur.

Also, according to the second embodiment, by making path predictions of objects using a space-time environment formed in a space-time consisting of time and space, path predictions of not only static objects, but also dynamic objects can be made with precision.

Incidentally, trajectory generation processing in a space-time using a recursion is performed in the second embodiment, but it is impossible to say with absolute certainty, when compared with the trajectory generation processing in the first embodiment described above, which trajectory generation processing requires less calculated amount. In other words, which algorithm to use to generate a trajectory of a body in a space-time changes depending on various conditions including the operation time $\Delta t$, the trajectory generation time T, and the number of elements in a set of operations. Thus, the most optimal algorithm can be adopted in accordance with conditions under which predictions are made.

(Third Embodiment)

Figure 12:
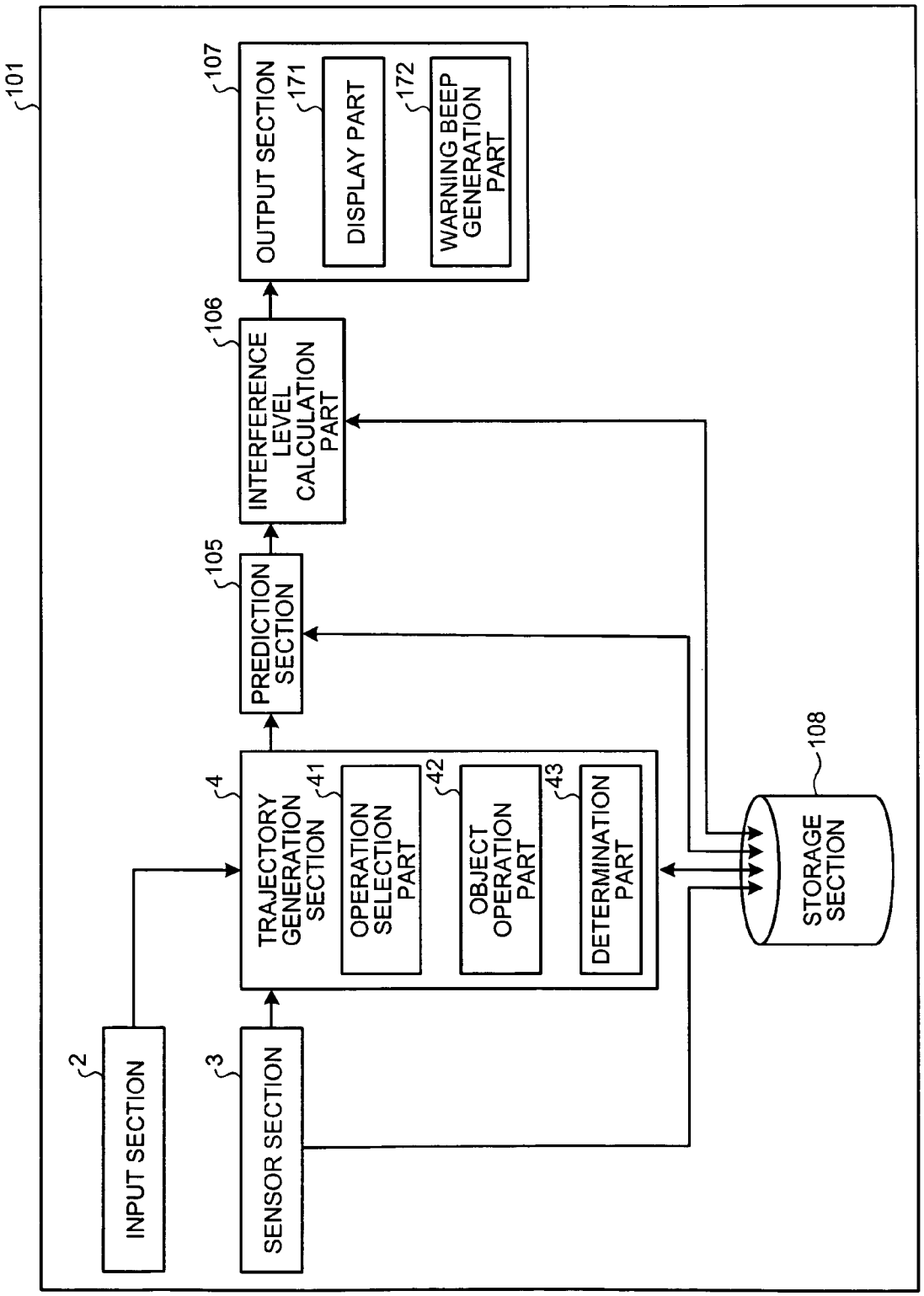
FIG. 12 is a block diagram showing the functional configuration of an object path prediction apparatus according to a third embodiment of the present invention.

FIG. 12 is a block diagram showing the functional configuration of an object path prediction apparatus according to a third embodiment of the present invention. An object path prediction apparatus 101 shown in the figure is an apparatus mounted on a movable body such as a four-wheel vehicle to detect objects present within a predetermined range around subject vehicle, which is a specific object, to predict paths of detected objects and subject vehicle, and based on results of the prediction, to quantitatively evaluate the level of interference between paths that can be taken by the specific object, subject vehicle, and those that can be taken by other objects.

The object path prediction apparatus 101 includes the input section 2 into which various kinds of information are input from outside, the sensor section 3 for detecting positions and internal states of objects present within a predetermined range, the trajectory generation section 4 for generating a trajectory in space-time constituted by time and space from changes of the positions that can be taken by an object with the passage of time based on results detected by the sensor section 3, a prediction section 105 for making a probabilistic prediction about the path of the object using the trajectory generated by the trajectory generation section 4, an interference level calculation part 106 for calculating the level of interference showing quantitatively an extent of interference between paths that can be taken by subject vehicle and those that can be taken by other objects based on results of predictions made by the prediction section 105, an output section 107 for outputting various kinds of information including evaluation results by the interference level calculation part 106, and a storage section 108 for storing various kinds of information including positions and internal states of objects detected by the sensor section 3. In FIG. 12, the same reference numerals are granted to components having the same functional configuration as that of the object path prediction apparatus 1 according to the first embodiment as in FIG. 1.

The output section 107 has a display part 171 for displaying/outputting an image in accordance with evaluation results by the interference level calculation part 106 and a warning beep generation part 172 for generating a warning beep in according with evaluation results thereof. The warning beep generation part 172 is realized by using a speaker or the like.

The storage section 108 stores, in addition to detection results by the sensor section 3, trajectories generated by the trajectory generation section 4, results of predictions made by the prediction section 105, results of interference level calculation by the interference level calculation part 106, operations selected by the operation selection part 41 in the trajectory generation section 4 and the like.

Figure 13:
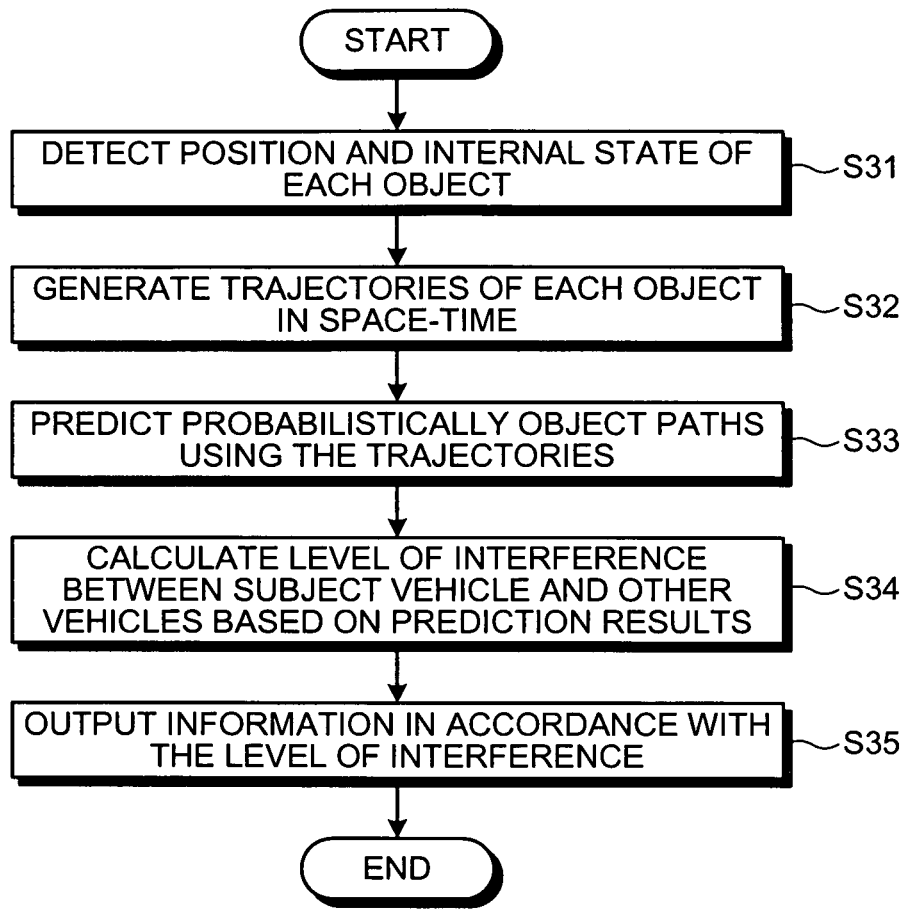
FIG. 13 is a flowchart showing the overview of an object path prediction method according to the third embodiment of the present invention.

Next, an object path prediction method according to the third embodiment of the present invention will be described. FIG. 13 is a flowchart showing a process overview of the object path prediction method according to the third embodiment. Also in the third embodiment, all objects to be predicted are assumed to move on a two-dimensional plane for a description.

In the third embodiment, detection processing of the position and internal state of each object (step S31), trajectory generation processing for each object in a space-time (step S32), and probabilistic prediction processing of object paths using trajectories (step S33) are the same as step S1, step S2, and step S3 described above respectively. In a description that follows, it is assumed that the trajectory generation processing at step S32 is performed by the method based on the operation selection probability described in the first embodiment, but it is also possible to adopt the method described in the second embodiment, that is, the method by which trajectories are generated by performing all selectable operations.

Figure 14:
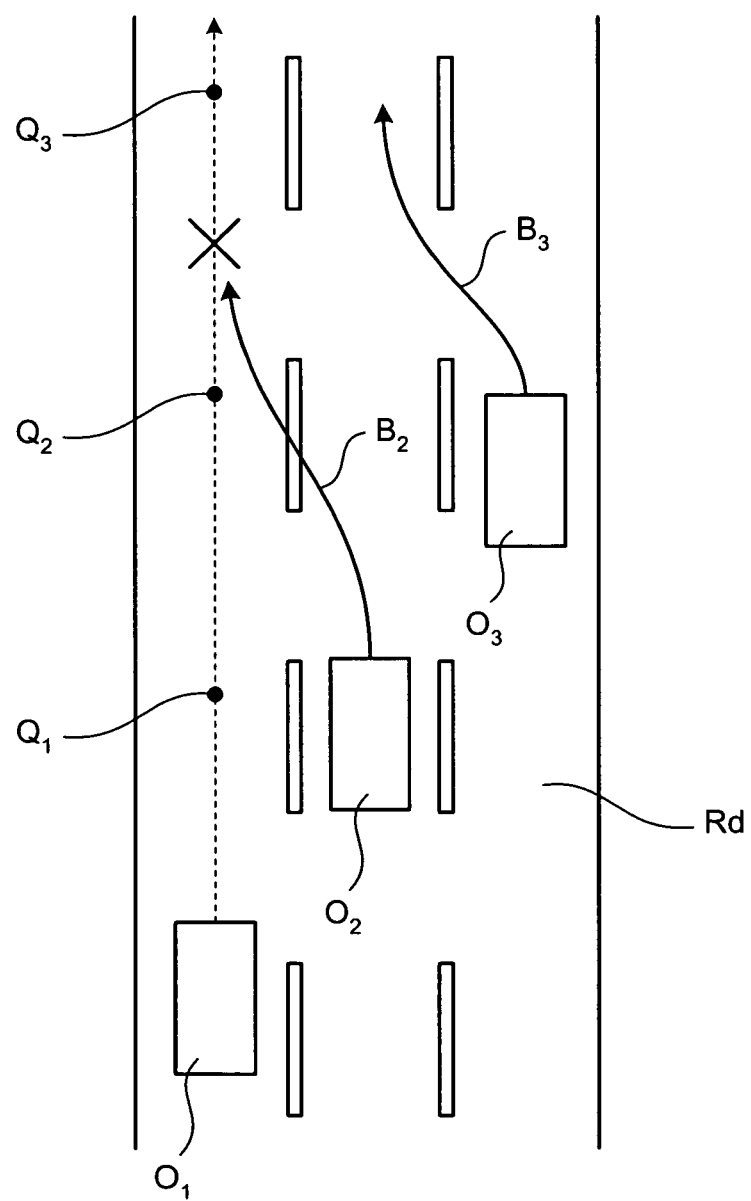
FIG. 14 schematically shows problems of conventional path prediction calculations.

Incidentally, when performing trajectory generation processing for each object in a space-time at step S32, it is important to terminate prediction calculations based on the trajectory generation time T, instead of whether subject vehicle has arrived at a preset location (a destination or an intermediate location analogous to a destination), in terms of technological principles. There is no place on an ordinary road where safety is secured in advance. For example, as shown in FIG. 14, when making a prediction by assuming that subject vehicle $O_1$ running on a three-lane road Rd sequentially reaches preset locations $Q_1$, $Q_2$, and $Q_3$, considering a case in which subject vehicle $O_1$ travels almost in a straight line toward the preset locations, there is a danger that another vehicle $O_2$ takes a path $B_2$ to move into the lane on which subject vehicle $O_1$ is running to avert danger caused by another vehicle $O_3$ taking a path $B_3$. Accordingly, conventional path prediction calculations do not guarantee in advance to the extent that it is safe for subject vehicle $O_1$ to travel to a preset location.

Figure 15:
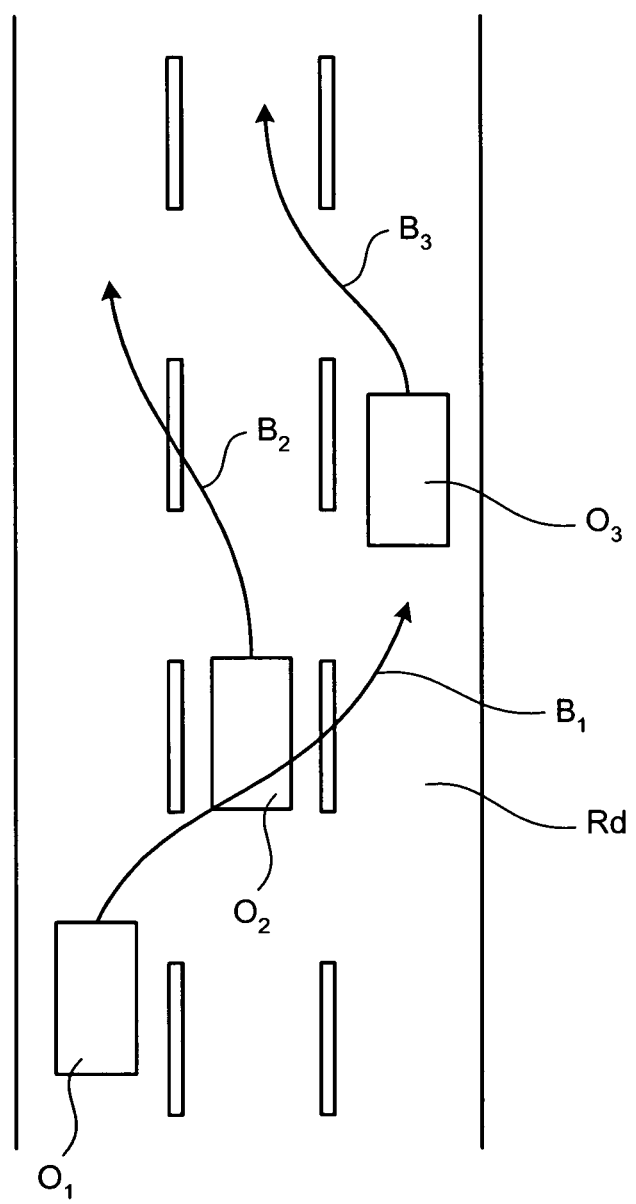
FIG. 15 is a diagram schematically showing advantages of path prediction calculations by the object path prediction method according to the third embodiment of the present invention.

Since, in the third embodiment, an optimal path is determined each time without presetting a location such as a destination to be reached by subject vehicle $O_1$, for example, a path $B_1$ shown in FIG. 15 can be selected as a path of subject vehicle $O_1$ under the same situation as that in FIG. 14 so that safety can be secured by precisely averting danger when subject vehicle $O_1$ travels.

Instead of the trajectory generation time T, the condition for terminating prediction calculation may be determined by a trajectory generation length showing the length of a trajectory to be generated. In this case, it is preferable to adaptively change the trajectory generation length depending on the speed of an object (or the speed of subject vehicle).

Figure 16:
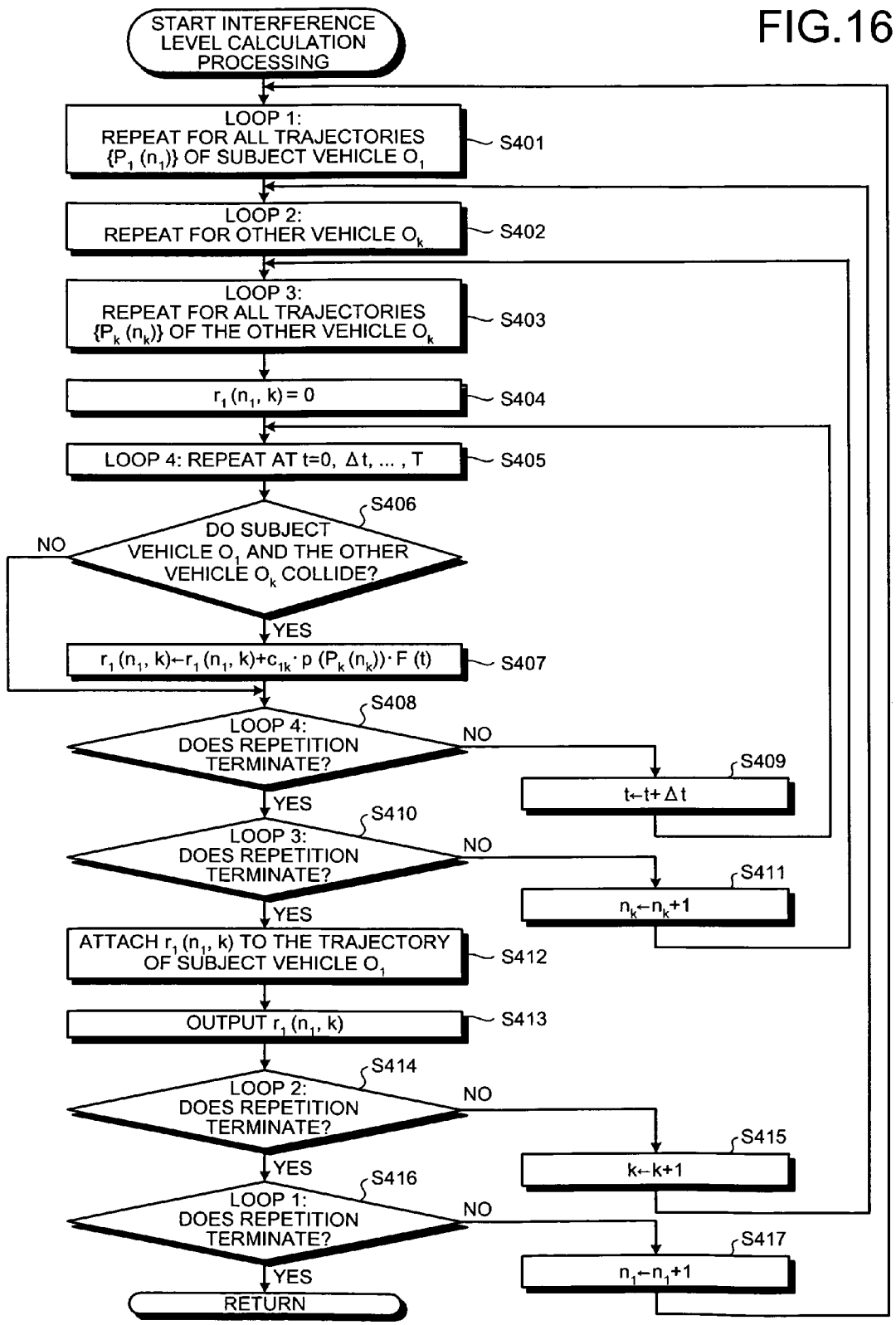
FIG. 16 is a flowchart showing details of interference level calculation processing by the object path prediction method according to the third embodiment of the present invention.

Processing at step S34 and thereafter will be described below in detail. At step S34, the level of interference between subject vehicle and another vehicle is calculated by the interference level calculation part 106 (step S34). FIG. 16 is a flowchart showing details of interference level calculation processing. In the third embodiment, the object $O_1$ is assumed to be subject vehicle. For convenience of description, other objects $O_k$ (k=2, 3, . . . , K) are all assumed to be also four-wheel vehicles and called the other vehicle $O_k$. Interference level calculation processing shown in FIG. 16 consists of processing of four loops and calculates individually the levels of interference of all elements of a set of trajectories $\{P_1(n_1)\}$ of subject vehicle $O_1$ determined at step S33 with all sets of trajectories $\{P_k(n_k)\}$ of the other vehicle $O_k$.

Input received by the interference level calculation part 106 at step S34 includes the set of trajectories $\{P_1(n_1)\}$ of subject vehicle $O_1$, all sets of trajectories $\{P_k(n_k)\}$ of the other vehicle $O_k$, and an interference level evaluation function to evaluate the level of interference between subject vehicle $O_1$ and the other vehicle $O_k$. It is assumed in the third embodiment that the interference level calculation part 106 contains the interference level evaluation function, but the interference level evaluation function may be input from outside. Or, the interference level evaluation function may be caused to adaptively change depending on the type of road and the speed of subject vehicle $O_1$.

By evaluating the levels of interference between sets of trajectories of other vehicles and a set of trajectories of subject vehicle with endpoints different from each other, as described using FIG. 15, an optimal path is determined each time without presetting a location such as a destination to be reached by subject vehicle to precisely avert danger while subject vehicle travels so that safety can be secured. As a result, as shown in FIG. 14, a fatal problem that safety is not secured even if subject vehicle travels toward a preset location on a road can be solved.

In FIG. 16, the interference level calculation part 106 first starts repetitive processing (Loop1) for all trajectories of subject vehicle $O_1$(step S401). For this purpose, one trajectory is selected from the set of trajectories $\{P_1(n_1)\}$ and subsequent processing is performed for the selected trajectory.

Next, the interference level calculation part 106 starts repetitive processing (Loop2) for the other vehicle $O_k$(step S402). In this Loop2, the counter k for identification of other vehicles is initialized to k=2 and the value of k is incremented each time repetitive processing is completed.

Inside Loop2, repetitive processing (Loop3) for all elements of the set of trajectories $\{P_k(n_k)\}$ generated at step S3 for the other vehicle $O_k$ is performed (step S403). In this repetitive processing, the level of interference determined by a counter $n_1$ for repetition of Loop1, that is, for identifying a trajectory generated for subject vehicle $O_1$ and the counter k for identification of other vehicles is set as $r_1(n_1, k)$ and the value of $r_1(n_1, k)$ is set to 0 (step S404).

Subsequently, the interference level calculation part 106 starts repetitive processing (Loop4) to evaluate interference between the trajectory $P_1(n_1)$ of subject vehicle $O_1$ and the trajectory $P_k(n_k)$ of the other vehicle $O_k$(step S405). In this Loop4, the distance between the trajectory $P_1(n_1)$ and the trajectory $P_k(n_k)$ at the same time is sequentially determined at times t=0, Δt, . . . , T. Since the position of each trajectory in the two-dimensional space-time is defined as the center of each vehicle, if a spatial distance between two trajectories becomes smaller than a predetermined value (for example, the standard width or length of a vehicle), it is possible to assume that subject vehicle and the other vehicle $O_k$ have collided. In this sense, two objects may be determined to have collided even if coordinate values of the two vehicles do not match. Hereinafter, the maximal value (spatial distance at which two vehicles interfere with each other) of distance that allows considering that two objects have collided will be called an interference distance.

Figure 17:
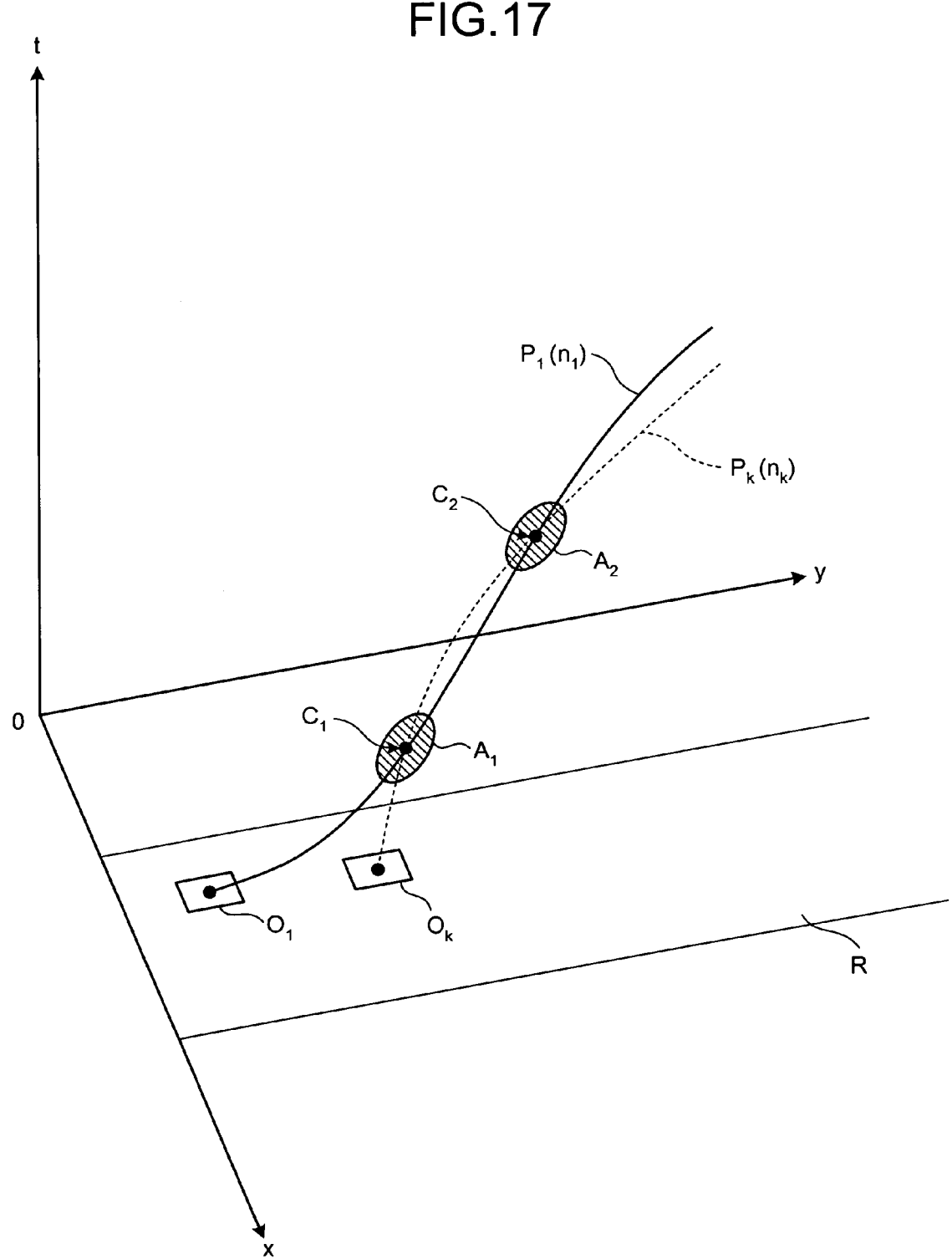
FIG. 17 is a diagram schematically showing a relationship between one trajectory of subject vehicle and that of another vehicle in a space-time.

FIG. 17 is a diagram schematically showing a relationship between the trajectory $P_1(n_1)$ of subject vehicle $O_1$ and the trajectory $P_k(n_k)$ of the other vehicle $O_k$ in a space-time. In the case shown in the figure, the trajectory $P_1(n_1)$ and the trajectory $P_k(n_k)$ cross at two points $C_1$ and $C_2$. Therefore, there exist areas $A_1$ and $A_2$ where the distance between the two trajectories at the same time is smaller than the interference distance near these two points $C_1$ and $C_2$. That is, a determination is made that subject vehicle $O_1$ and the other vehicle $O_k$ collide at a time when the trajectory $P_1(n_1)$ and trajectory $P_k(n_k)$ are contained in the areas $A_1$ and $A_2$ respectively. In other words, the number of times of passing through the areas $A_1$ and $A_2$ at times t=0, Δt, . . . , T is the number of times of collision between subject vehicle $O_1$ and the other vehicle $O_k$.

As is evident from FIG. 17, in a space-time environment formed in the third embodiment, even if two trajectories collide, trajectories thereafter are generated. This is because trajectories are generated for each object independently.

If, as a result of determining the distance between subject vehicle $O_1$ and the other vehicle $O_k$, a determination is made that subject vehicle $O_1$ and the other vehicle $O_k$ have collided in the sense described above (Yes at step S406), the interference level calculation part 106 sets the value of the level of interference $r_1(n_1, k)$ as
[Formula 5]

$$r_1(n,k) \leftarrow r_1(n_1,k)+c_{1k}\cdot p(P_k(n_k))\cdot F(t) \quad (5)$$

Figure 18:
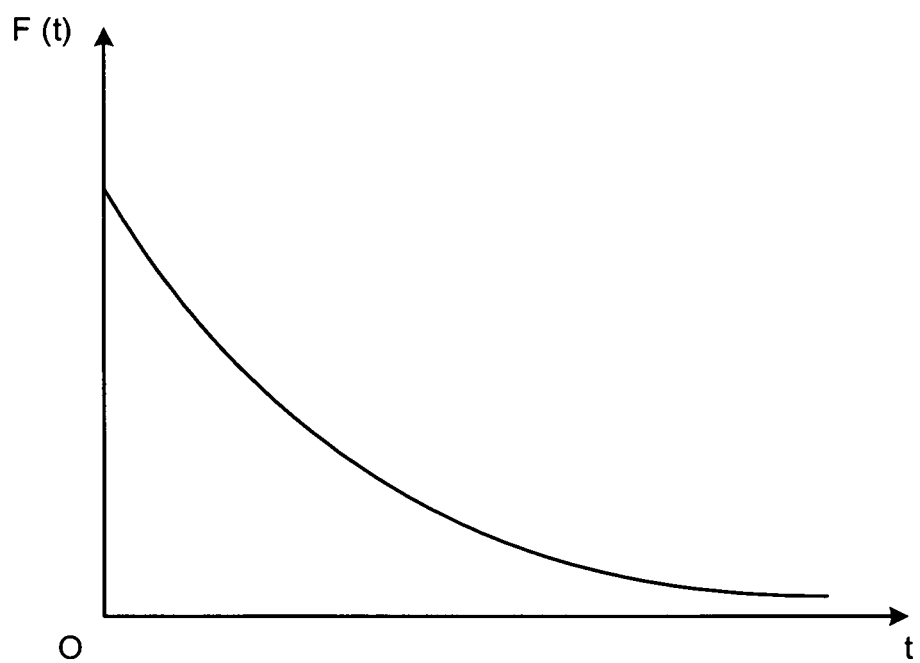
FIG. 18 is a diagram exemplifying a function that gives time dependence of interference between objects.

(step S407). Here, the second term $c_{1k}\cdot p(P_k(n_k))\cdot F(t)$ will be described. The coefficient $c_{1k}$ is a positive constant and can be set, for example, as $c_{1k}=1$. $p(P_k(n_k))$ is a quantity defined by Formula (2) and is a probability that one trajectory $P_k(n_k)$ is selected for the other vehicle $O_k$. The last term F(t) is a quantity that gives time dependence of interference between objects in one collision. Therefore, if time dependence of interference between objects is not allowed, the value of F(t) can be set to be constant. In contrast, if time dependence of interference between objects is allowed, as shown, for example, in FIG. 18, F(t) may be defined as a function whose value decreases with the passage of time. F(t) shown in FIG. 18 is applied when importance is granted to the latest collision.

If, after step S407, the time t has not reached T, the interference level calculation part 106 repeats Loop4 (No at step S408). In this case, the value of t is incremented by Δt (step S409) and repeats Loop4 after returning to step S405. If, on the other hand, after step S407, the time t reaches T, Loop4 is terminated (Yes at step S408). If subject vehicle $O_1$ and the other vehicle $O_k$ do not collide at some time t, the p interference level calculation part 106 directly proceeds to determination processing (step S408) whether to repeat Loop4.

By the repetitive processing of Loop4 described above, the value of the level of interference $r_1(n_1, k)$ increases as the number of times of collision increases. After Loop4 is completed, determination processing whether to repeat Loop3 is performed at step S410. That is, if there is any of trajectories generated for the other vehicle $O_k$ whose interference evaluation with one trajectory $P_1(n_1)$ of subject vehicle $O_1$ has not been performed (No at step S410), $n_k$ is incremented to $n_k+1$ (step S411) and Loop3 is repeated after returning to step S403.

In contrast, if all interference evaluations of trajectories generated for the other vehicle $O_k$ with one trajectory $P_1(n_1)$ of subject vehicle $O_1$ have been performed (Yes at step S410), the final level of interference $r_1(n_1, k)$ that evaluates interference between the trajectory $P_1(n_1)$ of subject vehicle $O_1$ and all trajectories of the other vehicle $O_k$ is attached (step S412) and the attached value is output and stored in the storage section 108 (step S413).

The value of the final level of interference $r_1(n_1, k)$ output from the interference level calculation part 106 at step S413 depends on the probability $p(P_k(n_k))$ that one trajectory $P_k(n_k)$ is selected from among all trajectories of the other vehicle $O_k$. Thus, if it is assumed in Formula (5) that the coefficient $c_{1k}$ is not dependent on k and is constant (for example, $c_{1k}=1$), F(t) is constant (for example, 1), and the number of times of collision between the trajectory $P_1(n_1)$ of subject vehicle $O_1$ and the trajectory $P_k(n_k)$ of the other vehicle $O_k$ is $M_{1k}(n_1, n_k)$, the value of the level of interference $r_1(n_1, k)$ is obtained by multiplying the probability $p(P_k(n_k))$ for each trajectory $P_k(n_k)$ by $M_{1k}(n_1, n_k)$ and adding up for elements of all sets of trajectories $\{P_k(n_k)\}$. The sum is none other than the collision probability that one trajectory $P_1(n_1)$ of subject vehicle $O_1$ and trajectories that can be followed by the other vehicle $O_k$ collide. Therefore, the value obtained as the level of interference $r_1(n_1, k)$ in the end increases in proportion to the collision probability that one trajectory $P_1(n_1)$ of subject vehicle $O_1$ and the other vehicle $O_k$ collide.

Subsequent to step S413, the interference level calculation part 106 performs determination processing whether to repeat Loop2. If there remains another vehicle $O_k$ whose interference evaluation with subject vehicle $O_1$ should be performed (No at step S414), the interference level calculation part 106 increments the value of k by 1 (step S415) and repeats Loop2 after returning to step S402. If, on the other hand, there remains no vehicle $O_k$ whose interference evaluation with subject vehicle $O_1$ should be performed (Yes at step S414), the interference level calculation part 106 proceeds to the subsequent step S416.

At step S416, determination processing whether to repeat Loop1 is performed. More specifically, if there remains a trajectory of the set of trajectories $\{P_1(n_1)\}$ of subject vehicle $O_1$ whose interference evaluation should be performed (No at step S416), the interference level calculation part 106 increments the value of $n_1$ by 1 (step S417) and repeats Loop1 after returning to step S401. If, on the other hand, there remains no trajectory of the set of trajectories $\{P_1(n_1)\}$ of subject vehicle $O_1$ whose interference evaluation should be performed (Yes at step S416), the interference level calculation part 106 terminates Loop1 before terminating interference level calculation processing (step S34).

Then, the output section 107 outputs information in accordance with the level of interference calculated at step S34 as evaluation results (step S35). A case in which the display part 171 in the output section 107 performs a translucent display by superimposition as shown inn FIG. 7 on the front glass F of subject vehicle $O_1$ will be described below. FIG. 7 in this case can be interpreted as a figure showing a situation in which, in a space-time environment $Env(P_1, P_2)$ constituted by subject vehicle $O_1$ and another vehicle $O_2$, an area where, among paths that can be taken by subject vehicle $O_1$ on a two-dimensional plane in accordance with the level of interference $r_1(n_1, 2)$ between subject vehicle $O_1$ and the other vehicle $O_2$, the value of the level of interference $r_1(n_1, 2)$ exceeds a preset threshold is displayed by superimposition.

The display part 171 has a function to change illumination in accordance with the value of the level of interference $r_1(n_1, 2)$. If, for example, a setting is made to increase illumination as the value of the level of interference $r_1(n_1, 2)$ increases and, of the area $D_a$ and the area $D_b$ shown in FIG. 7, illumination of the area $D_a$ is greater. In this case, the driver of subject vehicle $O_1$ can immediately recognize that, by referencing a display by superimposition on the front glass F while driving viewing in the forward direction, driving to avert danger can be done by taking a path toward the area $D_b$ where the value of the level of interference $r_1(n_1, 2)$ is relatively smaller, By causing this recognition result to be reflected in driving operation, the driver can precisely avert danger that could occur on subject vehicle $O_1$ in the near future. In addition to displaying by the display part 171, the warning beep generation part 172 may generate a warning beep (including voice) when the value of the level of interference $r_1(n_1, 2)$ obtained for an anticipated path in accordance with the current operation exceeds a predetermined threshold.

Also, as same in the first embodiment, interference evaluation results by the interference level calculation part 106 may be displayed by causing the display screen CN (See FIG. 8) of a car navigation system to have the function of the display part 171.

According to the third embodiment of the present invention described above, a computer having a storage unit that stores at least the positions of a plurality of objects and an internal state including the speed of each object reads the positions and internal states of the plurality of objects from the storage unit, generates trajectories in a space-time consisting of time and space from changes of the positions that can be taken by each of the plurality of objects with the passage of time based on the read positions and internal states of the objects, predicts probabilistically paths of the plurality of objects by using the generated trajectory, and based on results of the prediction, calculates the level of interference quantitatively showing an extent of interference between trajectories that can be followed by the specific object in the space-time and those that can be followed by the other objects so that safety can be secured even in situations that can actually occur.

Also, according to the third embodiment, by applying the level of interference defined by using the collision probability in a space-time, possibilities of collision with other objects can precisely be predicted within a practical period of time.

Further, according to the third embodiment, by making path predictions of objects using a space-time environment formed in a space-time consisting of time and space, path predictions of not only static objects, but also dynamic objects can be made with precision.

In addition, according to the third embodiment, since trajectories of detected objects are generated independently, a specific object (for example, subject vehicle) can be distinguished from other objects. As a result, danger that may lurk between the specific object and the other objects can be predicted easily and precisely.

Incidentally, the coefficient $c_{1k}$ in Formula (5) for increasing the value of the level of interference $r_1(n_1, k)$ may not be constant. For example, the coefficient $c_{1k}$ may be a magnitude of relative velocity between subject vehicle $O_1$ and the other vehicle $O_k$ at the time of collision. Generally, as the magnitude of relative velocity increases, an impact during collision increases. Therefore, if the coefficient $c_{1k}$ is the magnitude of relative velocity between vehicles at the time of collision, the level of impact of collision between vehicles will be added to the level of interference $r_1(n_1, k)$.

Or, a value indicating seriousness of damage may be assigned to the coefficient $c_{1k}$. In this case, for example, the magnitude of relative velocity between vehicles during collision may be stored in the storage section 108 by associating with a damage scale evaluation value for numerically evaluating the damage scale caused by a collision or an amount of damage losses caused by a collision before the stored value read from the storage section 108 being assigned to the coefficient clk. If the sensor section 3 has a function capable of detecting even the type of object, the damage scale evaluation value or amount of damage losses may be determined in accordance with the type of object. In this case, for example, when the object against which to collide is a human or a vehicle, it is preferable to reduce the possibility to collide against a human to a minimum by, for example, setting the value of the coefficient clk for collision against a human far greater than that of the coefficient $c_{1k}$ for collision against other objects.

Incidentally, in the third embodiment, the level of interference may be calculated by assuming that an operation of subject vehicle $O_1$ is maintained. In that case, the display part 171 in the output section 107 can display not only predicted paths of subject vehicle $O_1$, but also danger of other vehicles running within a predetermined range in accordance with calculation results of the level of interference.

By applying a model in which an operation of subject vehicle $O_1$ is maintained, as described above, situations can be simplified for prediction when, for example, there are many surrounding objects, leading to reduced calculated amount in the trajectory generation section, the prediction section and the interference level calculation part.

Here, a difference between Nonpatent Literature 1 cited in the above background art and the third embodiment will be described. Since path finding is performed for each object independently without considering object correlations in the third embodiment, the calculated amount is smaller than in Nonpatent Literature 1. Particularly, the number of times of calculating the level of interference per trajectory in the third embodiment is given by

[Formula 6]

$$n_1 \times \sum_{k=2}^{K} n_k$$

and the calculated amount on the order of the square of the number of trajectories is sufficient regardless of the total number of objects constituting a space-time environment. In contrast, when evaluating interference according to Nonpatent Literature 1, a specific object (subject vehicle) and other objects (other vehicles) are not distinguished and the calculated amount for evaluating mutual interference (corresponding to the number of times of calculating the level of interference in the first embodiment) is given by:

[Formula 7]

$$n_1 \times \sum_{k=2}^{K} n_k$$

and therefore, the calculated amount on the order of the K-th power of the number of trajectories is needed. As a result, as the number of objects constituting a space-time environment increases, a difference of calculated amount from that in the third embodiment will be conspicuously larger.

Differences between Nonpatent Literature 1 and the third embodiment excluding the difference described here are the same described for the first embodiment. Therefore, as same in the first embodiment, it is extremely difficult even for a person skilled in the art to reach the third embodiment from Nonpatent Literature 1.

(Fourth Embodiment)

A fourth embodiment of the present invention is characterized in that the level of interference when evaluating interference is defined by using the minimum collision time between subject vehicle and other vehicles. The functional configuration of an object path prediction apparatus according to the fourth embodiment is the same as that of the object path prediction apparatus 101 according to the third embodiment (See FIG. 12). An object path prediction method according to the fourth embodiment is the same as that according to the third embodiment except interference level calculation processing.

Figure 19:
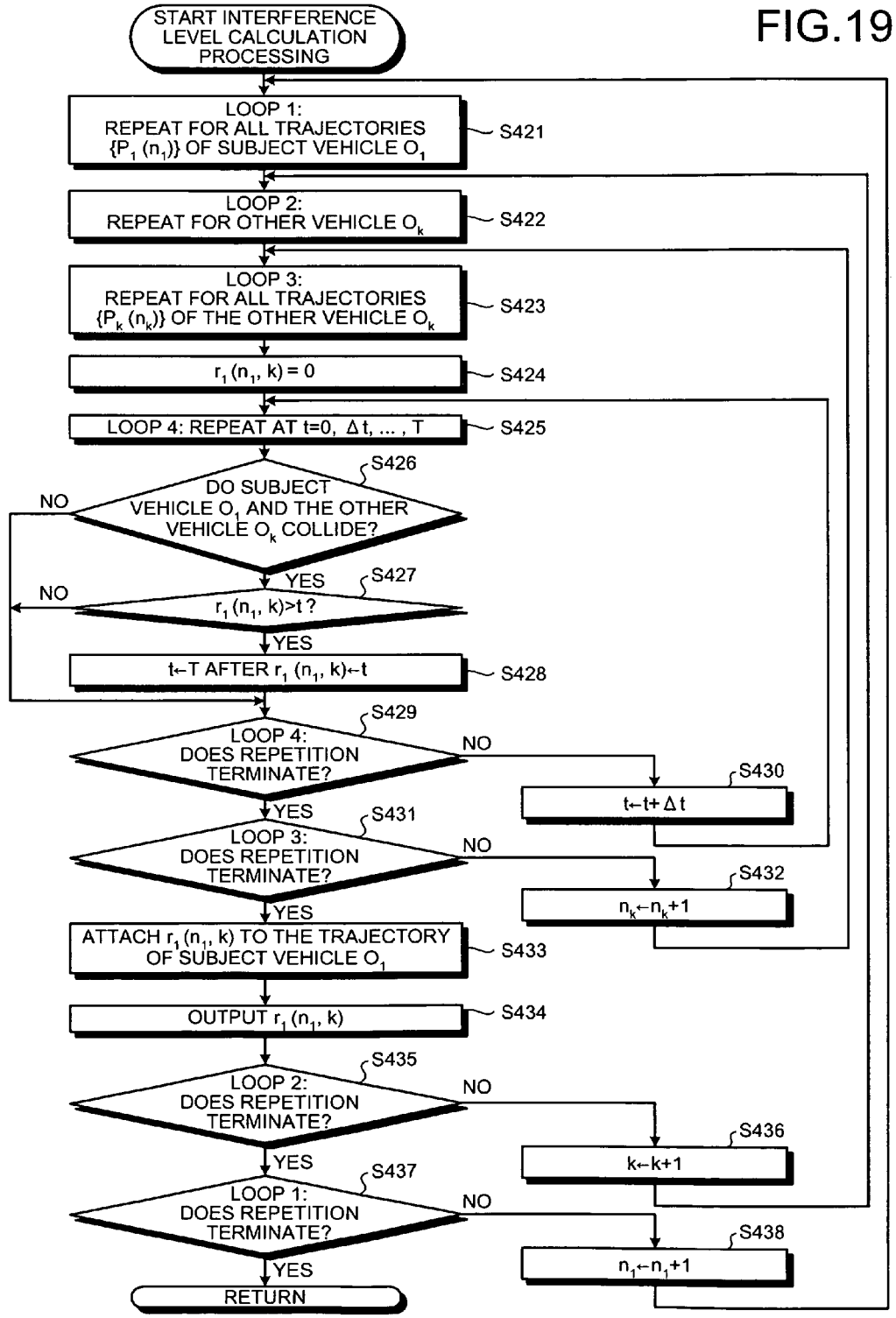
FIG. 19 is a flowchart showing details of interference level calculation processing by an object path prediction method according to a fourth embodiment of the present invention.

FIG. 19 is a flowchart showing details of interference level calculation processing (corresponding to step S34 in FIG. 13) by the object path prediction method according to the fourth embodiment. Also in the fourth embodiment, the object $O_1$ is assumed to be subject vehicle. For convenience of description, other objects $O_k$ (k=2, 3, . . . , K) are all assumed to be also four-wheel vehicles and called the other vehicle $O_k$.

The interference level calculation part 106 first starts repetitive processing (Loop1) for all trajectories of subject vehicle $O_1$(step S421). For this purpose, one trajectory is selected from the set of trajectories $\{P_1(n_1)\}$ and subsequent processing is performed for the selected trajectory.

Next, the interference level calculation part 106 starts repetitive processing (Loop2) for the other vehicle $O_k$(step S422). In this Loop2, the counter k for identification of other vehicles is initialized to k=2 and the value of k is incremented each time repetitive processing is completed.

The interference level calculation part 106 performs repetitive processing (Loop3) for all elements of the set of trajectories $\{P_k(n_k)\}$ generated at step S33 also for the other vehicle $O_k$ is performed (step S423). In this repetitive processing, the level of interference determined by the counter $n_1$ for repetition of Loop1, that is, for identifying a trajectory generated for subject vehicle $O_1$ and the counter $N_1$ for identification of other vehicles is set as $r_1(n_1, k)$ and the trajectory generation time T is set as the value of $r_1(n_1, k)$ (step S424).

Subsequently, the interference level calculation part 106 starts repetitive processing (Loop4) to evaluate interference between the trajectory $P_1(n_1)$ of subject vehicle $O_1$ and the trajectory $P_k(n_k)$ of the other vehicle $O_k$(step S425). In this Loop4, the distance between the trajectory $P_1(n_1)$ and the trajectory $P_k(n_k)$ at the same time is sequentially determined at times t=0, Δt, . . . , T to determine whether subject vehicle $O_1$ and the other vehicle $O_k$ have collided. The definition of collision for this determination is the same as that in the third embodiment and a determination is made that a collision has occurred when the distance between subject vehicle $O_1$ and the other vehicle $O_k$ is shorter than the interference distance.

If, as a result of determining the distance between subject vehicle $O_1$ and the other vehicle $O_k$, the interference level calculation part 106 determines that subject vehicle $O_1$ and the other vehicle $O_k$ have collided (Yes at step 426), and the value of the level of interference $r_1(n_1, k)$ is greater than the time t at that time (the time needed for collision from the initial position) (Yes at step S427), t is set as the value of $r_1(n_1, k)$ and then t is set as T (step S428). Therefore, in this case, Loop4 terminates (Yes at step S429).

In contrast, if subject vehicle $O_1$ and the other vehicle $O_k$ collide (Yes at step 426) and the value of the level of interference $r_1(n_1, k)$ is equal to or smaller than the time t at that time (No at step S427), the interference level calculation part 106 proceeds to step S429 to determine whether to terminate Loop4. When subject vehicle $O_1$ and the other vehicle $O_k$ do not collide (No at step 426), the interference level calculation part 106 also proceeds to step S429.

If, at step S429, the time t has not reached T, Loop4 is repeated (No at step S429). In this case, the interference level calculation part 106 increments the value of t by $\Delta t$ (step S430) and returns to step S425 before repeating Loop4. If, on the other hand, the time t has reached T at step S429, the interference level calculation part 106 terminates Loop4 (Yes at step S429).

With the repetitive processing of Loop4 described above, the value of the level of interference $r_1(n_1, k)$ will be the minimum collision time that is the shortest time needed for collision from the initial position among collisions occurring between subject vehicle $O_1$ and the other vehicle $O_k$.

After terminating Loop4, the interference level calculation part 106 performs determination processing whether to repeat Loop3. That is, if there is any of trajectories generated for the other vehicle $O_k$ whose interference evaluation with one trajectory $P_1(n_1)$ of subject vehicle $O_1$ has not been performed (No at step S431), $n_k$ is incremented to $n_k+1$ (step S432) and Loop3 is repeated after returning to step S423.

If, on the other hand, all interference evaluations of trajectories generated for the other vehicle $O_k$ with one trajectory $P_1(n_1)$ of subject vehicle $O_1$ have been performed (Yes at step S431), interference evaluations with one trajectory $P_k(n_k)$ of the other vehicle $O_k$ have been completed. Therefore, in this case, the interference level calculation part 106 assigns the final level of interference $r_1(n_1, k)$ evaluating interference between the trajectory $P_1(n_1)$ of subject vehicle $O_1$ and all trajectories of the other vehicle $O_k$ (step S433) and outputs the assigned value to store it in the storage section 108 (step S434).

Steps S435 to S438 that follow concerns determination processing of repetition of Loop2 and Loop1 and are the same as steps S414 to S417 for interference level calculation processing described for the third embodiment.

According to the fourth embodiment of the present invention described above, a computer having a storage unit that stores at least the positions of a plurality of objects and an internal state including the speed of each object reads the positions and internal states of the plurality of objects from the storage unit, generates trajectories in a space-time consisting of time and space from changes of the positions that can be taken by each of the plurality of objects with the passage of time based on the read positions and internal states of the objects, predicts probabilistically paths of the plurality of objects by using the generated trajectory, and based on results of the prediction, calculates the level of interference quantitatively showing an extent of interference between trajectories that can be followed by the specific object in the space-time and those that can be followed by the other objects so that safety can be secured even in situations that can actually occur.

Also, according to the fourth embodiment, by applying the level of interference defined by using the minimum collision time, possibilities of collision with other objects can precisely be predicted within a practical period of time.

(Fifth Embodiment)

A fifth embodiment of the present invention is characterized in that interference between subject vehicle and a surrounding space-time environment is evaluated by summarizing results of interference level calculation between subject vehicle and other vehicles obtained in the same manner as in the third embodiment. The functional configuration of an object path prediction apparatus according to the fifth embodiment is the same as that of the object path prediction apparatus 101 according to the third embodiment (See FIG. 12). An object path prediction method according to the fifth embodiment is the same as that according to the third embodiment except interference level calculation processing.

Figure 20:
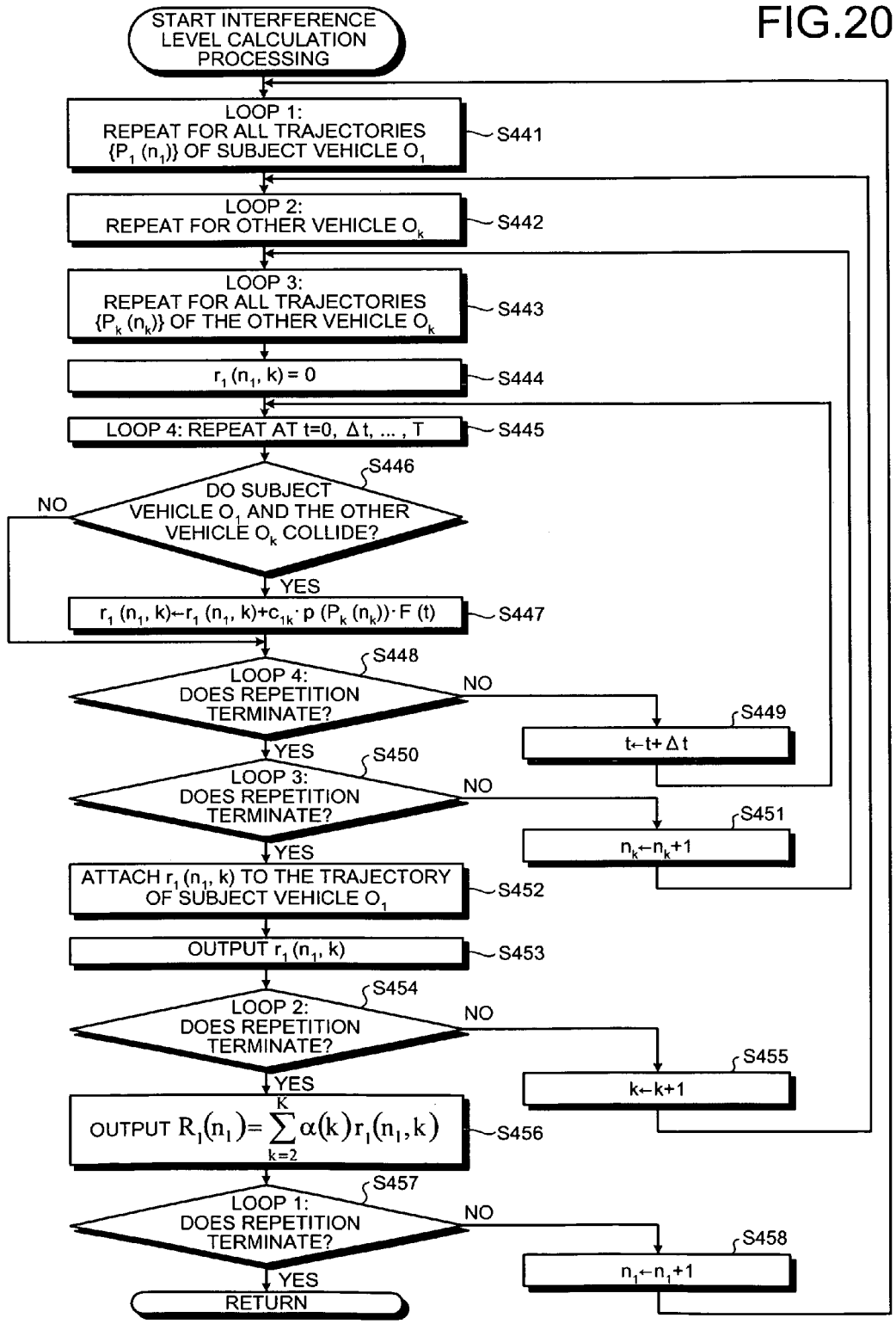
FIG. 20 is a flowchart showing details of interference level calculation processing by an object path prediction method according to a fifth embodiment of the present invention.

FIG. 20 is a flowchart showing details of interference level calculation processing (corresponding to step S34 in FIG. 13) by the object path prediction method according to the fifth embodiment of the present invention. The interference level calculation part 106 first starts repetitive processing (Loop1) for all trajectories of subject vehicle $O_1$ (step S441). For this purpose, one trajectory is selected from the set of trajectories $\{P_1(n_1)\}$ and subsequent processing is performed for the selected trajectory.

In the fifth embodiment, repetitive processing (Loop2) for the other vehicle $O_k$, repetitive processing (Loop3) for all elements of a set of trajectories $\{P_k(n_k)\}$ of the other vehicle $O_k$, and repetitive processing (Loop4) for evaluating interference between the trajectory $P_1(n_1)$ of subject vehicle $O_1$ and the trajectory $P_k(n_k)$ of the other vehicle $O_k$ are the same as those in the third embodiment. That is, processing at steps S442 to S455 shown in FIG. 20 is the same as that of steps S402 to S415 (See FIG. 16) described in interference level calculation processing of the third embodiment.

After repetitive processing of Loop2 terminates, the interference level calculation part 106 assigns a weight $\alpha(k)$ ($>0$) in accordance with the other vehicle $O_k$ to the level of interference $r_1(n_1, k)$ obtained from Loop2 to Loop4, calculates a total level of interference as summation of these by:

[Formula 8]

$$R_1(n_1) = \sum_{k=2}^{K} \alpha(k) r_1(n_1, k) \qquad (6)$$

and output a calculation result thereof to store it in the storage section 108 (step S456). The value of the weight $\alpha(k)$ may all be equal and constant (for example, 1), or a value in accordance with conditions such as the type of the other vehicle $O_k$ may be assigned. As a result, it becomes possible to evaluate interference between the trajectory $P_1(n_1)$ of subject vehicle $O_1$ and the whole environment including all other vehicles $O_2, \ldots, O_k$.

The total level of interference $R_1(n_1)$ may be defined by:

[Formula 9]
$$R_1(n_1) = \max_k (\alpha(k) r_1(n_1, k)) \quad (7)$$

In this case, danger of the most dangerous object $O_k$ will be handled as the total level of interference. If the definition of Formula (6) is followed, there is a possibility that the total level of interference is calculated to be low when, for example, subject vehicle $O_1$ interferes with a small number of objects, but not with many remaining objects. Thus, even a situation in which it is intuitively very dangerous for a human because a small number of vehicles run near subject vehicle $O_1$, there is a possibility that, contrary to intuition, such a situation is determined to be safe. On the other hand, by performing interference evaluations based on a definition of Formula (7) or the like, a possibility of making a determination to be safe contrary to intuition, as described above, can be reduced.

Subsequently, the interference level calculation part 106 performs determination processing whether to repeat Loop1. That is, if there remains a trajectory of the set of trajectories $\{P_1(n_1)\}$ of subject vehicle $O_1$ whose interference evaluation should be performed (No at step S457), the interference level calculation part 106 increments the value of $n_1$ by 1 (step S458) and repeats Loop1 after returning to step S441. If, on the other hand, there remains no trajectory of the set of trajectories $\{P_1(n_1)\}$ of subject vehicle $O_1$ whose interference evaluation should be performed (Yes at step S457), the interference level calculation part 106 terminates Loop1 before terminating interference level calculation processing (step S34).

Figure 21:
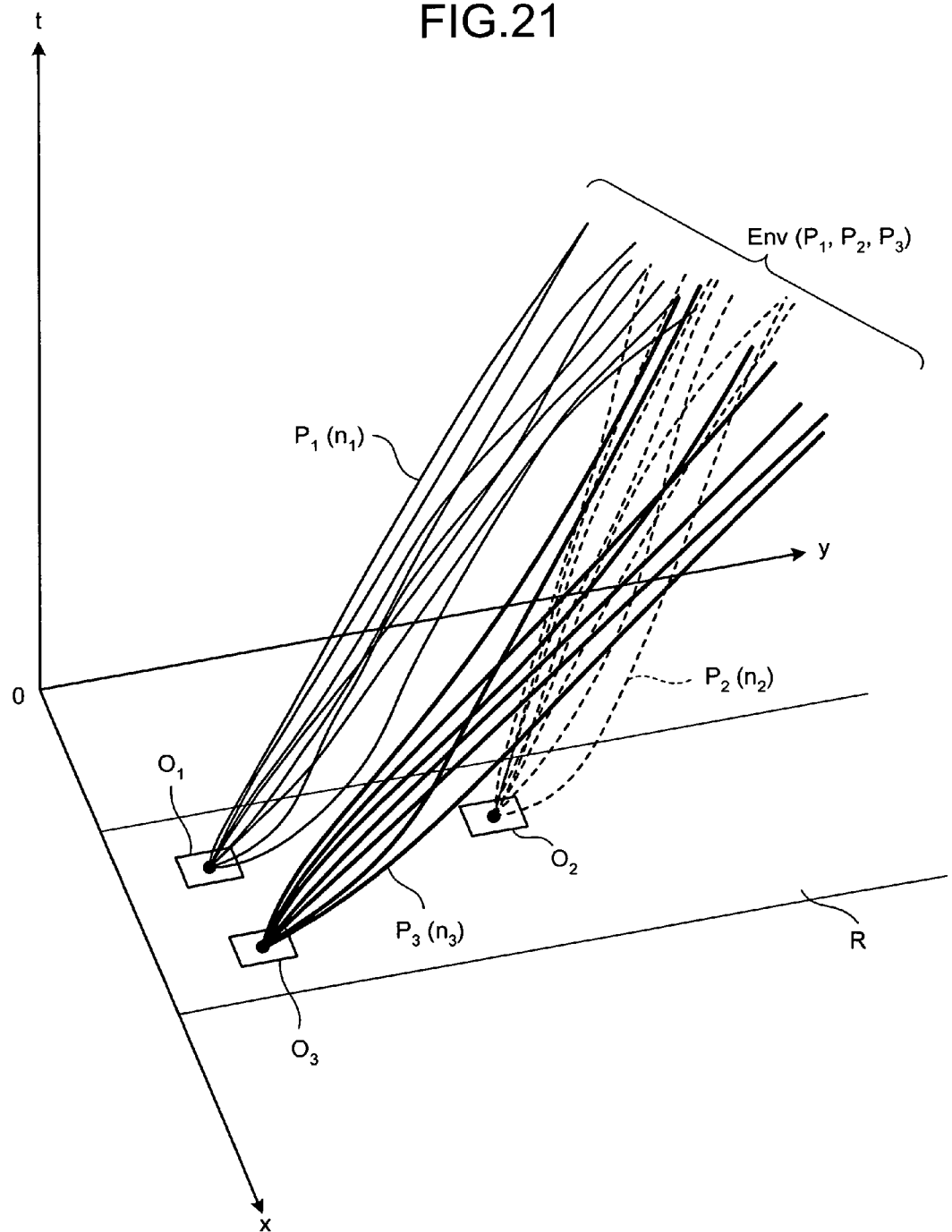
FIG. 21 is an explanatory diagram schematically showing another configuration of the space-time environment.

FIG. 21 is a diagram schematically showing the configuration of the space-time environment to which the object path prediction method according to the fifth embodiment is applied. A space-time environment $Env(P_1, P_2, P_3)$ shown in the figure shows a case in which two other vehicles are present with respect to subject vehicle $O_1$. Trajectories $P_1(n_1)$ of subject vehicle $O_1$ are denoted by solid lines, trajectories $P_2(n_2)$ of a second vehicle $O_2$ are denoted by broken lines, and trajectories $P_3(n_3)$ of a third vehicle $O_3$ are denoted by thick lines. By performing interference evaluations using the total level of interference $R_1(n_1)$ with the space-time environment $Env(P_1, P_2, P_3)$, instead of handling the level of interference $r_1(n_1, 2)$ with the second vehicle $O_2$ and the level of interference $r_1(n_1, 3)$ with the third vehicle $O_3$ separately, danger of subject vehicle $O_1$ can be averted in accordance with the surrounding environment.

According to the fifth embodiment of the present invention described above, a computer having a storage unit that stores at least the positions of a plurality of objects and an internal state including the speed of each object reads the positions and internal states of the plurality of objects from the storage unit, generates trajectories in a space-time consisting of time and space from changes of the positions that can be taken by each of the plurality of objects with the passage of time based on the read positions and internal states of the objects, predicts probabilistically paths of the plurality of objects by using the generated trajectory, and based on results of the prediction, calculates the level of interference quantitatively showing an extent of interference between trajectories that can be followed by the specific object in the space-time and those that can be followed by the other objects so that safety can be secured even in situations that can actually occur.

Also, according to the fifth embodiment, by using the total level of interference, interference evaluations can be performed with precision when the number of objects constituting the space-time environment is large.

Incidentally, also in the fifth embodiment, any of various definitions like in the third embodiment can be adopted as the value of the coefficient $c_{1k}$ or $F(t)$ when the level of interference $r_1(n_1, k)$ is increased due to a collision. The level of interference $r_1(n_1, 3)$ may also be defined, like in the fourth embodiment, as the minimum collision time.

In addition, when performing interference evaluations in the fifth embodiment, both the total level of interference $R_1(n_1)$ and the individual level of interference $r_1(n_1, k)$ may be combined for interference evaluation.

(Sixth Embodiment)

Figure 22:
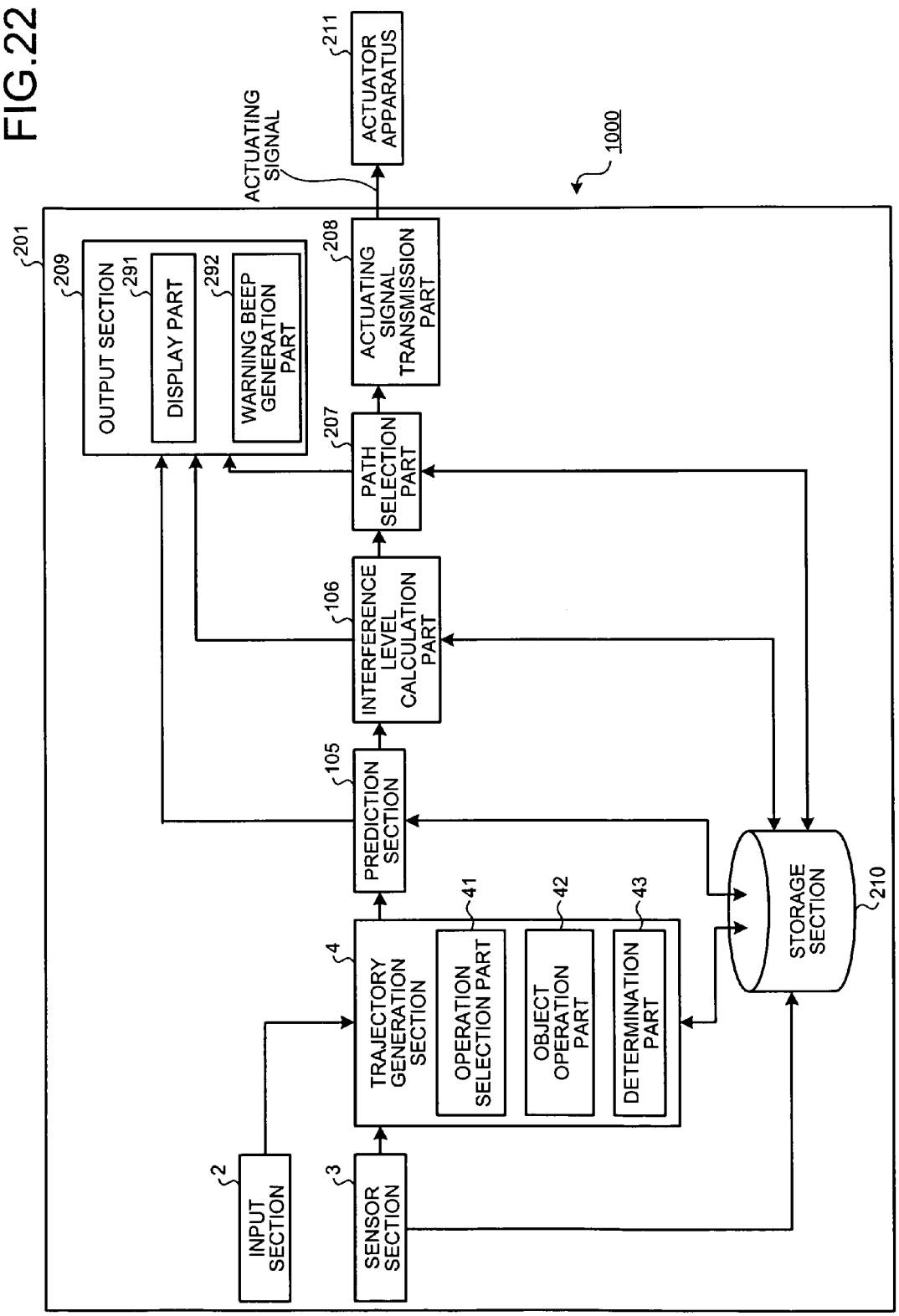
FIG. 22 is a block diagram showing the functional configuration of an automatic operation system including an object path prediction apparatus according to a sixth embodiment of the present invention.

FIG. 22 is a block diagram showing the functional configuration of an automatic operation system constituted by using an object path prediction apparatus according to a sixth embodiment of the present invention. An automatic operation system 1000 shown in the figure is mounted on a movable body such as a four-wheel vehicle and includes an object path prediction apparatus 201 for setting a path to be taken by subject vehicle by predicting paths that can be taken by subject vehicle, which is a specific object, and those that can be taken by other objects (including vehicles, people, and obstacles) and an actuator apparatus 211 for operating subject vehicle in accordance with an actuating signal for realizing the path set by the object path prediction apparatus 201.

The object path prediction apparatus 201 includes the input section 2 into which various kinds of information are input from outside, the sensor section 3 for detecting positions and internal states of objects present within a predetermined range, the trajectory generation section 4 for generating a trajectory in space-time constituted by time and space from changes of the positions that can be taken by an object with the passage of time based on results detected by the sensor section 3, the prediction section 105 for making a probabilistic prediction about the path of the object using the trajectory generated by the trajectory generation section 4, the interference level calculation part 106 for calculating the level of interference showing quantitatively an extent of interference between paths that can be taken by subject vehicle and those that can be taken by other objects based on results of predictions made by the prediction section 105, a path selection part 207 for selecting a path that subject vehicle should take in accordance with the level of interference calculated by the interference level calculation part 106, an actuating signal transmission part 208 for transmitting an actuating signal to the actuator apparatus 211 after generating the actuating signal corresponding to a result of selection made by the path selection part 207, an output section 209 for outputting various kinds of information concerning processing performed by the object path prediction apparatus 201, and a storage section 210 for storing various kinds of information including positions and internal states of objects detected by the sensor section 3. In FIG. 22, the same reference numerals are granted to components having the same functional configuration as that of the object path prediction apparatus 101 according to the third embodiment as in FIG. 12.

The output section 209 has a display part 291 for displaying/outputting information concerning processing performed by the prediction section 105, the interference level calculation part 106, and the path selection part 207 as information including images, and a warning beep generation part 292 for generating a warning beep in accordance with results of predictions made by the prediction section 105 or results of calculations made by the interference level calculation part 106.

The storage section 210 stores, in addition to detection results by the sensor section 3, trajectories generated by the trajectory generation section 4, results of predictions made by the prediction section 105, results of interference level calculation by the interference level calculation part 106, results of path selection by the path selection part 207, operations selected by the operation selection part 41 in the trajectory generation section 4 and the like.

Figure 23:
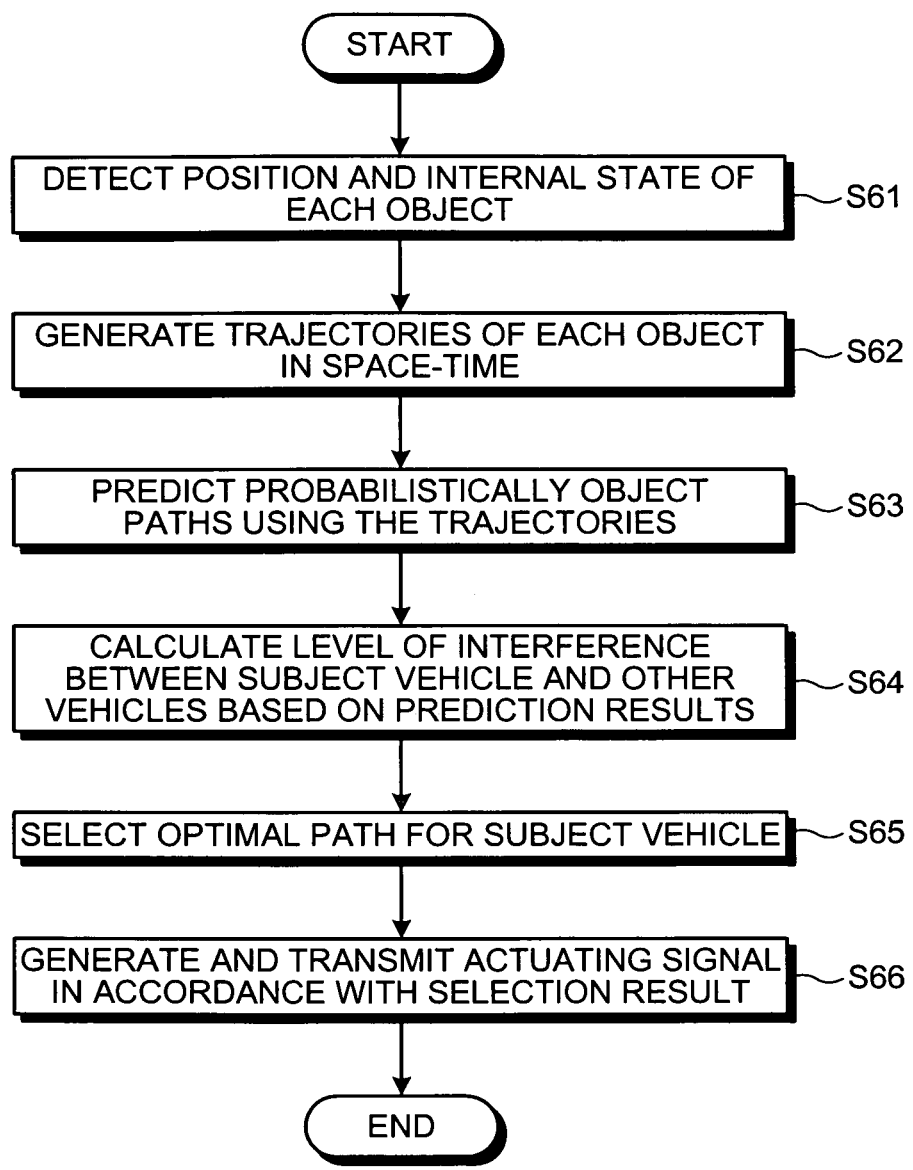
FIG. 23 is a flowchart showing the overview of an object path prediction method according to the sixth embodiment of the present invention.

Next, an object path prediction method according to the sixth embodiment will be described. FIG. 23 is a flowchart showing the overview of processing of the object path prediction method according to the sixth embodiment. Also in the sixth embodiment, all objects to be predicted are assumed to move on a two-dimensional plane for a description.

In the sixth embodiment, detecting processing of the position and internal state of each object (step S61), trajectory generation processing for each object in a space-time (step S62), probabilistic prediction processing of object paths using trajectories (step S63), and interference level calculation processing between subject vehicle and other vehicles based on prediction results (step S64) are the same as step S31, step S32, step S33, and step S34 described in the third embodiment respectively. Processing at step S65 and thereafter will be described below in detail. At step S65, path selection processing in accordance with the level of interference calculated in interference level calculation processing at step S64 is performed (step S65). In the automatic operation technology of a movable body that moves in a wide range such as an automobile, as described above, in addition to the path finding technology in which an influence of at least other dynamic obstacles is not considered or an influence thereof is not practically needed for calculation, a path calculation technology by which calculation needed for avoiding collision with dynamic obstacles is realized within a practical time to avoid danger while running is needed. In the sixth embodiment, two evaluation values are used in path selection processing to avert danger. The first evaluation value is the level of interference calculated in interference level calculation processing and the first path selection processing is performed by using the level of interference. If a plurality of paths is selected as a result of the first path selection processing, the second evaluation value stored in the storage section 210 is used to perform the second path selection processing. In the second path selection processing, it is preferable to use, in addition to a selection criterion by which a path contains components along a path to a destination, an additional selection criterion (described later) to further narrow down paths in combination as the second evaluation value when appropriate.

By evaluating the levels of interference between sets of trajectories of other vehicles and a set of trajectories of subject vehicle with endpoints different from each other and selecting paths in accordance with the evaluated levels of interference, as described above, an optimal path is determined each time without presetting a location such as a destination to be reached by subject vehicle to precisely avert danger while subject vehicle travels so that safety can be secured (See FIG. 15). As a result, a problem shown in FIG. 14, that is, a fatal problem that safety is not secured even if subject vehicle travels toward a preset location on a road can be solved.

Figure 24:
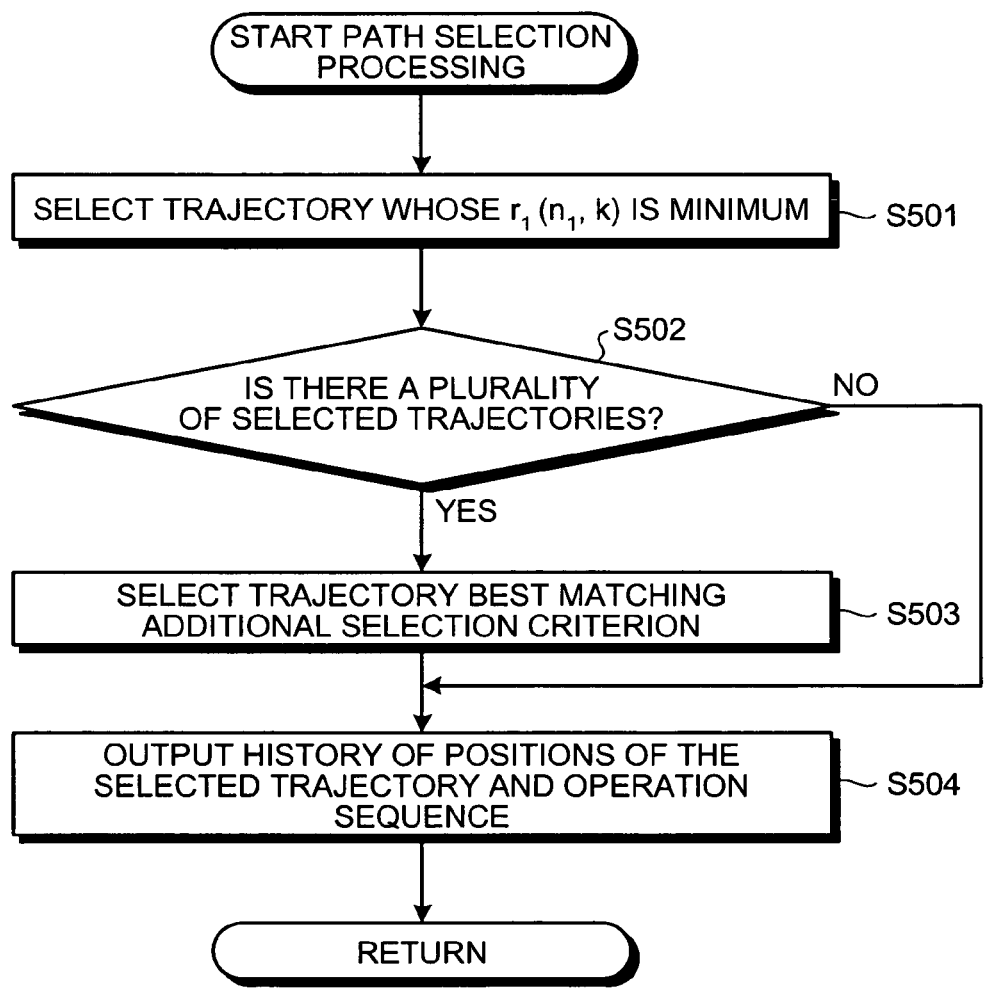
FIG. 24 is a flowchart showing details of path selection processing by the object path prediction method according to the sixth embodiment of the present invention.

FIG. 24 is a flowchart showing details of path selection processing. In FIG. 24, the path selection part 207 selects a trajectory whose value of the level of interference $r_1(n_1, k)$ calculated in interference level calculation processing is minimum (step S501).

If, as a result of selecting a trajectory whose level of interference $r_1(n_1, k)$ is minimum, only one trajectory remains (No at step S502), the path selection part 207 reads a history of the positions $(x(t), y(t))$ corresponding to the selected trajectory and the operation sequence $\{u(t)\}$ at $t=0$ to T from the storage section 210 and outputs them to the actuating signal transmission part 208 (step S504). In contrast, if, as a result of selecting a trajectory whose level of interference $r_1(n_1, k)$ is minimum, a plurality of trajectories remains (Yes in step S502), the path selection part 207 proceeds to step S503.

At step S503, the path selection part 207 selects a trajectory that best matches the additional selection criterion from among a plurality of trajectories selected at step S501 by using the selection criterion by which a path contains components along a path to a destination and the additional selection criterion which is previously set and stored in storage section 210 (step S503). A condition that has almost no possibility to have a duplicate value among trajectories may be set as the additional selection criterion.

Some examples of the additional selection criterion are given below:

(1) Among positions of subject vehicle $O_1$ after an operation (after $\Delta t$), a position (x coordinate in FIG. 4 and the like) in a road width direction that is nearest to the center of the lane on which subject vehicle travels. In this case, a trajectory for running the most desirable position on the road is selected. If a trajectory that takes the most stable positioning during $t=0$ to T is selected, a trajectory may be selected so that the sum of the position in the road width direction after each operation at $t=0$ to T is minimum.

(2) Among positions of subject vehicle $O_1$ after an operation (after $\Delta t$), a position in a traveling direction (y coordinate direction in FIG. 4 and the like) is maximal. In this case, the fastest trajectory is selected. Or, a trajectory whose position at $t=T$ is maximal may also be selected.

(3) The magnitude of acceleration at the initial time ($t=0$) is minimum. In this case, a trajectory whose acceleration is most smooth is selected. If a trajectory whose acceleration is most smooth in the operation sequence at $t=0$ to T is selected, a trajectory may be selected so that the sum of the magnitude of acceleration after each operation at $t=0$ to T is minimum.

(4) The magnitude of angular velocity at the initial time ($t=0$) is minimum. In this case, a trajectory whose steering is most smooth is selected. If a trajectory whose steering is most smooth in the operation sequence at $t=0$ to T is selected, like (3), a trajectory may be selected so that the sum of the magnitude of angular velocity after each operation at $t=0$ to T is maximal.

According to the path selection processing described above, by selecting a trajectory most likely to avert danger of subject vehicle $O_1$ as a trajectory in a space-time, a path that subject vehicle $O_1$ should be taken on an actual two-dimensional plane will, as a result, have been selected.

If only one trajectory remains at step S503, the path selection part 207 proceeds to step S504 described above. If a plurality of trajectories still remains even after applying the additional selection criterion, for example, a setting can be made so that a trajectory for which the value of the counter $n_1$ or k takes a minimal or maximal value is automatically selected.

Subsequent to the path selection processing described above, the actuating signal transmission part 208 generates a history of positions $(x(t), y(t))$ corresponding to the trajectory output in accordance with a result of selection at step S65 and an actuating signal in accordance with the operation sequence $\{u(t)\}$ at $t=0$ to T and transmits them to the actuator apparatus 211 (step S66).

The actuating signal generated and transmitted by the actuating signal transmission part 208 at step S66 depends on the configuration of the actuator apparatus 211. For example, if the actuator apparatus 211 is a mechanical apparatus such as a steering gear, an accelerator, and a brake, the actuating signal transmission part 208 can output a history of positions (x(t), y(t)) received from path selection part 207 and operations {u(t)} unchanged as an actuating signal.

In contrast, if the actuator apparatus 211 is an apparatus for adding operating torque to a mechanical apparatus such as a steering gear, an accelerator, and a brake, the actuating signal transmission part 208 may transmit a history of positions received from path selection part 207 (x(t), y(t)) and operations {u(t)} unchanged as an actuating signal or an operating torque to be added to such a mechanical apparatus during operation after calculating it. In the former case, an operating torque will be calculated on the actuator apparatus 211 side.

If the actuator apparatus 211 is an apparatus for adding operating torque, and the driver can switch to a manual operation by adding an operating torque greater than that of the actuator apparatus 211, that is, the apparatus can be overridden by the driver, the automatic operation system 1000 can also be applied as an auxiliary apparatus of operation so that, while a path is selected, an operation reflecting the driver's intention can be realized.

Incidentally, by detecting conditions of the road surface on which subject vehicle $O_1$ travels using the sensor section 3, the actuator apparatus 211 may be controlled based on feedback in accordance with the conditions of the road surface.

Figure 25:
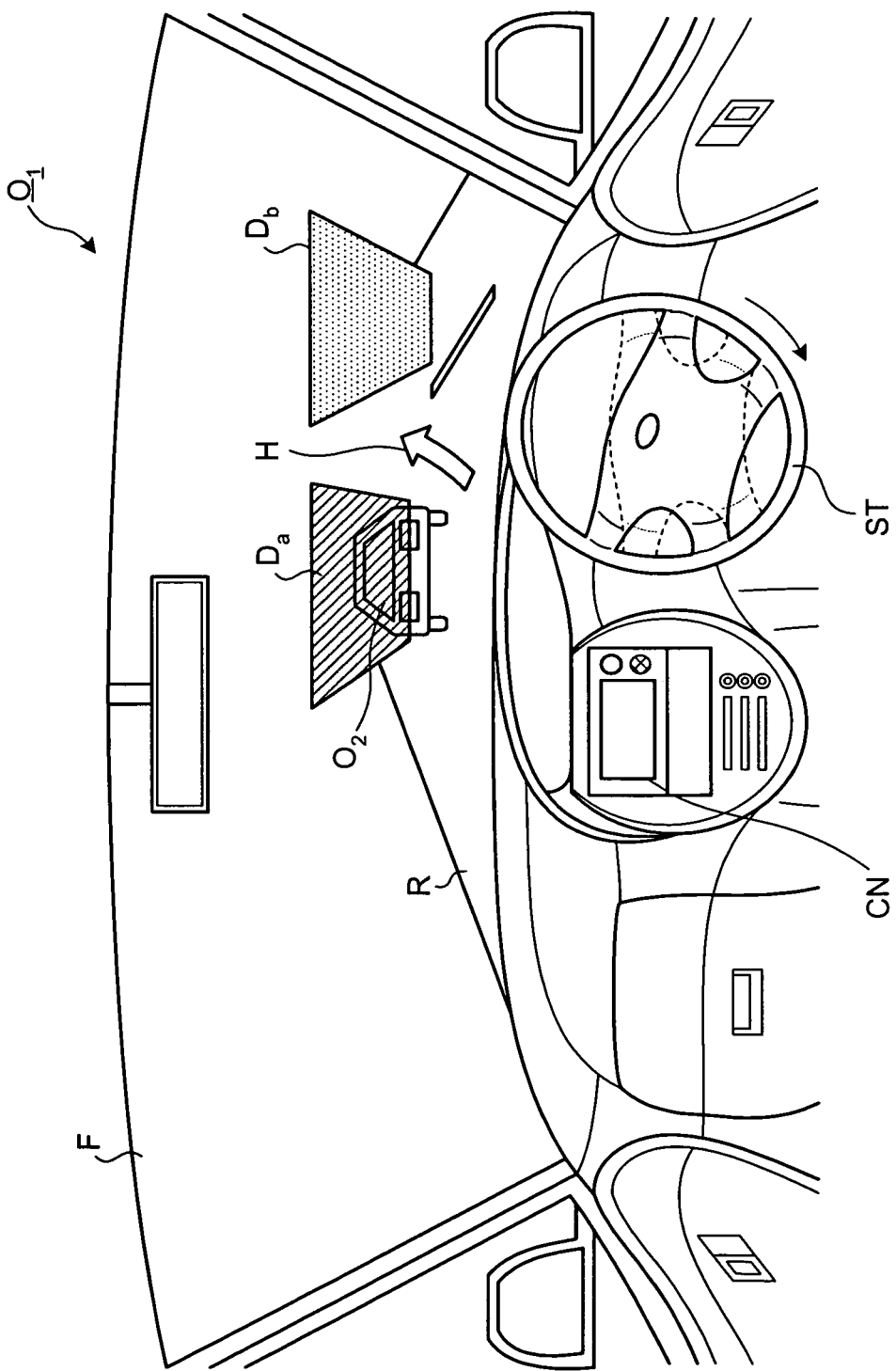
FIG. 25 is a diagram showing a display output example of path setting results by the object path prediction apparatus according to the sixth embodiment of the present invention.

FIG. 25 is a diagram showing a display output example of path selection results or the like in the display part 291 of the output section 209 and a diagram schematically showing a display output example when a path selection is made in a space-time environment Env' $(P_1, P_2)$ (See FIG. 6) constituted by subject vehicle $O_1$ and another vehicle $O_2$. More specifically, FIG. 25 shows a case in which a setup path is displayed by superimposition on the front glass F with a translucent arrow H and also an area where, among paths that can be taken by subject vehicle $O_1$ on a two-dimensional plane in accordance with the level of interference $r_1(n_1, 2)$ between subject vehicle $O_1$ and the other vehicle $O_2$, the value of the level of interference $r_1(n_1, 2)$ thereof exceeds a preset threshold is translucently displayed by superimposition on the front glass F of the object $O_1$ (subject vehicle). The case shown in FIG. 25 schematically shows a situation in which the actuator apparatus 211 causes steering ST to generate operating torque so that operating torque to rotate the steering ST clockwise is generated in order to take a setup path.

Also in FIG. 25, two areas translucently displayed, the area $D_a$ and the area $D_b$, have different illumination (Here, the area $D_a$ is brighter). Such a difference in illumination corresponds to a difference of values of the level of interference $r_1(n_1, 2)$ and the illumination signifies that the value of the level of interference $r_1(n_1, 2)$ increases if a path approaching the area $D_a$ is selected. In this sense, FIG. 25 visually indicates that taking a path to the area $D_b$ with a relatively smaller value of the level of interference $r_1(n_1, 2)$ enables the drive to drive in order to avert danger.

In addition to displaying by the display part 291, the warning beep generation part 292 may generate a warning beep (including voice) when the value of the level of interference $r_1(n_1, 2)$ obtained for an anticipated path in accordance with the current operation exceeds a predetermined threshold.

Figure 26:
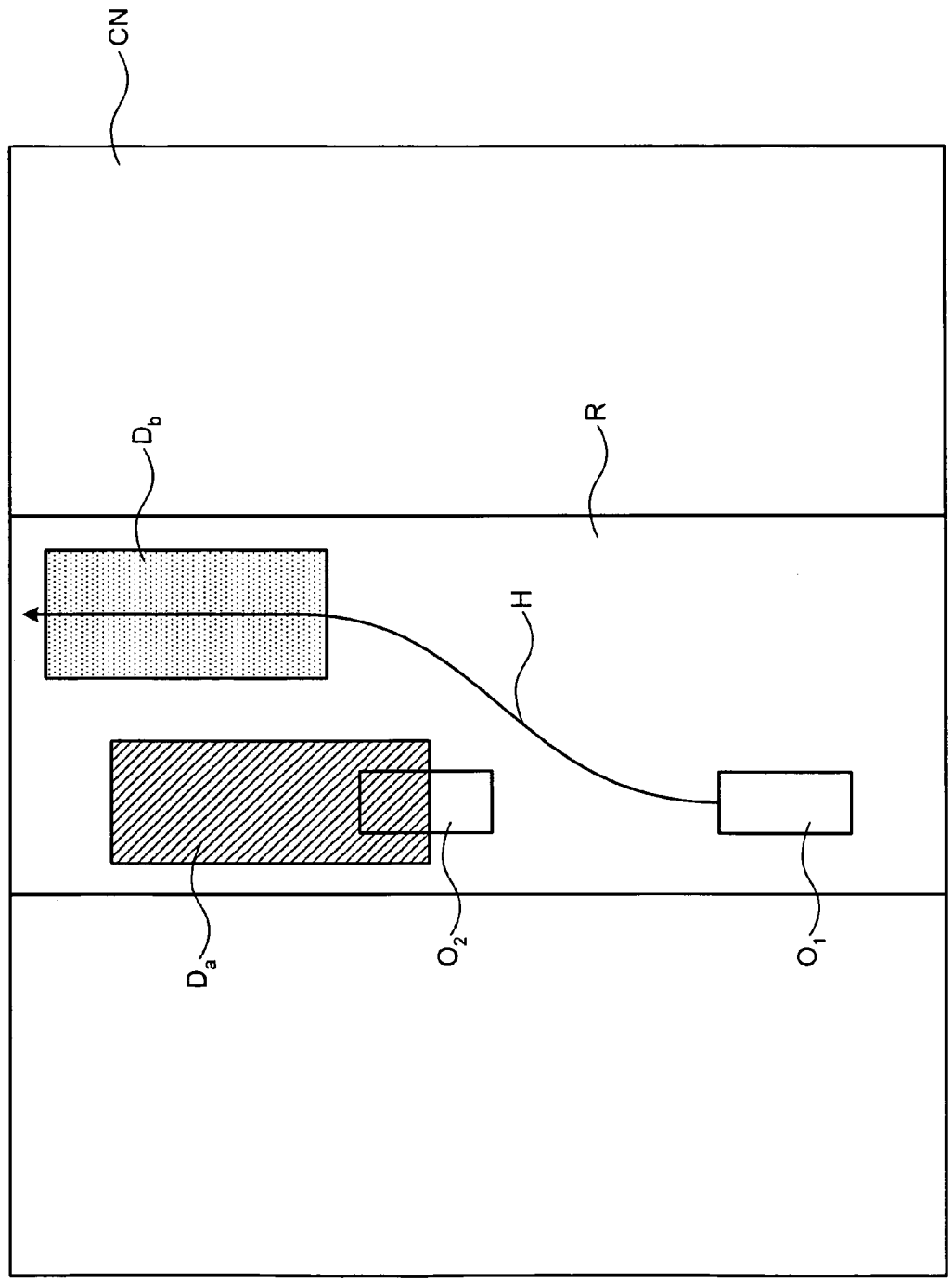
FIG. 26 is a diagram showing a display output example (second example) of path setting results by the object path prediction apparatus according to the sixth embodiment of the present invention.

The display output example in the output section 209 is not limited to this and, for example, a setup path and interference evaluation results may be displayed by causing the display screen CN (See FIG. 26) of a car navigation system to have the function of the display part 291. In this case, as shown in FIG. 26, the setup path is displayed by the arrow H and also a difference of the level of interference between the two areas, the area $D_a$ and the area $D_b$, is displayed by gradations in color for each area on a two-dimensional plane displayed on the display screen CN.

According to the sixth embodiment of the present invention described above, a computer having a storage unit that stores at least the positions of a plurality of objects and an internal state including the speed of each object reads the positions and internal states of the plurality of objects from the storage unit, generates trajectories in a space-time consisting of time and space from changes of the positions that can be taken by each of the plurality of objects with the passage of time based on the read positions and internal states of the objects, predicts probabilistically paths of the plurality of objects by using the generated trajectory, calculates the level of interference quantitatively showing an extent of interference between paths that can be taken by the specific object and those that can be taken by the other objects based on results of the prediction, and selects the path to be taken by the specific object in accordance with the calculated level of interference within a practical time so that safety can be secured even in situations that can actually occur.

Also, according to the sixth embodiment, by applying the level of interference defined by using the collision probability in a space-time between a specific object and other objects and selecting a trajectory whose level of interference is minimum in the space-time, a path, among paths that can be taken by the specific object, whose possibility of collision with other objects is the lowest can be set with precision.

Further, according to the sixth embodiment, by making path predictions of objects using a space-time environment formed in a space-time consisting of time and space, path predictions of not only static objects, but also dynamic objects can be made with precision.

In addition, according to the sixth embodiment, since trajectories of detected objects are generated independently, a specific object (for example, subject vehicle) can be distinguished from other objects. As a result, danger that may lurk between the specific object and the other objects can be predicted easily and precisely.

Incidentally, in the sixth embodiment, the coefficient $c_{1k}$ in Formula (5) for increasing the value of the level of interference $r_1(n_1, k)$ may not be constant, and for example, the coefficient $c_{1k}$ may be a magnitude of relative velocity between subject vehicle $O_1$ and the other vehicle $O_k$ at the time of collision. Or, a value indicating seriousness of damage may be assigned to the coefficient $c_{1k}$.

Also in the sixth embodiment, the level of interference may be calculated by assuming that an operation of subject vehicle $O_1$ is maintained. Situations can thereby be simplified for prediction when, for example, there are many surrounding objects, leading to reduced calculated amounts in the trajectory generation section, the prediction section, the interference level calculation part and the path selection part.

(Seventh Embodiment)

A seventh embodiment of the present invention is characterized in that interference between subject vehicle and a surrounding space-time environment is evaluated by summarizing results of interference level calculation between subject vehicle (specific object) and other vehicles obtained in the same manner as in the sixth embodiment and a path to be taken by subject vehicle is selected based on the evaluation result. The functional configuration of an object path prediction apparatus according to the seventh embodiment is the same as that of the object path prediction apparatus 201 according to the sixth embodiment (See FIG. 22). An object path prediction method according to the seventh embodiment is the same as that according to the sixth embodiment except interference level calculation processing.

Figure 27:
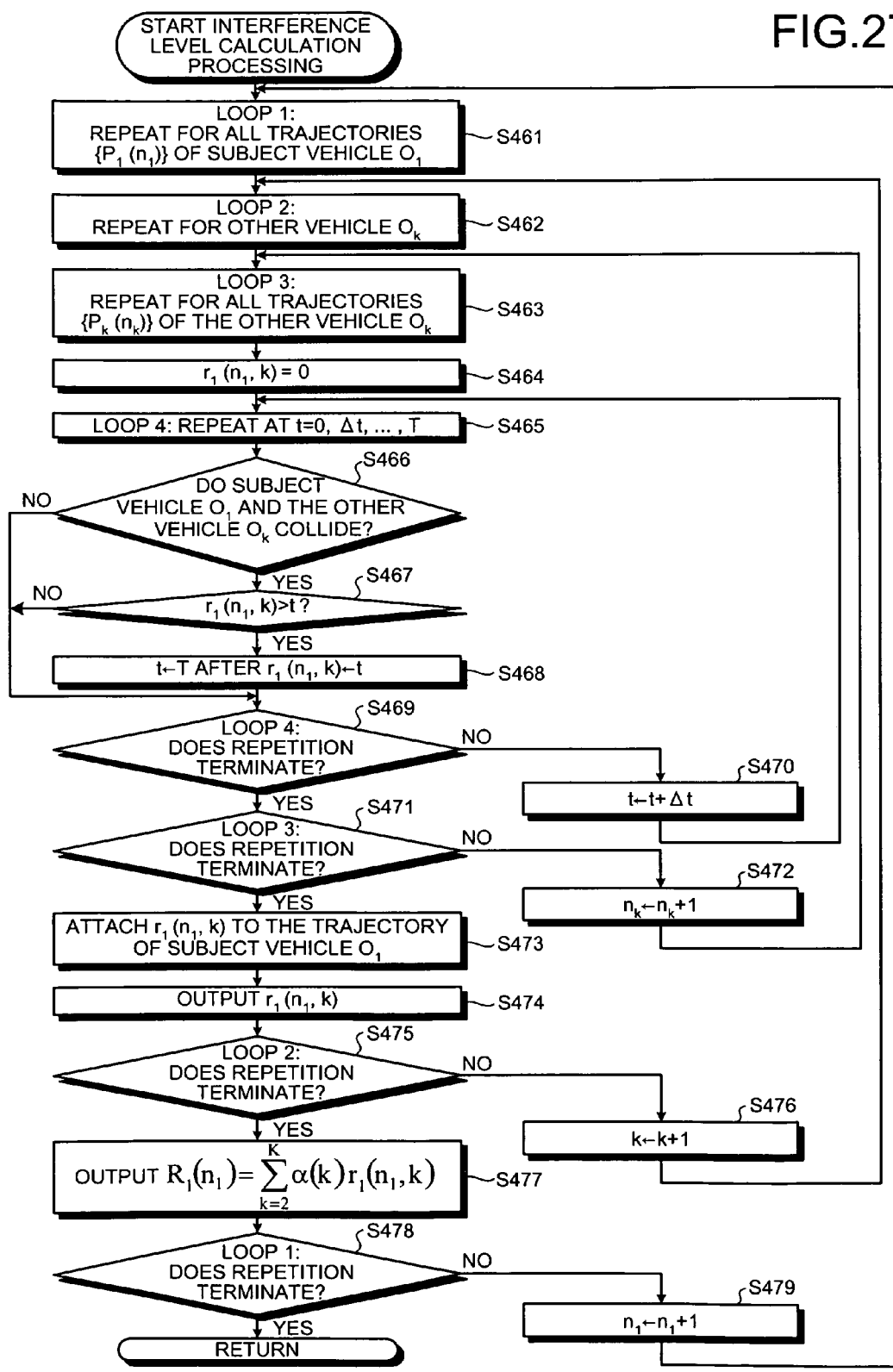
FIG. 27 is a flowchart showing details of interference level calculation processing by an object path prediction method according to a seventh embodiment of the present invention.

FIG. 27 is a flowchart showing details of interference level calculation processing (corresponding to step S64 in FIG. 23) by the object path prediction method according to the seventh embodiment. The interference level calculation part 106 first starts repetitive processing (Loop1) for all trajectories of subject vehicle $O_1$ (step S461). For this purpose, one trajectory is selected from the set of trajectories $\{P_1(n_1)\}$ and subsequent processing is performed for the selected trajectory.

Then, processing at steps S462 to S472 performed by the interference level calculation part 106 is the same as that at steps S422 to S432 described in the fourth embodiment. Thus, processing at step S473 and thereafter will be described below.

Step S473 is performed when repetition of Loop 3 is completed (Yes at step S471), that is, all interference evaluations with one trajectory $P_1(n_1)$ of subject vehicle $O_1$ among trajectories generated with respect to the other vehicle $O_k$ are performed. With this step S473, the interference level calculation part 106 will have completed interference evaluations of one trajectory $P_k(n_k)$ of the other vehicle $O_k$. Therefore, in this case, the interference level calculation part 106 assigns the level of interference $r_1(n_1, k)$ evaluating interference between the trajectory $P_1(n_1)$ of subject vehicle $O_1$ and all trajectories of the other vehicle $O_k$ (step S473) and outputs the assigned value to store it in the storage section 210 (step S474).

Then, the interference level calculation part 106 performs determination processing whether to repeat Loop2. If there remains another vehicle $O_k$ whose interference evaluation with subject vehicle $O_1$ should be performed (No at step S475), the interference level calculation part 106 increments the value of k by 1 (step S476) and repeats Loop2 after returning to step S462. If, on the other hand, there remains no vehicle $O_k$ whose interference evaluation with subject vehicle $O_1$ should be performed (Yes at step S475), the interference level calculation part 106 proceeds to the subsequent step S477 after completing repetition of Loop2.

At step S477, the interference level calculation part 106 calculates the total level of interference $R_1(n_1)$ given by Formula (6) using the levels of interference $r_1(n_1, k)$ obtained in Loop2 to Loop4 and output a result of the calculation to store it in the storage section 210 (step S477). Incidentally, Formula (7) may also be adopted as the total level of interference $R_1(n_1)$.

Subsequently, the interference level calculation part 106 performs determination processing whether to repeat Loop1. That is, if there remains a trajectory of the set of trajectories $\{P_1(n_1)\}$ of subject vehicle $O_1$ whose interference evaluation should be performed (No at step S478), the interference level calculation part 106 increments the value of $n_1$ by 1 (step S479) and repeats Loop1 after returning to step S461. If, on the other hand, there remains no trajectory of the set of trajectories $\{P_1(n_1)\}$ of subject vehicle $O_1$ whose interference evaluation should be performed (Yes at step S478), the interference level calculation part 106 terminates Loop1 before terminating interference level calculation processing (step S64).

Figure 28:
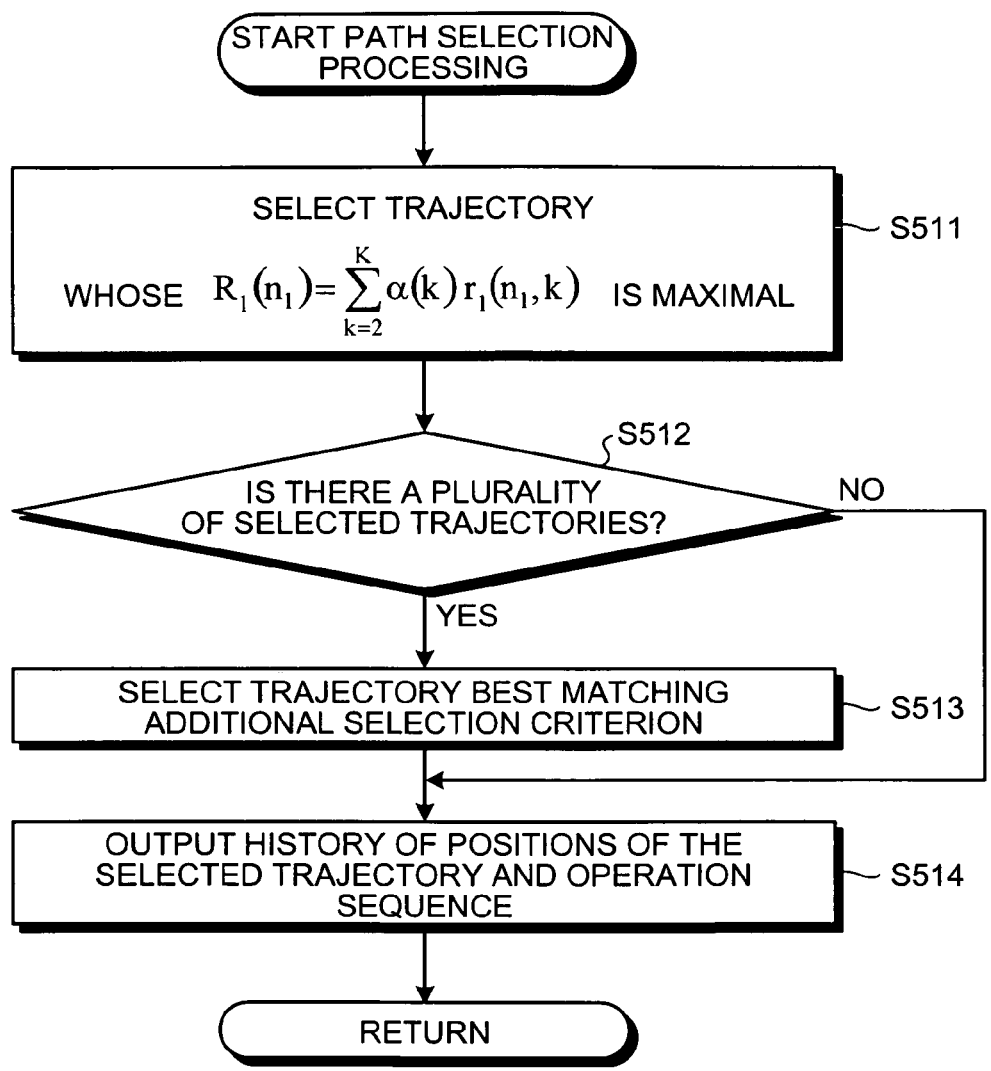
FIG. 28 is a flowchart showing details of path selection processing by the object path prediction method according to the seventh embodiment of the present invention.

Next, path selection processing (corresponding to step S65 in FIG. 23) will be described. FIG. 28 is a flowchart showing details of path selection processing by the object path prediction method according to the seventh embodiment. In FIG. 28, the path selection part 207 selects a trajectory whose total level of interference $R_1(n_1)$ calculated in the interference level calculation processing is maximal (step S511).

If, as a result of selecting a trajectory whose level of interference is maximal, only one trajectory remains (No at step S512), the path selection part 207 reads a history of the positions (x(t), y(t)) corresponding to the selected trajectory and the operation sequence $\{u(t)\}$ at t=0 to T from the storage section 210 and outputs them to the actuating signal transmission part 208 (step S514). In contrast, if, as a result of selecting a trajectory whose level of interference is maximal, a plurality of trajectories remains (Yes in step S512), the path selection part 207 proceeds to step S513.

At step S513, the path selection part 207 selects a trajectory that best matches an additional selection criterion from among a plurality of trajectories selected at step S511 by using the preset selection criterion stored in the storage section 210 (step S513). A condition like that in the sixth embodiment may be set as the additional selection criterion.

If only one trajectory remains at step S513, the path selection part 207 proceeds to step S514 described above. If a plurality of trajectories still remains even after applying the additional selection criterion, for example, a setting can be made so that a trajectory for which the value of the counter $n_1$ or k takes a minimal or maximal value is automatically selected.

According to the path selection processing described above, by selecting a trajectory most likely to avert danger of subject vehicle $O_1$ as a trajectory in a space-time, a path that should be taken on an actual two-dimensional plane will, as a result, have been selected by subject vehicle $O_1$.

Processing (step S66) by the actuating signal transmission part 208 subsequent to the path selection processing at step S65 is the same as that in the sixth embodiment. Also, processing by the actuator apparatus 211 after receiving an actuating signal from the actuating signal transmission part 208 is the same as that in the sixth embodiment.

According to the seventh embodiment of the present invention described above, a computer having a storage unit that stores at least the positions of a plurality of objects and an internal state including the speed of each object reads the positions and internal states of the plurality of objects from the storage unit, generates trajectories in a space-time consisting of time and space from changes of the positions that can be taken by each of the plurality of objects with the passage of time based on the read positions and internal states of the objects, predicts probabilistically paths of the plurality of objects by using the generated trajectory, calculates the level of interference quantitatively showing an extent of interference between paths that can be taken by the specific object and those that can be taken by the other objects based on results of the prediction, and selects the path to be taken by the specific object in accordance with the calculated level of interference within a practical time so that, as same in the sixth embodiment, safety can be secured even in situations that can actually occur.

Also, according to the seventh embodiment, by applying the total level of interference obtained by adding up the level of interference defined by using the minimum collision time after assigning weights for each object and selecting a trajectory whose total level of interference is maximal in a space-time, a path whose possibility of collision with other objects is the lowest can be set with precision even when the number of objects constituting the space-time environment is large.

In the seventh embodiment, the level of interference $r_1(n_1, k)$ may be defined like in the sixth embodiment and any of various definitions like in the third embodiment can be adopted as the value of the coefficient $c_{1k}$ or F(t) when the level of interference $r_1(n_1, k)$ is increased due to a collision. In this case, a trajectory whose $R_1(n_1)$ becomes minimum can be selected in the path selection processing.

In addition, also when performing interference evaluations in the seventh embodiment, both the total level of interference $R_1(n_1)$ and the individual level of interference $r_1(n_1, k)$ may be combined for interference evaluation.

(Other Embodiments)

So far, the first to seventh embodiments have been described in detail as best modes for carrying out the present invention, but the present invention is not limited to these embodiments. For example, in an object path prediction method according to the present invention, by arranging, in addition to existing objects detected by a sensor section, virtual objects, path predictions of the arranged virtual objects may be made. More specifically, path predictions may be made by constructing a virtual object model exhibiting behavior unfavorable to subject vehicle and arranging the object model at a predetermined position. Using such a virtual object model, when making path predictions of the vehicle (subject vehicle) running near an intersection that does not offer a wide view due to presence of, for example, a shelter, it becomes possible to predict danger of collision or the like that could fly out from the intersection by arranging the model at a position undetectable from subject vehicle. Information concerning a virtual object model may be arranged at a desired position in accordance with condition settings from an input section after storing the information in a storage section in advance.

When an object path prediction apparatus according to the present invention is applied to a field such as an expressway where only running vehicles are assumed, by causing each vehicle to have a communications means for inter-vehicle communication, vehicles running nearby may exchange running conditions mutually by means of inter-vehicle communication. In this case, information concerning an operation selection probability may be transmitted to other vehicles by storing a history of operations of each vehicle in a storage section thereof and attaching an operation selection probability of each operation based on the history of operations. Precision of path prediction is thereby enhanced so that danger while running can more reliably be averted.

Further, in the present invention, a GPS (Global Positioning System) can be employed as a position detecting unit. In such a case, position information and movement information of objects detected by a sensor section can be corrected by referencing three-dimensional map information stored in the GPS. Further, the GPS can be caused to function as a sensor section by mutual communication of output of the GPS. In all cases, high-precision path predictions can be realized by employing the GPS, further improving reliability of prediction results.

The present invention is applicable to objects moving in the three-dimensional space. The present invention is also applicable to an object having a plurality of levels of freedom (for example, an object like a robot arm having six levels of freedom).

As is evident from descriptions above, the present invention can include various embodiments not described here and various design modifications can be made without departing from the scope of technological principles specified by appended claims.

Industrial Applicability

An object path prediction method, apparatus, and program and an automatic operation system according to the present invention is suitable as a technology to secure safety by averting danger while driving a movable body such as a four-wheel vehicle.

The invention claimed is:

1. An object path prediction method for predicting a path of an object by a computer, having a storage unit that stores at least a position of the object and an internal state including a speed of the object, comprising:
   a trajectory generation step comprising:
      generating a trajectory, by a computer in a space-time constituted by time and space from changes of the position that can be taken by the object with a passage of time based on a read position and internal state of the object after reading the position and the internal state of the object from the storage unit;
      an operation selection step of selecting an operation performed on the object from a plurality of operations;
      an object operation step of causing the operation selected in the operation selection step to be performed for a predetermined period of time starting from a reference point in time; and
      a determination step of determining whether the position and the internal state of the object after the operation selected is performed in the object operation step satisfy control conditions concerning control of the object and movement conditions concerning movable areas of the object, wherein
         a set of processing from the operation selection step to the determination step is repeatedly performed until a trajectory generation time in which the trajectory is generated has been reached, and
         when, as a result of a determination in the determination step, the position and the internal state of the object does not satisfy the control conditions and the movement conditions, the reference point in time is not set forward before returning to the operation selection step; and
      a prediction step of probabilistically predicting the path of the object by using the trajectory generated in the trajectory generation step.

2. The object path prediction method according to claim 1, wherein the operation selection step selects the operation in accordance with an operation selection probability granted to each of the plurality of operations, and
   when, as a result of the determination in the determination step, the position and the internal state of the object satisfy the control conditions and the movement conditions, the reference point in time is set forward before returning to the operation selection step.

3. An object path prediction apparatus, comprising:
   a storage unit that stores at least a position of an object and an internal state including a speed of the object;
   a trajectory generation unit that
      generates a trajectory in a space-time constituted by time and space from changes of the position that can be taken by the object with a passage of time based on a read position and internal state of the object after reading the position and the internal state of the object from the storage unit,
      selects an operation performed on the object from a plurality of operations,
      causes the selected operation to be performed for a predetermined amount of time starting from a reference point in time, and
      determines whether the position and the internal state of the object after the operation selected is performed to satisfy control conditions concerning control of the object and movement conditions concerning movable areas of the object, wherein
- a set of processing from the selection to the determination is repeatedly performed until a trajectory generation time in which the trajectory is generated has been reached, and
- when, as a result of a determination, the position and the internal state of the object does not satisfy the control conditions and the movement conditions, the reference point in time is not set forward before returning to selecting the operation in the trajectory generation unit; and a prediction unit that probabilistically predicts the path of the object by using the trajectory generated by the trajectory generation unit.

4. A non-transitory computer-readable medium that stores therein a computer program for performing an object path planning prediction, the computer program causing a computer to execute the object path prediction steps of:

a trajectory generation step comprising:
- generating a trajectory, by a computer, in a space-time constituted by time and space from changes of the position that can be taken by the object with a passage of time based on a read position and internal state of the object after reading the position and the internal state of the object from the storage unit;
- an operation selection step of selecting an operation performed on the object from a plurality of operations;
- an object operation step of causing the operation selected in the operation selection step to be performed for a predetermined period of time starting from a reference point in time; and
- a determination step of determining whether the position and the internal state of the object after the operation selected is performed in the object operation step satisfy control conditions concerning control of the object and movement conditions concerning movable areas of the object, wherein
  - a set of processing from the operation selection step to the determination step is repeatedly performed until a trajectory generation time in which the trajectory is generated has been reached, and
  - when, as a result of a determination in the determination step, the position and the internal state of the object does not satisfy the control conditions and the movement conditions, the reference point in time is not set forward before returning to the operation selection step; and a prediction step of probabilistically predicting the path of the object by using the trajectory generated in the trajectory generation step.

* * * * *